US010783186B2

(12) United States Patent
Boles et al.

(10) Patent No.: US 10,783,186 B2
(45) Date of Patent: Sep. 22, 2020

(54) HETEROGENOUS KEY-VALUE SETS IN TREE DATABASE

(71) Applicant: Micron Technology, Inc., Boise, ID (US)

(72) Inventors: David Boles, Austin, TX (US); John M. Groves, Austin, TX (US); Steven Moyer, Round Rock, TX (US); Alexander Tomlinson, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 458 days.

(21) Appl. No.: 15/691,888

(22) Filed: Aug. 31, 2017

(65) Prior Publication Data

US 2019/0065621 A1 Feb. 28, 2019

(51) Int. Cl.
*G06F 16/00* (2019.01)
*G06F 16/901* (2019.01)
(Continued)

(52) U.S. Cl.
CPC .......... *G06F 16/9027* (2019.01); *G06F 16/22* (2019.01); *G06F 16/2365* (2019.01)

(58) Field of Classification Search
CPC ... G06F 16/9027; G06F 16/2365; G06F 16/22
See application file for complete search history.

(56) References Cited

U.S. PATENT DOCUMENTS

| 5,204,958 | A | 4/1993 | Cheng et al. |
| 8,700,670 | B2* | 4/2014 | Marathe ............... G06F 16/9024 707/794 |

(Continued)

FOREIGN PATENT DOCUMENTS

| CN | 105159915 A | 12/2015 |
| TW | 200421114 | 10/2004 |

(Continued)

OTHER PUBLICATIONS

A Fast Key-Value Storage System for Variable-Length String Keys, Ahn et al. IEEE, vol. 65 (Year: 2016).*

(Continued)

*Primary Examiner* — Jean M Corrielus
(74) *Attorney, Agent, or Firm* — Schwegman Lundberg & Woessner, P.A.

(57) ABSTRACT

A KVS tree database and operations thereon are described herein. A KVS tree database is a multilevel tree that includes a base level and subsequent levels. The base level includes a heterogeneous kvset in a node, The heterogeneous kvset including entries for multiple KVS trees, such as a first entry for a first KVS tree and a second entry for a second KVS tree, The subsequent level includes a first node including a first homogeneous kvset for the first KVS tree and a second node including a second homogeneous kvset for the second KVS tree. Here, a homogeneous kvset includes nodes from only one KVS tree. The KVS tree database also includes a first determinative mapping of entries between the base level and the subsequent level and a second determinative mapping of entries between subsequent levels.

42 Claims, 21 Drawing Sheets

(51) Int. Cl.
*G06F 16/23* (2019.01)
*G06F 16/22* (2019.01)

(56) References Cited

U.S. PATENT DOCUMENTS

| | | | | |
|---|---|---|---|---|
| 8,886,691 | B2* | 11/2014 | Colgrove | G06F 3/0608 707/818 |
| 8,996,563 | B2* | 3/2015 | Bender | G06F 9/546 707/769 |
| 2011/0246503 | A1* | 10/2011 | Bender | G06F 9/546 707/769 |
| 2015/0293958 | A1 | 10/2015 | Chen et al. | |
| 2016/0139838 | A1* | 5/2016 | D'Sa | G06F 3/0619 711/114 |
| 2016/0321294 | A1* | 11/2016 | Wang | G06F 16/182 |
| 2016/0335299 | A1* | 11/2016 | Vemulapati | G06F 16/2291 |
| 2016/0364421 | A1 | 12/2016 | Huang et al. | |
| 2017/0177657 | A1 | 6/2017 | Wilding | |
| 2017/0220267 | A1* | 8/2017 | Neelakanta | G06F 3/0616 |

FOREIGN PATENT DOCUMENTS

| | | |
|---|---|---|
| TW | 201913416 | 4/2019 |
| WO | WO-2012110812 A1 | 8/2012 |
| WO | 2019045959 | 3/2019 |

OTHER PUBLICATIONS

An Intelligent LSM-Tree Based Key-Value SSD for Data Analytics, Lee et al., IEEE, (Year: 2019).*
Review on HDD-Based, SSD-Based and Hybrid Key-Value Stores, Li et al., IEEE, (Year: 2017).*
"International Application Serial No. PCT/US2018/045582, International Search Report dated Nov. 26, 2018", 3 pgs.
"International Application Serial No. PCT/US2018/045582, Written Opinion dated Nov. 26, 2018", 4 pgs.
"Taiwanese Application Serial No. 107128396, Office Action dated Jun. 19, 2019", w English translation, 14 pgs.
"Taiwanese Application Serial No. 107128396, Response filed Sep. 16, 2019 to Office Action dated Jun. 19, 2019", w English Claims, 103.
"International Application Serial No. PCT US2018 045582, International Preliminary Report on Patentability dated Mar. 12, 2020", 6 pgs.
"A persistent key-value store for fast storage environments", RocksDB, [Online]. Retrieved from the Internet: <URL: http://rocksdb.org/, (Accessed May 20, 2017), 6 pgs.
"KVS Tree", U.S. Appl. No. 15/428,877, 139 pgs.
"Welcome to Apache HBase", The Apache Software Foundation, [Online]. Retrieved from the Internet: <URL: https://hbase.apache.org/>, (Accessed on May 25, 2017), 3 pgs.
Amur, Hrishikesh, et al., "Design of a Write-Optimized Data Store", (2013), 12 pgs.
O'Neil, Patrick E., et al., "The Log-Structured Merge-Tree", ACTA Informatica 33(4), (1996).

* cited by examiner

HETEROGENOUS KEY-VALUE SETS IN TREE DATABASE

TECHNICAL FIELD

Embodiments described herein generally relate to a key-value data store and more specifically to implementing a KVS tree database.

BACKGROUND

Data structures are organizations of data that permit a variety of ways to interact with the data stored therein. Data structures may be designed to permit efficient searches of the data, such as in a binary search tree, to permit efficient storage of sparse data, such as with a linked list, or to permit efficient storage of searchable data such as with a B-tree, among others.

Key-value data structures accept a key-value pair and are configured to respond to queries for the key. Key-value data structures may include such structures as dictionaries (e.g., maps, hash maps, etc.) in which the key is stored in a list that links (or contains) the respective value. While these structures are useful in-memory (e.g., in main or system state memory as opposed to storage), storage representations of these structures in persistent storage (e.g., on-disk) may be inefficient. Accordingly, a class of log-based storage structures have been introduced. An example is the log structured merge tree (LSM tree).

There have been a variety of LSM tree implementations, but many conform to a design in which key-value pairs are accepted into a key-sorted in-memory structure. As that in-memory structure fills, the data is distributed amongst child nodes. The distribution is such that keys in child nodes are ordered within the child nodes themselves as well as between the child nodes. For example, at a first tree-level with three child nodes, the largest key within a left-most child node is smaller than a smallest key from the middle child node and the largest key in the middle child node is smaller than the smallest key from the right-most child node. This structure permits an efficient search for both keys, but also ranges of keys in the data structure.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
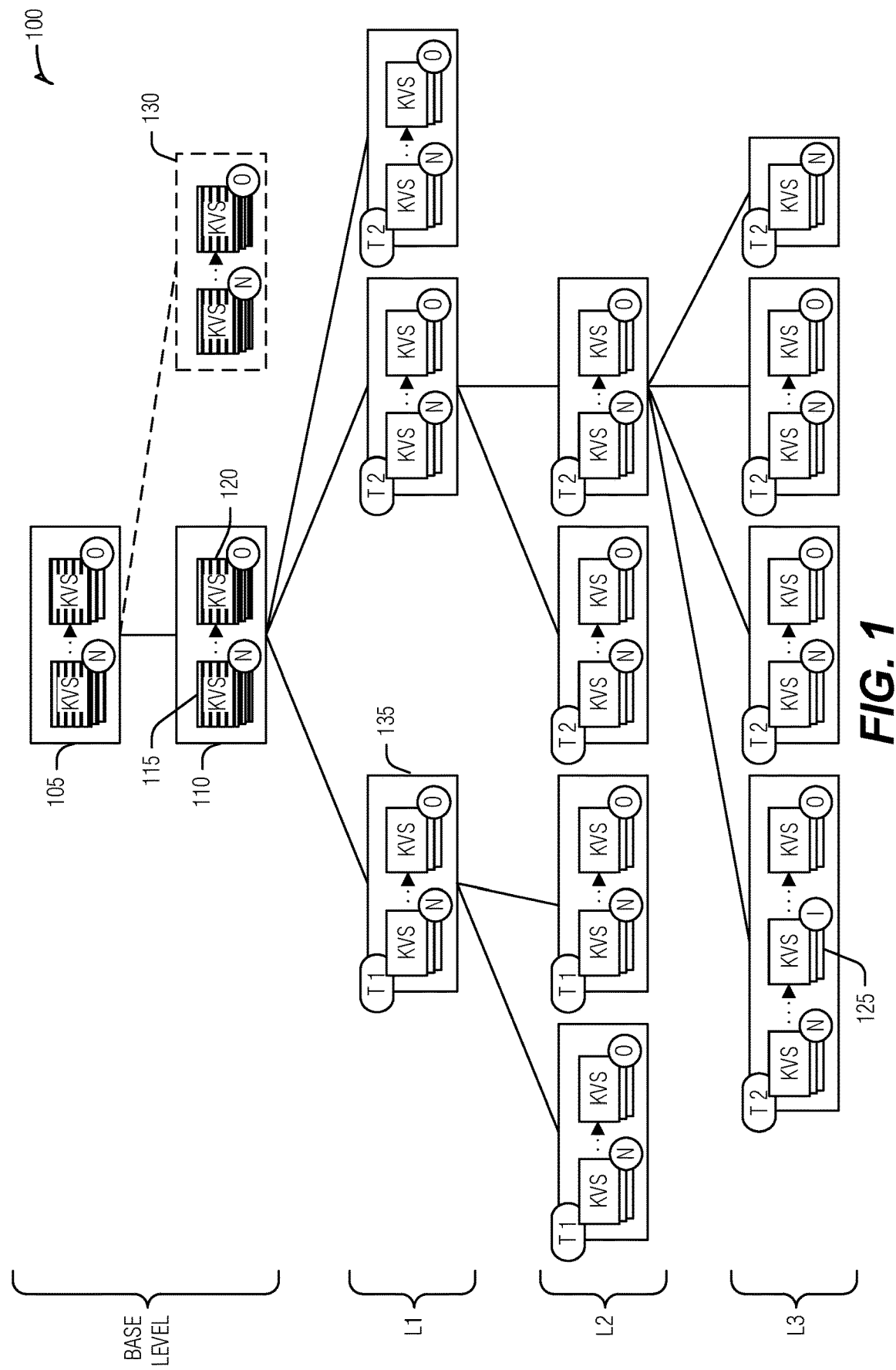
FIG. 1 illustrates an example of a KVS tree database, according to an embodiment.

Traditionally, LSM trees have become a popular storage structure for data in which high volume writes are expected and also for which efficient access to the data is expected. To support these features, conventional solutions may tune portions of the LSM for the media upon which they are kept and a background process generally addresses moving data between the different portions (e.g., from the in-memory portion to the on-disk portion). Herein, "in-memory" refers to a random access and byte-addressable device (e.g., static random access memory (SRAM) or dynamic random access memory (DRAM)); and "on-disk" refers to a block addressable—or other larger than a byte word addressable area, such as a page, line, string, etc.—device (e.g., hard disk drive, compact disc, digital versatile disc, or solid-state drive (SSD) such as a flash memory based device), which also be referred to as a media device or a storage device. LSM trees leverage the ready access provided by the in-memory device to sort incoming data, by key, to provide ready access to the corresponding values. As the data is merged onto the on-disk portion, the resident on-disk data is merged with the new data and written in blocks back to disk.

While LSM trees have become a popular structure underlying a number of database and volume storage (e.g., cloud storage) designs, they do have some drawbacks. First, the constant merging of new data with old to keep the internal structures sorted by key results in significant write amplification. Write amplification is an increase in the minimum number of writes for data that is imposed by a given storage technique. For example, to store data, it is written at least once to disk. This may be accomplished, for example, by simply appending the latest piece of data onto the end of already written data. This structure, however, is slow to search (e.g., it grows linearly with the amount of data), and may result in inefficiencies as data is changed or deleted. LSM trees increase write amplification as they read data from disk to be merged with new data, and then re-write that data back to disk. The write amplification problem may be exacerbated when storage device activities are included, such as defragmenting hard disk drives or garbage collection of SSDs. Write amplification on SSDs may be particularly pernicious as these devices may "wear out" as a function of a number of writes. That is, SSDs have a limited lifetime measured in writes. Thus, write amplification with SSDs works to shorten the usable life of the underlying hardware.

A second issue with LSM trees includes the large amount of space that may be consumed while performing the merges. LSM trees ensure that on-disk portions are sorted by key. If the amount of data resident on-disk is large, a large amount of temporary, or scratch, space may be consumed to perform the merge. This may be somewhat mitigated by dividing the on-disk portions into non-overlapping structures to permit merges on data subsets, but a balance between structure overhead and performance may be difficult to achieve.

A third issue with LSM trees includes possibly limited write throughput. This issue stems from the essentially always sorted nature of the entirety of the LSM data. Thus, large volume writes that overwhelm the in-memory portion must wait until the in-memory portion is cleared with a possibly time-consuming merge operation. To address this issue, a traditional write buffer (WB) tree has been proposed in which smaller data inserts are manipulated to avoid the merge issues in this scenario. Specifically, a WB tree hashes incoming keys to spread data, and stores the key-hash and value combinations in smaller intake sets. These sets may be merged at various times or written to child nodes based on the key-hash value. This avoids the expensive merge operation of LSM trees while being performant in looking up a particular key. However, WB trees, being sorted by key-hash, result in expensive whole tree scans to locate values that are not directly referenced by a key-hash, such as happens when searching for a range of keys.

KVS trees and corresponding operations address the issues discussed above with LSM trees or related data structures. KVS trees are a tree data structure including nodes with connections between a parent node and a child node based on a predetermined derivation of a key rather than the content of the tree. The nodes include temporally ordered sequences of key-value sets (kvsets), also known as KVSs. The kvsets contain key-value pairs in a key-sorted structure. Kvsets are also immutable once written. The KVS tree achieves the write-throughput of WB trees while improving upon WB tree searching by maintaining kvsets in nodes, the kvsets including sorted keys, as well as, in an example, key metrics (such as bloom filters, minimum and maximum keys, etc.), to provide efficient search of the kvsets. In many examples, KVS trees can improve upon the temporary storage issues of LSM trees by separating keys from values and merging smaller kvset collections. Additionally, the described KVS trees may reduce write amplification through a variety of maintenance operations on kvsets. Further, as the kvsets in nodes are immutable, issues such as write wear on SSDs may be managed by the data structure, reducing garbage collection activities of the device itself. This has the added benefit of freeing up internal device resources (e.g., bus bandwidth, processing cycles, etc.) that result in better external drive performance (e.g., read or write speed).

While KVS trees are flexible and powerful data structures for a variety of storage tasks, some greater efficiencies may be gained by combining multiple KVS trees into a KVS tree database (KVDB), as described in the present disclosure. To maintain or improve the read and write performance of KVS trees, the KVDB mixes the root layers of multiple KVS trees into a base level that includes nodes and kvsets with entries from the multiple trees. Beyond the base level of the KVDB, the multiple KVS trees may branch into distinct sub-trees such that the kvsets of the nodes of these sub-trees are homogeneous (e.g., contain entries of only one KVS tree). In other words, a KVDB is a forest of disjoint KVS trees with a common root structure. KVDBs may provide a number of advantages over KVS trees. For example, write efficiency may be increased as writes for several trees may be combined in base level kvsets. Additional KVDB advantages are described below.

Implementations of the present disclosure describe a tree identifier (TID), used in conjunction with entry keys, to distinguish between trees during retrieval or maintenance (e.g., compaction) operations to support the mixed tree kvsets of the base level. With the exception of using TIDs in conjunction with entry keys, KVS tree operations may be applied to the KVDB, providing a lightweight and efficient aggregation of KVS trees. Combining multiple KVS trees allows for more efficient read and write operations to underlying media (e.g., disk or other storage) in larger blocks than may occur with separate KVS trees because writes for several KVS trees may be buffered together and written to one kvset. While the techniques and structures described herein offer particular advantages to solid-state drives (e.g., NAND FLASH devices), these structures and techniques are also usable and beneficial one various other forms of machine-readable media.

FIG. 1 illustrates an example block diagram of a KVDB 100, according to an embodiment. The KVDB 100 includes multiple KVS trees—illustrated as T1 and T2—organized as a tree with a common base level between the KVS trees and disjoint subsequent levels (e.g., L1, L2, and L3). Values are stored in the KVDB 100 with corresponding keys that reference the values. With respect to the contained KVS trees (e.g., KVS trees in the KVDB 100), key-entries are used to hold both the key and additional information, such as a reference to the value, however, unless otherwise specified, the key-entries are simply referred to as keys for simplicity. Keys themselves have a total ordering within a KVS tree. Thus, keys may be sorted amongst each other. Keys may also be divided into sub-keys. Generally, sub-keys are non-overlapping portions of a key. In an example, the total ordering of keys is based on comparing like sub-keys between multiple keys (e.g., a first sub-key of a key is compared to the first sub-key of another key). In an example, a key prefix is a beginning portion of a key. The key prefix may be composed of one or more sub-keys when they are used.

The KVDB 100 includes one or more nodes, such as nodes 105, 110 or 130. A node includes a temporally ordered sequence of immutable key-value sets (kvsets). As noted above, the KVDB 100 differs from a KVS tree by including heterogeneous kvsets—kvsets that include entries from multiple KVS trees—in the base level, and homogeneous kvsets—kvsets that include entries from only one KVS tree—at subsequent levels. Throughout the figures, heterogeneous kvsets are illustrated with stripes (e.g., kvsets 115 and 120) and homogeneous kvsets are solid (e.g., kvset 125). Further, to illustrate that subsequent level nodes belong to a single KVS tree, the nodes include a badge in the upper-left corner denoting their tree affiliation (e.g., T1 or T2 in FIG. 1). Also, as illustrated, kvset 115 includes an 'N' badge to indicate that it is the newest of the sequence while kvset 120 includes an 'O' badge to indicate that it is the oldest of the sequence. Kvset 125 includes an 'I' badge to indicate that it is intermediate in the sequence. These badges are used throughout to label kvsets, however, another badge (such as an 'X') denotes a specific kvset rather than its position in a sequence (e.g., new, intermediate, old, etc.), unless it is a tilde '~' in which case it is simply an anonymous kvset. As is explained in greater detail below, older key-value entries occur lower in the KVS trees contained in the KVDB 100. Thus, bringing entries up a level, such as from L2 to L1, results in a new kvset in the oldest position in the recipient node.

KVS trees include a determinative mapping that maps a key in a node to a single child node. Thus, given a key-value pair, an external entity could trace a path through a KVS tree of possible child nodes without knowing the contents of the tree. This, for example, is quite different than a B-tree, where the contents of the tree will determine where a given key's value will fall in order to maintain the search-optimized structure of the tree. Instead, the determinative mapping of KVS trees provide a rule such that, for example, given a key, one may calculate the child at L3 this the key would map to even if the maximum tree-level (e.g., tree depth) is only at L1.

The KVDB 100 also includes determinative mapping. However, the KVDB includes a first determinative mapping of entries between the base level and a subsequent level (e.g., L1), and a second determinative mapping of entries between subsequent levels. In an example, the first determinative mapping is based on a TID for a KVS tree corresponding to an entry. The KVDB 100 is illustrated with two KVS trees, T1 and T2. The first determinative mapping maps an entry from a base level node, such as node 110, that includes heterogeneous kvsets (e.g., kvset 120) to a subsequent level node (e.g., node 135) with homogeneous kvsets from a single KVS tree. In an example, as illustrated with KVS tree T1, the first determinative mapping may use only the TID to place entries into a single root subsequent node (e.g., node 135) for the KVS tree. A root subsequent node is a highest level node with homogeneous kvsets. More than one root subsequent node may exists, however, as illustrated with respect to T2. This, the first determinative mapping uses the TID to select just one of possible several root subsequent nodes for an entry. In an example, the TID may be combined with a key for the entry to map the entry to one of several nodes, such as is illustrated with respect to KVS tree T2.

To facilitate TID use in the first determinative mapping, entries in heterogeneous kvsets may include the TID as part of entries. In an example, homogeneous kvsets omit the TID from entries. Thus, where used, the TID is readily available, and where it is not used, space is saved by omitting the TID from an entry. In an example, a TID may be stored in a node with homogeneous kvsets. This may provide a compromise for a saving space in entries while also allowing for a more flexible node implementation.

In an example, the second determinative mapping is a determinative mapping specified for a KVS tree corresponding to nodes in the subsequent levels. For example, the nodes marked T2 in FIG. 1 are subsequent level nodes that use the second determinative mapping specified by KVS tree T2, and the nodes marked T1 in FIG. 1 are subsequent level nodes that use the second determinative mapping specified by KVS tree T1. Thus, the second determinative mapping (although there may be more than one) operate on subsequent level nodes with homogeneous kvsets.

In a KVS tree, the base level, or root, may be organized with a single node in a byte-addressable first media, such as random access memory (RAM) or the like, and a single node on a block addressable second media, such as flash storage. The KVDB 100 may be similarly organized at the base level, such that node 105 is in the first media and all child nodes are in the second media. In an example, the KVDB 100 includes several second media child nodes, such as node 110 and node 130. In this example, the KVDB 100 may include a third determinative mapping between sublevels of the base level—thus the base level is hierarchically subdivided. The third determinative mapping may use a combination of TID and key to determine which sub-level child a given entry maps—thus, the third determinative mapping pertains to mapping between the parent and child nodes within the base level. However, it may be beneficial from a search or storage management perspective to evenly spread entries into child sub-levels of the base level. Accordingly, in an example, the third determinative mapping may ignore (e.g., not use) TIDs of entries.

Determinative mappings may be based on a portion of a hash of source material, such as a TID, a key, or both. For example, the determinative mapping may use a portion of a hash of a portion of the key. Thus, a sub-key may be hashed to arrive at a mapping set. A portion of this set may be used for any given level of the KVDB 100. In an example, the portion of the key is the entire key.

In an example, the hash includes a multiple of non-overlapping portions including the portion of the hash. In an example, each of the multiple of non-overlapping portions corresponds to a level of the KVDB 100. In an example, the portion of the hash is determined from the multiple of non-overlapping portions by a level of the node. In an example, a maximum number of child nodes for the node is defined by a size of the portion of the hash. In an example, the size of the portion of the hash is a number of bits. These examples may be illustrated by taking a hash of a key that results in 8 bits. These eight bits may be divided into three sets of the first two bits, bits three through six (resulting in four bits), and bits seven and eight. Child nodes may be index based on a set of bits, such that child nodes at the first level (e.g., L1) have two bit names, child nodes on the second level (e.g., L2) have four-bit names, and child nodes on the third level (e.g., L3) have two bit names. An expanded discussion is included below with regard to FIGS. 11 and 12.

As in KVS trees, kvsets of the KVDB 100 are the key and value stores organized in the nodes of the KVDB 100. As noted above, KVDB 100 adds heterogeneous kvsets to the homogeneous kvsets of a KVS tree. The immutability of the kvsets means that the kvset, once placed in a node, does not change. A kvset may, however, be deleted, some or all of its contents may be added to a new kvsets, etc. In an example, the immutability of the kvset also extends to any control or meta-data contained within the kvset. This is generally possible because the contents to which the meta-data applies are unchanging and thus, often the meta-data will also be static at that point.

Also of note, the KVDB 100 does not require uniqueness among keys throughout, but a given kvset does have only one of a key. That is, every key in a given kvset is different than the other keys of the kvset. This last statement is true for a particular kvset, and thus may not apply when, for example, a kvset is versioned. Kvset versioning may be helpful for creating a snapshot of the data. With a versioned kvset, the uniqueness of a key in the kvset is determined by a combination of the kvset identification (ID) and the version. However, two different kvsets (e.g., kvset 115 and kvset 120) may each include the same key. A heterogeneous kvset defines the uniqueness of a key in terms of a KVS tree to which that key belongs. Thus, heterogeneous kvset 110 may properly contain a key "A" for both KVS trees T1 and T2, but may not properly contain two keys "A" for a single KVS tree. Accordingly, the uniqueness of a given key is determined by a combination of TID and key in a heterogeneous kvset.

The KVS trees contained in the KVDB 100 are not static, but rather dynamic. That is, a KVS tree T1 may be added to the KVDB 100 after the KVDB is in operation and deleted (e.g., removed) at a later time. This ability is due to the TID being attached to the entries and as a component of the first determinative mapping. Thus, generally, maintenance operations or metrics are not dependent upon letting the KVDB know of the inclusion of a particular KVS tree, but rather a common mechanism by which connect a given KVS tree and its entries in the heterogeneous kvsets, and to select which subsequent level nodes belong to a given KVS tree contained within the KVDB 100.

KVS trees can be deleted from the KVDB. For example, to clear out the heterogeneous kvsets, a "delete-all" (or wildcard) tombstone—as used herein, a tombstone is a data marker indicating that the value corresponding to the key has been deleted—for the KVS tree may be ingested. This tombstone matches any entry for the given KVS tree. In an example, meta data may be associated at the base level to define all entries (e.g., key-value pairs) for the given KVS tree to be obsolete. These actions will effectively remove the KVS tree from the KVDB 100 as any query for entries from the KVS tree will fail. However, a second operation of pruning subsequent levels (e.g., removing references to the subsequent levels) of the KVS tree may speed data reclamation or other garbage collection activities. In an example, the pruning includes deleting all nodes of the KVS tree's subsequent levels. In an example, deleting a node includes deleting all kvsets contained within the node. Thus, it is relatively straight-forward to add KVS trees to—simply injest an entry with a TID, and delete KVS trees from, the KVDB 100 because the KVDB 100 is organized as a forest of disjoint KVS trees sharing a common root structure.

In an example, a kvset includes a key-tree to store key entries of key-value pairs of the kvset. A variety of data structures may be used to efficiently store and retrieve unique keys in the key-tree (it may not even be a tree), such as binary search trees, B-trees, etc. In an example, the keys are stored in leaf nodes of the key-tree. In an example, a maximum key—e.g., a key with the greatest value as determined by the natural sorting order of the keys—in any subtree of the key-tree is in a rightmost entry of a rightmost child. In an example, a rightmost edge of a first node of the key-tree is linked to a sub-node of the key-tree. In an example, all keys in a subtree rooted at the sub-node of the key-tree are greater than all keys in the first node of the key tree.

In an example, key entries of the kvset are stored in a set of key-blocks including a primary key-block and zero or more extension key-blocks. In an example, members of the set of key-blocks correspond to media blocks for a storage medium, such as an SSD, hard disk drive, etc. In an example, each key-block includes a header to identify it as a key-block. In an example, the primary key-block includes a list of media block identifications for the one or more extension key-blocks of the kvset.

In an example, the primary key-block includes a header to a key-tree of the kvset. The header may include a number of values to make interacting with the keys, or kvset generally, easier. In an example, the primary key-block, or header, includes a copy of a lowest key in a key-tree of the kvset. Here, the lowest key is determined by a pre-set sort-order of the tree (e.g., the total ordering of keys in the tree 100). In an example, the primary key-block includes a TID for a homogeneous kvset. In an example, the primary key-block includes a set of TIDs for entries in heterogeneous kvsets. In an example, the primary key-block includes a bloom filter for TIDs of entries in heterogeneous kvsets. In an example, the primary key-block includes a bloom filter for (TID, key) entries in heterogeneous kvsets. In an example, the primary key-block includes a copy of a highest (e.g., maximum) key in a key-tree of the kvset, the highest key determined by a pre-set sort-order of the tree. In an example, the primary key-block includes a list of media block identifications for a key-tree of the kvset. In an example, the primary key-block includes a bloom filter header for a bloom filter of the kvset. In an example, the primary key-block includes a list of media block identifications for a bloom filter of the kvset.

In an example, values of the kvset are stored in a set of value-blocks. Here, members of the set of value-blocks correspond to media blocks for the storage medium. In an example, each value-block includes a header to identify it as a value-block. In an example, a value block includes a storage section to one or more values without separation between those values. Thus, the bits of a first value run into bits of a second value on the storage medium without a guard, container, or other delimiter between them. In an example, the primary key-block includes a list of media block identifications for value-blocks in the set of value blocks. Thus, the primary key-block manages storage references to value-blocks.

In an example, the primary key-block includes a set of metrics for the kvset. Metrics operate similarly for heterogeneous and homogeneous kvsets in that the TIDs of entries are not considered except that the uniqueness of a key in a heterogeneous kvset includes a TID for the entry of that key. Otherwise, all key-value pairs or tombstones are considered regardless of a KVS tree to which they belong. Generally, a tombstone will reside in the key entry and no value-block space will be consumed for this key-value pair. The purpose of the tombstone is to mark the deletion of the value while avoiding the possibly expensive operation of purging the value from the tree. Thus, when the tombstone is encountered using a temporally ordered search, it is evident that the corresponding value is deleted even if an expired version of the key-value pair resides at an older location within the tree. In an example, the set of metrics include a total number of keys stored in the kvset. In an example, the set of metrics include a number of keys with tombstone values stored in the kvset.

In an example, the set of metrics stored in the primary key-block include a sum of all key lengths for keys stored in the kvset. In an example, the set of metrics include a sum of all value lengths for keys stored in the kvset. These last two metrics give an approximate (or exact) amount of storage consumed by the kvset. In an example, the set of metrics include an amount of unreferenced data in value-blocks (e.g., unreferenced values) of the kvset. This last metric gives an estimate of the space that may be reclaimed in a maintenance operation. Additional details of key-blocks and value-blocks are discussed below with respect to FIG. 4.

KVDBs, offer advantages over other combined tree structures, such as HBase or RocksDB. For example, each tree of the multi-tree may be considered a column family in these databases. By combining multi-tree root structures, KVDBs allow transactions that store or delete key-value pairs in more than one KVS tree to be atomic without the overhead of a write-ahead log—which may include additional processing, I/O's, or storage capacity consumption—by ingesting all key-value pairs or tombstones associated with a given transaction in the same kvset (or collection of atomically-ingested kvsets). Further KVDBs allow kvset ingest size, and hence I/O efficiency, to be increased because ingested kvsets may comprise key-value pairs or tombstones associated with any or all of the KVS trees in a KVDB. Further, KVDBs enable reducing the total amount of memory for kvset buffering (e.g., in the byte-addressable node level) because separate kvset buffers for each KVS tree in a KVDB do not need to be maintained because a kvset in the in-memory base level may comprise key-value pairs or tombstones associated with any or all of the KVS trees in a KVDB.

As noted above, the KVDB 100 may include a base level node 105 in a first computer readable medium and a second base level node 110 in a second computer readable medium. In an example, the second base level node 110 is the only child to the first base level node 105. In an example, the first computer readable medium is byte addressable and the second computer readable is block addressable. The division of the first base level node 105 and the second base level node 110 on different media provides a number of benefits. For example, the flexibility of modifying kvsets in a byte-addressable memory does not impact the performance characteristics of immutable kvsets on block addressable storage. Thus, data may be ingested in a quick and efficient manner at node 105, while the KVDB 100 maintains the write performance characteristics of immutable kvsets on block storage. As noted above, in an example, the first base level node 105 may have several child nodes (e.g., node 110 and node 130) on the second computer readable medium. As the base level nodes form the common root structure of the several KVS trees in the KVDB, increasing base level nodes may have benefits with respect to data ingestion or retrieval efficiency.

Figure 2:
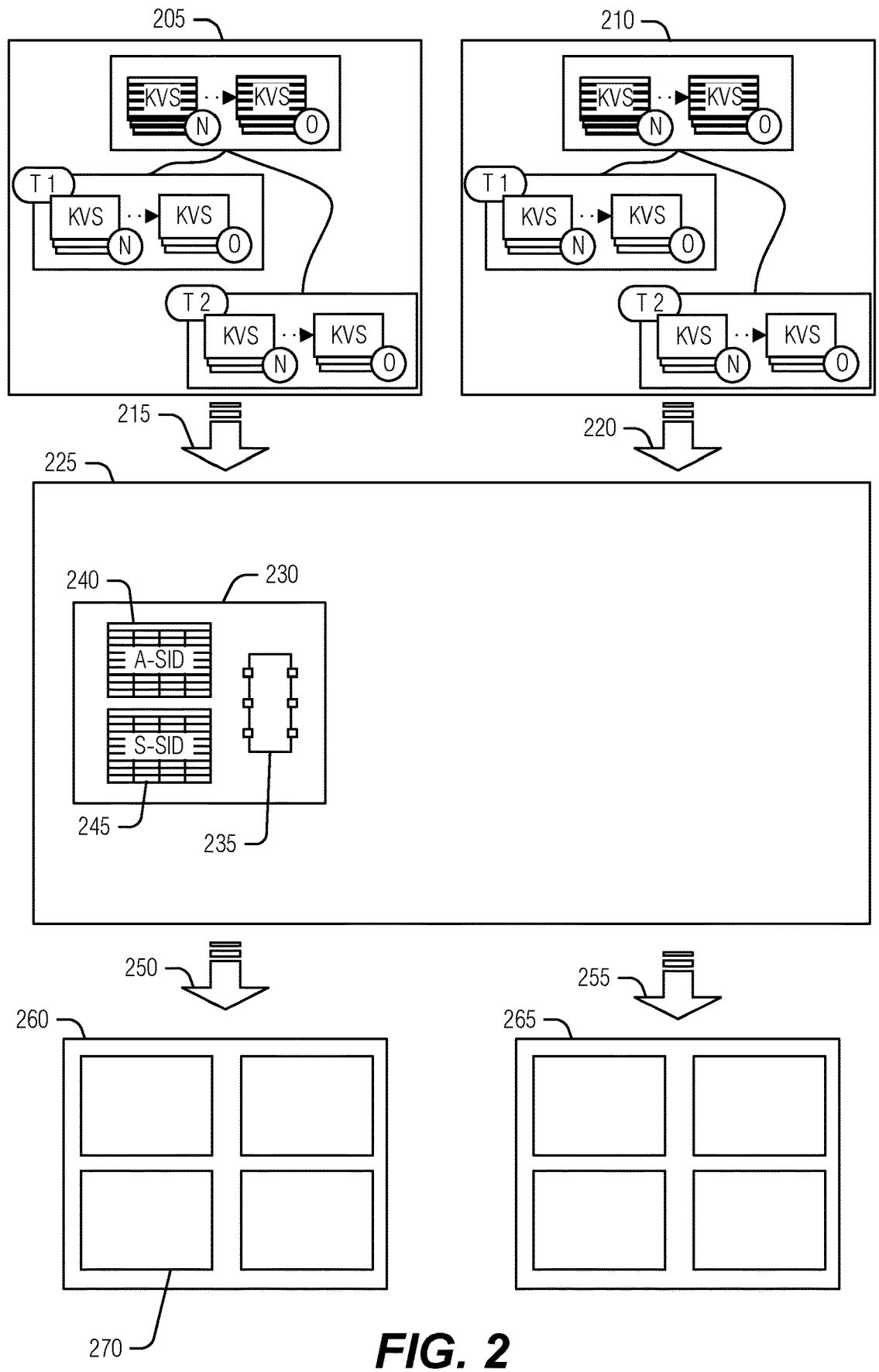
FIG. 2 is a block diagram illustrating an example of a write to a multi-stream storage device, according to an embodiment.
Figure 3:
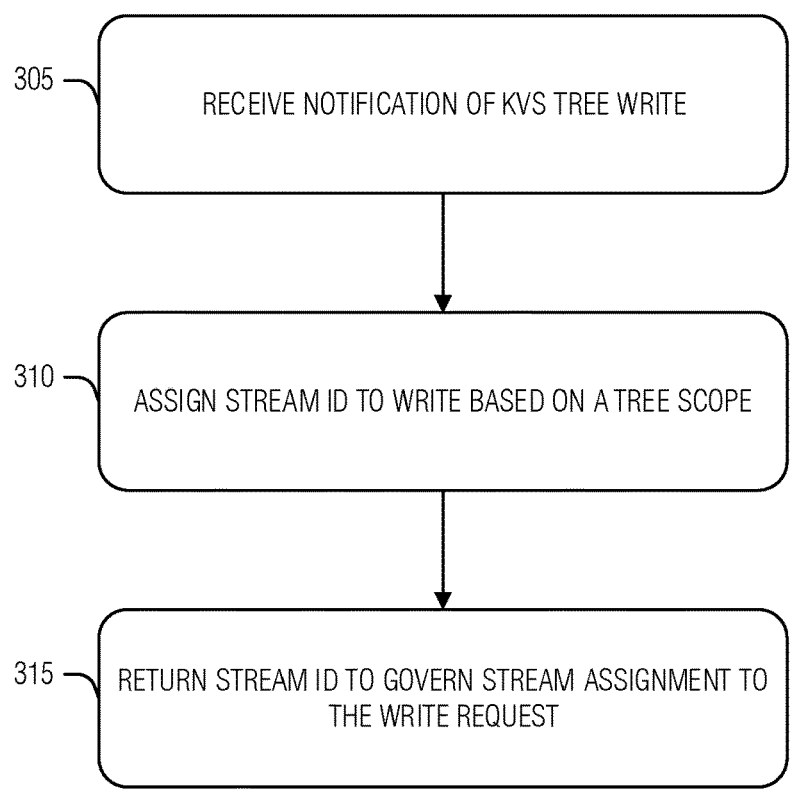
FIG. 3 illustrates an example of a method to facilitate writing to a multi-stream storage device, according to an embodiment.

The discussion above demonstrates a variety of the organization attributes of the KVDB 100. Operations to interact with the KVDB 100, such as tree maintenance (e.g., optimization, garbage collection, etc.), searching, and retrieval are discussed below with respect to FIGS. 5-20. Before proceeding to these subjects, FIGS. 2 and 3 illustrate a technique to leverage the structure of the KVDB 100 to implement an effective use of multi-stream storage devices.

Storage devices comprising flash memory, or SSDs, may operate more efficiently and have greater endurance (e.g., will not "wear out") if data with a similar lifetime is grouped in flash erase blocks. Storage devices comprising other non-volatile media may also benefit from grouping data with a similar lifetime, such as shingled magnetic recording (SMR) hard-disk drives (HDDs). In this context, data has a similar lifetime if it is deleted at the same time, or within a relatively small time interval. For some storage devices, stored data is modified by deleting the original data and writing the new (e.g., changed) data. The method for deleting data on a storage device may include explicitly deallocating, logically overwriting, or physically overwriting the data on the storage device.

As a storage device may be generally unaware of the lifetime of the various data stored within it, the storage device may provide an interface for data access commands (e.g., reading or writing) to identify a logical lifetime group with which the data is associated. For example, the industry standard SCSI and proposed NVMe storage device interfaces specify write commands comprising data to be written to a storage device and a numeric stream identifier (stream ID) for a lifetime group called a stream, to which the data corresponds. A storage device supporting a plurality of streams is a multi-stream storage device.

Temperature is a stability value to classify data, whereby the value corresponds to a relative probability that the data will be deleted in any given time interval. For example, HOT data may be expected to be deleted (or changed) within a minute while COLD data may be expected to last an hour or more. In an example, a finite set of stability values may be used to specify such a classification. In an example, the set of stability values may be {HOT, WARM, COLD} where, in a given time interval, data classified as HOT has a higher probability of being deleted than data classified as WARM, which in turn has a higher probability of being deleted than data classified as COLD.

FIGS. 2 and 3 address assigning different stream IDs to different writes based on a given stability value as well as one or more attributes of the data with respect to one or more KVDBs or KVS trees within the KVDBs. Thus, continuing the prior example, for a given storage device, a first set of stream identifiers may be used with write commands for data classified as HOT, a second set of stream identifiers may be used with write commands for data classified as WARM, and a third set of stream identifiers may be used with write commands for data classified as COLD, where a stream identifier is in at most one of these three sets.

The following terms are provided for convenience in discussing the multi-stream storage device systems and techniques of FIGS. 2 and 3:

DID is a unique device identifier for a storage device.

SID is a stream identifier for a stream on a given storage device.

TEMPSET is a finite set of temperature values.

TEMP is an element of TEMPSET.

FID is a unique forest identifier for a collection of KVS trees. In an example, the FID represents a KVDB.

TID is a unique tree identifier for a KVS tree.

LNUM is a level number in a given KVS tree, where, for convenience, the block-addressable root node(s) of a KVS tree is considered to be at tree-level 0, the child nodes of the root node (if any) are considered to be at tree-level 1, and so on. In an example, the LNUM is relative to a KVDB and not any KVS tree contained therein. Thus, the first base level node(s) in block addressable media are level 0 with deeper levels, whether they be base level or subsequent levels, incrementing LNUM as the KVDB depth is increased.

NNUM is a number for a given node at a given level in a given KVDB or KVS tree, where, for convenience, NNUM may be a number in the range zero through (NodeCount(LNUM)−1), where NodeCount(LNUM) is the total number of nodes at a tree-level LNUM, such that every node in the KVDB or KVS tree is uniquely identified by the tuple (LNUM, NNUM). As illustrated in FIG. 1, the complete listing of node tuples, starting at node 110 and progressing top-to-bottom, left-to-right, would be:

L0 (base level starting at node 110): (0,0), (0, 1)
L1: (1,0), (1,1), (1,2)
L2: (2,0), (2,1), (2,2), (2,3)
L3: (3,0), (3,1), (3,2), (3,3)

KVSETID is a unique kvset identifier.

WTYPE is the value: KBLOCK or VBLOCK, as discussed below.

WLAST is a Boolean value (TRUE or FALSE) as discussed below.

FIG. 2 is a block diagram illustrating an example of a write to a multi-stream storage device (e.g., device 260 or 265), according to an embodiment. FIG. 2 illustrates multiple KVDBs, KVDB 205 and KVDB 210. As illustrated, each KVDB is respectively performing a write operation 215 and 220. These write operations are handled by a storage subsystem 225. The storage subsystem can include a device driver, such as for device 260, a storage controller to manage multiple devices (e.g., device 260 and device 265) such as those found in operating systems, network attached storage devices, etc., or any combination of such. In time, the storage subsystem 225 will complete the writes to the storage devices 260 and 265 in operations 250 and 255 respectively. The stream-mapping circuits 230 provide a stream ID to a given write 215 to be used in the device write 250.

In the KVDB 205, the immutability of kvsets results in entire kvsets being written or deleted at a time. Thus, the data comprising a kvset has a similar lifetime. Data comprising a new kvset may be written to a single storage device or to several storage devices (e.g., device 260 and device 265) using techniques such as erasure coding or RAID. Further, as the size of kvsets may be larger than any given device write operation 250, writing the kvset may involve directing multiple write commands to a given storage device 260. To facilitate operation of the stream-mapping circuits 230, one or more of the following may be used to select a stream ID for each such write command 250:

A) KVSETID of the kvset being written;
B) DID for the storage device;
C) FID for the forest or KVDB to which a KVS tree belongs;
D) TID for a KVS tree;
E) LNUM of the node in the KVS tree containing the kvset;
F) NNUM of the node in the KVS tree containing the kvset;
G) WTYPE is KBLOCK if the write command is for a key-block for KVSETID on DID, or is VBLOCK if the write command is for a value-block for KVSETID on DID
H) WLAST is TRUE if the write command is the last for a KVSETID on DID, and is FALSE otherwise In an example, for each such write command, the tuple (DID, FID, TID, LNUM, NNUM, KVSETID, WTYPE, WLAST)—referred to as a stream-mapping tuple—may be sent to the stream-mapping circuits 230. The stream-mapping circuits 230 may then respond with the stream ID for the storage subsystem 225 to use with the write command 250. To address the differences between heterogenous kvsets of KVDB base levels and homogeneous kvsets of KVDB subsequent levels, the tuple values are adjusted based on the type of kvset. For example, the mixed KVS tree nature of heterogenous kvsets reduces or eliminates the meaning of TID in the tuple. To address this issue, the value of the TID in a heterogenous kvset may be set to a different value than a KVS tree identifier. In an example, the TID is set to the forest identifier (FID) (e.g., the TID is assigned the same value as the FID). In an example of using a KVS tree identifier, the TID is set to the TID of one KVS tree in the KVDB. In this example, the KVS tree selected to represent the heterogenous kvset is always the same KVS tree, this KVS tree representing all KVS trees in the heterogenous kvset. In an example, the TID is set to a constant value, such as zero. In an example, whatever value used for the TID in heterogenous kvset writes, is used consistently (e.g., is always used) for heterogeneous kvsets of the KVDB.

The stream-mapping circuits 230 may include an electronic hardware implemented controller 235, accessible stream ID (A-SID) table 240 and a selected stream ID (S-SID) table 245. The controller 235 is arranged to accept as input a stream-mapping tuple and respond with the stream ID. In an example, the controller 235 is configured to a plurality of storage devices 260 and 265 storing a plurality of KVDBs 205 and 210. The controller 235 is arranged to obtain (e.g., by configuration, querying, etc.) a configuration for accessible devices. The controller 235 is also arranged to configure the set of stability values TEMPSET, and for each value TEMP in TEMPSET configure a fraction, number, or other determiner of the number of streams on a given storage device to use for data classified by that value.

In an example, the controller 235 is arranged to obtain (e.g., receive via configuration, message, etc., retrieve from configuration device, firmware, etc.) a temperature assignment technique. The temperature assignment technique will be used to assign stability values to the write request 215 in this example. In an example, a stream-mapping tuple may include any one or more of DID, FID, TID, LNUM, NNUM, KVSETID, WTYPE or WLAST and be used as input to the temperature assignment technique executed by the controller 235 to select a stability value TEMP from the TEMPSET. In an example, a KVS tree scope is a collection of parameters for a write specific to the KVS tree component (e.g., kvset) being written. In an example, the KVS tree scope includes one or more of FID, TID, LNUM, NNUM, or KVSETID. Thus, in this example, the stream-mapping tuple may include components of the KVS tree scope as well as device specific or write specific components, such as DID, WLAST, or WTYPE. In an example, a stability, or temperature, scope tuple TSCOPE is derived from the stream-mapping tuple. The following are example constituent KVS tree scope components that may be used to create TSCOPE:

A) TSCOPE computed as (FID, TID, LNUM);
B) TSCOPE computed as (LNUM);
C) TSCOPE computed as (TID);
D) TSCOPE computed as (TID, LNUM); or
E) TSCOPE computed as (TID, LNUM, NNUM).

In an example, the controller 235 may implement a static temperature assignment technique. The static temperature assignment technique may read the selected TEMP, for example, from a configuration file, database, KVDB or KVS tree meta data, or other database, including metadata stored in the KVDB FID or KVS tree TID. In this example, these data sources include mappings from the TSCOPE to a stability value. In an example, the mapping may be cached (e.g., upon controller 235's activation or dynamically during later operation) to speed the assignment of stability values as write requests arrive.

In an example, the controller 235 may implement a dynamic temperature assignment technique. The dynamic temperature assignment technique may compute the selected TEMP based on a frequency with which kvsets are written to TSCOPE. For example, the frequency with which the controller 235 executes the temperature assignment technique for a given TSCOPE may be measured and clustered around TEMPS in TEMPSET. Thus, such a computation may, for example, define a set of frequency ranges and a mapping from each frequency range to a stability value so that the value of TEMP is determined by the frequency range containing the frequency with which kvsets are written to TSCOPE.

The controller 235 is arranged to obtain (e.g., receive via configuration, message, etc., retrieve from configuration device, firmware, etc.) a stream assignment technique. The stream assignment technique will consume the KVDB 205 (or KVS tree contained therein) aspects of the write 215 as well as the stability value (e.g., from the temperature assignment) to produce the stream ID. In an example, controller 235 may use the stream-mapping tuple (e.g., including KVS tree scope) in the stream assignment technique to select the stream ID. In an example, any one or more of DID, FID, TID, LNUM, NNUM, KVSETID, WTYPE or WLAST along with the stability value may be used in the stream assignment technique executed by the controller 235 to select the stream ID. In an example, a stream-scope tuple SSCOPE is derived from the stream-mapping tuple. The following are example constituent KVS tree scope components that may be used to create SSCOPE:

A) SSCOPE computed as (FID, TID, LNUM, NNUM)
B) SSCOPE computed as (KVSETID)
C) SSCOPE computed as (TID)
D) SSCOPE computed as (TID, LNUM)
E) SSCOPE computed as (TID, LNUM, NNUM)
F) SSCOPE computed as (LNUM)

The controller 235 may be arranged to, prior to accepting inputs, initialize the A-SID table 240 and the S-SID table 245. A-SID table 240 is a data structure (table, dictionary, etc.) that may store entries for tuples (DID, TEMP, SID) and may retrieve such entries with specified values for DID and TEMP. The notation A-SID(DID, TEMP) refers to all entries in A-SID table 240, if any, with the specified values for DID and TEMP. In an example, the A-SID table 240 may be initialized for each configured storage device 260 and 265 and temperature value in TEMPSET. The A-SID table 240 initialization may proceed as follows: For each configured storage device DID, the controller 235 may be arranged to:

A) Obtain the number of streams available on DID, referred to as SCOUNT;
B) Obtain a unique SID for each of the SCOUNT streams on DID; and
C) For each value TEMP in TEMPSET:
a) Compute how many of the SCOUNT streams to use for data classified by TEMP in accordance with the configured determiner for TEMP, referred to as TCOUNT; and
b) Select TCOUNT SIDs for DID not yet entered in the A-SID table 240 and, for each selected TCOUNT SID for DID, create one entry (e.g., row) in A-SID table 240 for (DID, TEMP, SID).

Thus, once initialized, the A-SID table 240 includes an entry for each configured storage device DID and value TEMP in TEMPSET assigned a unique SID. The technique for obtaining the number of streams available for a configured storage device 260 and a usable SID for each differs by storage device interface, however, these are readily accessible via the interfaces of multi-stream storage devices The S-SID table 245 maintains a record of streams already in use (e.g., already a part of a given write). S-SID table 245 is a data structure (table, dictionary, etc.) that may store entries for tuples (DID, TEMP, SSCOPE, SID, Timestamp) and may retrieve or delete such entries with specified values for DID, TEMP, and optionally SSCOPE. The notation S-SID(DID, TEMP) refers to all entries in S-SID table 245, if any, with the specified values for DID and TEMP. Like the A-SID table 240, the S-SID table 245 may be initialized by the controller 235. In an example, the controller 235 is arranged to initialize the S-SID table 245 for each configured storage device 260 and 265 and temperature value in TEMPSET.

As noted above, the entries in S-SID table 245 represent currently, or already, assigned streams for write operations. Thus, generally, the S-SID table 245 is empty after initiation, entries being created by the controller 235 as stream IDs are assigned.

In an example, the controller 235 may implement a static stream assignment technique. The static stream assignment technique selects the same stream ID for a given DID, TEMP, and SSCOPE. In an example, the static stream assignment technique may determine whether S-SID(DID, TEMP) has an entry for SSCOPE. If there is no conforming entry, the static stream assignment technique selects a stream ID SID from A-SID(DID, TEMP) and creates an entry in S-SID table 245 for (DID, TEMP, SSCOPE, SID, timestamp), where timestamp is the current time after the selection. In an example, the selection from A-SID(DID, TEMP) is random, or the result of a round-robin process. Once the entry from S-SID table 245 is either found or created, the stream ID SID is returned to the storage subsystem 225. In an example, if WLAST is true, the entry in S-SID table 245 for (DID, TEMP, SSCOPE) is deleted. This last example demonstrates the usefulness of having WLAST to signal the completion of a write 215 for a kvset or the like that would be known to the tree 205 but not to the storage subsystem 225.

In an example, the controller 235 may implement a least recently used (LRU) stream assignment technique. The LRU stream assignment technique selects the same stream ID for a given DID, TEMP, and SSCOPE within a relatively small time interval. In an example, the LRU assignment technique determines whether S-SID(DID, TEMP) has an entry for SSCOPE. If the entry exists, the LRU assignment technique then selects the stream ID in this entry and sets the timestamp in this entry in S-SID table 245 to the current time.

If the SSCOPE entry is not in S-SID(DID, TEMP), the LRU stream assignment technique determines whether the number of entries S-SID(DID, TEMP) equals the number of entries A-SID(DID, TEMP). If this is true, then the LRU assignment technique selects the stream ID SID from the entry in S-SID(DID, TEMP) with the oldest timestamp. Here, the entry in S-SID table 245 is replaced with the new entry (DID, TEMP, SSCOPE, SID, timestamp) where timestamp is the current time after the selection.

If there are fewer S-SSID(DID, TEMP) entries than A-SID(DID, TEMP) entries, the technique selects a stream ID SID from A-SID(DID, TEMP) such that there is no entry in S-SID(DID, TEMP) with the selected stream ID and creates an entry in S-SID table 245 for (DID, TEMP, SSCOPE, SID, timestamp) where timestamp is the current time after the selection.

Once the entry from S-SID table 245 is either found or created, the stream ID SID is returned to the storage subsystem 225. In an example, if WLAST is true, the entry in S-SID table 245 for (DID, TEMP, SSCOPE) is deleted.

In operation, the controller 235 is configured to assign a stability value for a given stream-mapping tuple received as part of the write request 215. Once the stability value is determined, the controller 235 is arranged to assign the SID. The temperature assignment and stream assignment techniques may each reference and update the A-SID table 240 and the S-SID table 245. In an example, the controller 235 is also arranged to provide the SID to a requester, such as the storage subsystem 225.

Using the stream ID based on the KVS tree scope permits like data to be colocated in erase blocks 270 on multi-stream storage device 260. This reduces garbage collection on the device and thus may increase device performance and longevity. This benefit may be extended to multiple KVS trees. KVS trees may be used in a forest, or grove, whereby several KVS trees are used to implement a single structure, such as a file system. For example, one KVS tree may use block number as the key and bits in the block as a value while a second KVS tree may use file path as the key and a list of block numbers as the value. In this example, it is likely that kvsets for a given file referenced by path and the kvsets holding the block numbers have similar lifetimes. Thus the inclusion of FID above. The KVS trees in the KVDB may or may not be related. Thus, a KVS tree scope for stream assignment may be appropriate even in the combined context of a KVDB. However, using the FID as a KVDB identifier allows stream assignment to work similarly in KVDBs or in KVS tree collections that do not share a common root system.

The structure and techniques described above provide a number of advantages in systems implementing KVDBs and storage devices such as flash storage devices. In an example, a computing system implementing several KVDBs stored on one or more storage devices may use knowledge of the KVDB (or KVS trees contained therein) to more efficiently select streams in multi-stream storage devices. For example, the system may be configured so that the number of concurrent write operations (e.g., ingest or compaction) is restricted based on the number of streams on any given storage device that are reserved for the temperature classifications assigned to kvset data written by these write operations. This is possible because, within a kvset, the life expectancy of that data is the same because kvsets are written and deleted in their entirety. As noted elsewhere, keys and values may be separated. Thus, a key write for a kvset will have a single life-time, which is likely shorter than value life-times when, for example, key compaction is performed as discussed below. Additionally, tree-level appears to be a strong indication of data life-time; the older data, and thus greater (e.g., deeper) tree-level, having a longer life-time than younger data at higher tree-levels.

The following scenario may further elucidate the operation of the stream-mapping circuits 230 to restrict writes, consider:
A) Temperature values {HOT, COLD}, with H streams on a given storage device used for data classified as HOT, and C streams on a given storage device used for data classified as COLD.
B) A temperature assignment method configured with TSCOPE computed as (LNUM) whereby data written to a base level 0 in any KVDB is assigned a temperature value of HOT, and data written to L1 or greater in any KVDB is assigned a temperature value of COLD.
C) An LRU stream assignment method configured with SSCOPE computed as (TID, LNUM), where TID is a KVS tree identifier in subsequent levels and configured as noted above in base levels (e.g., with heterogenous kvsets).
In this case, the total number of concurrent ingest and compaction operations—operations producing a write—for all KVDBs follows these conditions: concurrent ingest operations for all KVDBs is at most H—because the data for all ingest operations is written to level 0 in the KVDB and hence will be classified as HOT—and concurrent compaction operations is at most C—because the data for all spill compactions, and the majority of other compaction operations, is written to level 1 or greater and hence will be classified as COLD.

Other such restrictions are possible and may be advantageous depending on certain implementation details of the KVDB and controller 235. For example, given controller 235 configured as above, it may be advantageous for the number of ingest operations to be a fraction of H (e.g., one-half) and the number of compaction operations to be a fraction of C (e.g., three-fourths) because LRU stream assignment with SSCOPE computed as (TID, LNUM) may not take advantage of WLAST in a stream-mapping tuple to remove unneeded S-SID table 245 entries upon receiving the last write for a given KVSET in TID, resulting in a suboptimal SID selection.

Although the operation of the stream-mapping circuits 230 are described above in the context of KVDBs and KVS trees, other structures, such as LSM tree implementations, may equally benefit from the concepts presented herein. Many LSM Tree variants store collections of key-value pairs and tombstones whereby a given collection may be created by an ingest operation or garbage collection operation (often referred to as a compaction or merge operation), and then later deleted in whole as the result of a subsequent ingest operation or garbage collection operation. Hence the data comprising such a collection has a similar lifetime, like the data comprising a kvset in a KVS tree. Thus, a tuple similar to the stream-mapping tuple above, may be defined for most other LSM Tree variants, where the KVSETID may be replaced by a unique identifier for the collection of key-value pairs or tombstones created by an ingest operation or garbage collection operation in a given LSM Tree variant. The stream-mapping circuits 230 may then be used as described to select stream identifiers for the plurality of write commands used to store the data comprising such a collection of key-value pairs and tombstones.

FIG. 3 illustrates an example of a method 300 to facilitate writing to a multi-stream storage device, according to an embodiment. The operations of the method 300 are implemented with electronic hardware, such as that described throughout at this application, including below with respect to FIG. 21 (e.g., circuits). The method 300 provides a number of examples to implement the discussion above with respect to FIG. 2.

At operation 305, notification of a KVS tree write request for a multi-stream storage device is received—for example, from an application, operating system, filesystem, etc. In an example, the notification includes a KVS tree scope corresponding to data in the write request. In an example, the KVS tree scope includes at least one of: a kvset ID corresponding to a kvset of the data; a node ID corresponding to a node of the KVS tree corresponding to the data; a level ID corresponding to a tree-level corresponding to the data; a TID for the KVS tree; a FID corresponding to the forest to which the KVS tree belongs; or a type corresponding to the data. In an example, the type is either a key-block type or a value-block type. As noted above, the FID may correspond to a KVDB to which the kvset belongs. In an example, the TID is set to a constant in a heterogeneous kvset. In an example, the TID is set to the FID in a heterogeneous kvset. In an example, the TID for multiple KVS trees is the TID for one selected KVS tree in the KVDB for heterogeneous kvsets. Here, the selected TID does not change for the lifetime of the KVDB (or at least while the KVDB holds any kvsets).

In an example, the notification includes a device ID for the multi-stream device. In an example, the notification includes a WLAST flag corresponding to a last write request in a sequence of write requests to write a kvset, identified by the kvset ID, to the multi-stream storage device.

At operation 310, a stream identifier (ID) is assigned to the write request based on the KVS tree scope and a stability value of the write request. In an example, assigning the stability value includes: maintaining a set of frequencies of stability value assignments for a level ID corresponding to a tree-level, each member of the set of frequencies corresponding to a unique level ID; retrieving a frequency from the set of frequencies that corresponds to a level ID in the KVS tree scope; and selecting a stability value from a mapping of stability values to frequency ranges based on the frequency.

In an example, assigning the stream ID to the write request based on the KVS tree scope and the stability value of the write request includes creating a stream-scope value from the KVS tree scope. In an example, the stream-scope value includes a level ID for the data. In an example, the stream-scope value includes a tree ID for the data. In an example, the stream-scope value includes a level ID for the data. In an example, the stream-scope value includes a node ID for the data. In an example, the stream-scope value includes a kvset ID for the data.

In an example, assigning the stream ID to the write request based on the KVS tree scope and the stability value of the write request also includes performing a lookup in a selected-stream data structure using the stream-scope value. In an example, performing the lookup in the selected-stream data structure includes: failing to find the stream-scope value in the selected-stream data structure; performing a lookup on an available-stream data structure using the stability value; receiving a result of the lookup that includes a stream ID; and adding an entry to the selected-stream data structure that includes the stream ID, the stream-scope value, and a timestamp of a time when the entry is added. In an example, multiple entries of the available-stream data structure correspond to the stability value, and wherein the result of the lookup is at least one of a round-robin or random selection of an entry from the multiple entries. In an example, the available-stream data structure may be initialized by: obtaining a number of streams available from the multi-stream storage device; obtain a stream ID for all streams available from the multi-stream storage device, each stream ID being unique; add stream IDs to stability value groups; and creating a record in the available-stream data structure for each stream ID, the record including the stream ID, a device ID for the multi-stream storage device, and a stability value corresponding to a stability value group of the stream ID.

In an example, performing the lookup in the selected-stream data structure includes: failing to find the stream-scope value in the selected-stream data structure; locating a stream ID from either the selected-stream data structure or an available-stream data structure based on the contents of the selected stream data structure; and creating an entry to the selected-stream data structure that includes the stream ID, the stream-scope value, and a timestamp of a time when the entry is added. In an example, locating the stream ID from either the selected-stream data structure or an available-stream data structure based on the contents of the selected stream data structure includes: comparing a first number of entries from the selected-stream data structure to a second number of entries from the available-stream data structure to determine that the first number of entries and the second number of entries are equal; locating a group of entries from the selected-stream data structure that correspond to the stability value; and returning a stream ID of an entry in the group of entries that has the oldest timestamp. In an example, locating the stream ID from either the selected-stream data structure or an available-stream data structure based on the contents of the selected stream data structure includes: comparing a first number of entries from the selected-stream data structure to a second number of entries from the available-stream data structure to determine that the first number of entries and the second number of entries are not equal; performing a lookup on the available-stream data structure using the stability value and stream IDs in entries of the selected-stream data structure; receiving a result of the lookup that includes a stream ID that is not in the entries of the selected-stream data structure; and adding an entry to the selected-stream data structure that includes the stream ID, the stream-scope value, and a timestamp of a time when the entry is added.

In an example, assigning the stream ID to the write request based on the KVS tree scope and the stability value of the write request also includes returning (e.g., providing to a calling application) a stream ID corresponding to the stream-scope from the selected-stream data structure. In an example, returning the stream ID corresponding to the stream-scope from the selected-stream data structure includes updating a timestamp for an entry in the selected-stream data structure corresponding to the stream ID. In an example, the write request includes a WLAST flag, and wherein returning the stream ID corresponding to the stream-scope from the selected-stream data structure includes removing an entry from the selected-stream data structure corresponding to the stream ID.

In an example, the method 300 may be extended to include removing entries from the selected-stream data structure with a timestamp beyond a threshold.

At operation 315, the stream ID is returned to govern stream assignment to the write request, with the stream assignment modifying a write operation of the multi-stream storage device.

In an example, the method 300 may be optionally extended to include assigning the stability value based on the KVS tree scope. In an example, the stability value is one of a predefined set of stability values. In an example, the predefined set of stability values includes HOT, WARM, and COLD, wherein HOT indicates a lowest expected lifetime of the data on the multi-stream storage device and COLD indicates a highest expected lifetime of the data on the multi-stream storage device.

In an example, assigning the stability value includes locating the stability value from a data structure using a portion of the KVS tree scope. In an example, the portion of the KVS tree scope includes a level ID for the data. In an example, the portion of the KVS tree scope includes a type for the data.

In an example, the portion of the KVS tree scope includes a tree ID for the data. In an example, the portion of the KVS tree scope includes a level ID for the data. In an example, the portion of the KVS tree scope includes a node ID for the data.

Figure 4:
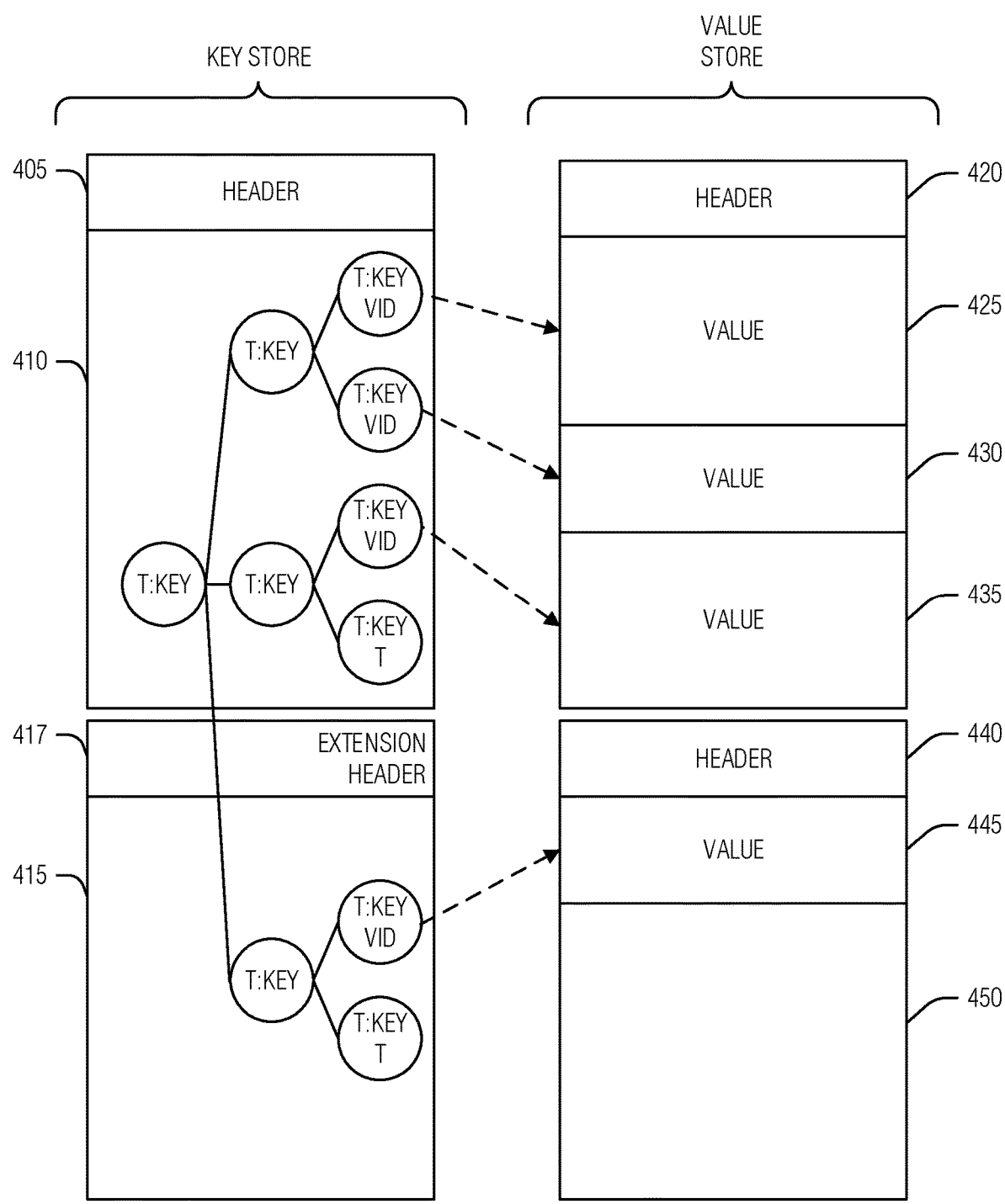
FIG. 4 is a block diagram illustrating an example of a storage organization for keys and values, according to an embodiment.

FIG. 4 is a block diagram illustrating an example of a storage organization for keys and values, according to an embodiment. A kvset may be stored using key-blocks to hold keys (along with tombstones as needed) and value-blocks to hold values. For a given kvset, the key-blocks may also contain indexes and other information (such as bloom filters) for efficiently locating a single key, locating a range of keys, or generating the total ordering of all keys in the kvset, including key tombstones, and for obtaining the values associated with those keys, if any.

A single kvset is represented in FIG. 4. The key-blocks include a primary key block 410 that includes header 405 and an extension key-block 415 that includes an extension header 417. The value blocks include headers 420 and 440 respectively as well as values 425, 430, 435, and 445. The second value block also includes free space 450.

A tree representation for the kvset is illustrated to span the key-blocks 410 and 415. In this illustration, the leaf nodes contain value references (VID) to the values 425, 430, 435, and 445, and two keys with tombstones. This illustrates that, in an example, the tombstone does not have a corresponding value in a value block, even though it may be referred to as a type of key-value pair.

The illustration of the value blocks demonstrates that each may have a header and values that run next to each other without delineation. The reference to particular bits in the value block for a value, such as value 425, are generally stored in the corresponding key entry, for example, in an offset and extent format.

Figure 5:
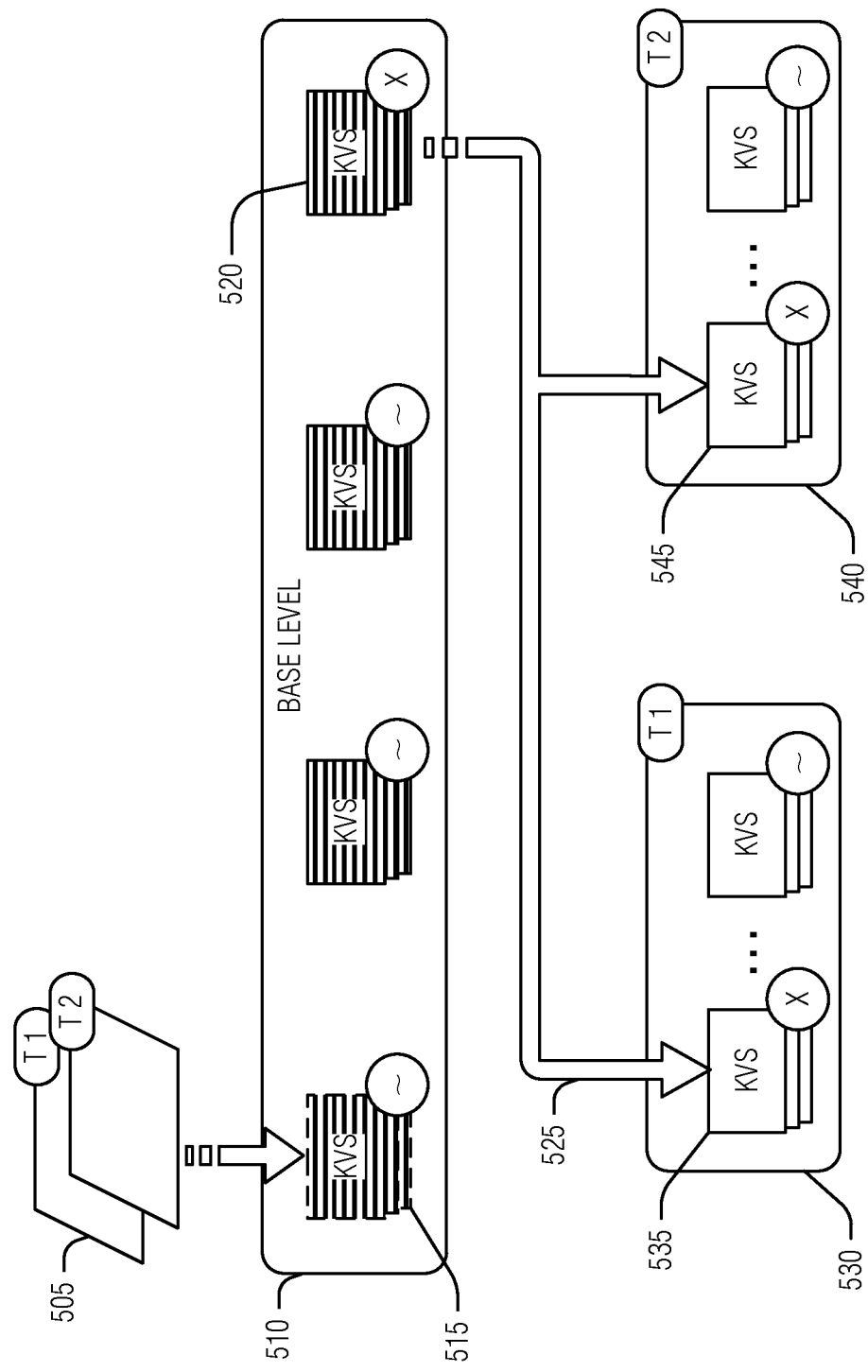
FIG. 5 is a block diagram illustrating KVS tree database ingestion, according to an embodiment.

FIG. 5 is a block diagram illustrating KVDB ingestion, according to an embodiment. In a KVDB, like a KVS tree, the process of writing a new kvset to the base level 510 is referred to as an ingest. Key-value pairs 505 (including tombstones) are accumulated in the base level 510 (which may begin in-memory) of the KVDB, and are organized into kvsets ordered from newest 515 to oldest 520.

When the base level fills (e.g., with entries), the spill 525 writes the key-value pairs and tombstones in the oldest kvset 520 in the base level node 510 to a new (and the newest) kvset 535 in a subsequent level node 530 or 540 of the KVDB, and then deletes that kvset 520 from the base level 510. Within the base level, a similar form of spilling from an in-memory node to a block addressable node may occur. In this instance, the procedure remains the same except for the determinative mapping. Where there is a single in-memory node and a single root block addressable node, the determinative mapping simply points from the in-memory node to the root block addressable node. If there are multiple block addressable root nodes, a determinative mapping different than that used between the base level and subsequent levels may be used.

Differing from KVS tree operation, kvsets in the base level node 510, are heterogeneous, containing entries (e.g., key-value pairs) from more than one KVS tree. As noted above, entries in heterogenous kvsets maintain an association with its KVS tree to, for example, permit multiple trees to have the same key (e.g., key uniques is determined by a combination of TID and key), and also to enable the first determinative mapping (e.g., illustrated by the spill 525) from the base level node 510 to a subsequent level node 530 or 540 base on KVS tree association (e.g., KVS tree T1 or T2 indicated by the badges on nodes 530 and 540 respectively). Thus, the TID permits a spill from heterogeneous kvset 520 to homogeneous kvsets 535 and 545.

Figure 6:
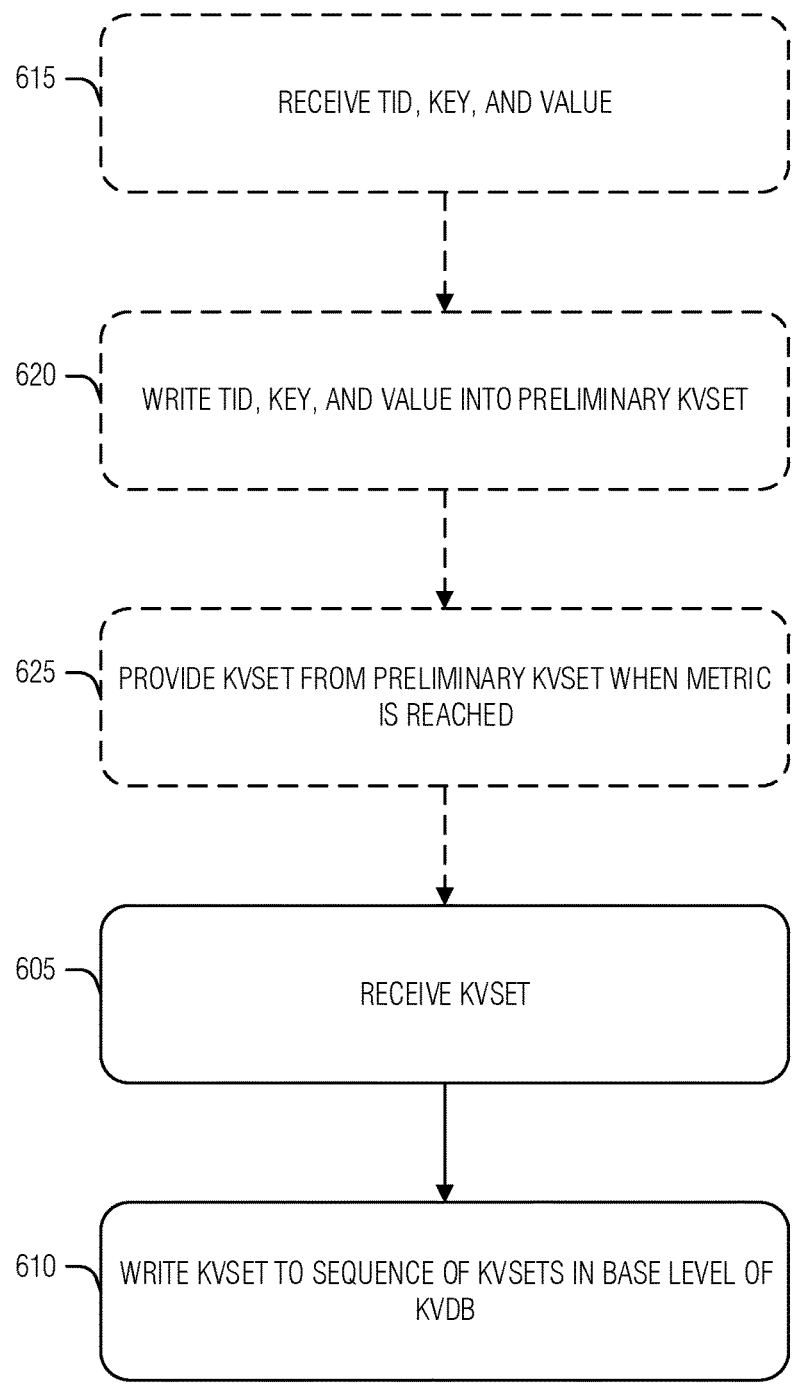
FIG. 6 illustrates an example of a method for KVS tree ingestion, according to an embodiment.

FIG. 6 illustrates an example of a method 600 for KVDB ingestion, according to an embodiment. The operations of the method 600 are implemented with electronic hardware, such as that described throughout at this application, including below with respect to FIG. 21 (e.g., circuits).

At operation 605, a kvset is received to store in a KVDB. Here, the KVDB is organized as a tree of KVS trees with a common root system. The kvset includes a mapping of unique keys to values for multiple KVS trees at the base level of the KVDB. The keys and the values of the kvset are immutable and nodes of the tree have a temporally ordered sequence of kvsets.

In an example, when a kvset is written to the at least one storage medium, the kvset is immutable. In an example, key entries of the kvset are stored in a set of key-blocks that include a primary key-block and zero or more extension key-blocks. Here, members of the set of key-blocks correspond to media blocks for the at least one storage medium with each key-block including a header to identify it as a key-block.

In an example, the primary key-block includes a list of media block identifications for the one or more extension key-blocks of the kvset. In an example, the primary key-block includes a list of media block identifications for value-blocks in the set of value blocks. In an example, the primary key-block includes a copy of a lowest key in a key-tree of the kvset, the lowest key determined by a pre-set sort-order of the tree. In an example, the primary key-block includes a copy of a highest key in a key-tree of the kvset, the highest key determined by a pre-set sort-order of the tree. In an example, the primary key-block includes a header to a key-tree of the kvset. In an example, the primary key-block includes a list of media block identifications for a key-tree of the kvset. In an example, the primary key-block includes a bloom filter header for a bloom filter of the kvset. In an example, the primary key-block includes a list of media block identifications for a bloom filter of the kvset.

In an example, values are stored in a set of value-blocks operation 605. Here, members of the set of value-blocks corresponding to media blocks for the at least one storage medium with each value-block including a header to identify it as a value-block. In an example, a value block includes storage section to one or more values without separation between values.

In an example, the primary key-block includes a set of metrics for the kvset. In an example, the set of metrics include a total number of keys stored in the kvset. In an example, the set of metrics include a number of keys with tombstone values stored in the kvset. In an example, the set of metrics include a sum of all key lengths for keys stored in the kvset. In an example, the set of metrics include a sum of all value lengths for keys stored in the kvset. In an example, the set of metrics include an amount of unreferenced data in value-blocks of the kvset.

At operation 610, the kvset is written to a sequence of kvsets of a base level of the KVDB.

The method 600 may be extended to include operations 615-625.

At operation 615, a TID, a key and a corresponding value to store in the key-value data structure are received (e.g., from a caller).

At operation 620, the TID, key, and value are placed in a preliminary kvset, the preliminary kvset being mutable. In an example, a rate of writing to the first base level node (operation 610) is beyond a threshold. In this example, the method 600 may be extended to throttle write requests to the KVDB. Here, throttling may include delaying a return or acknowledgment to the caller.

At operation 625, the kvset is written to another node in the KVDB when a metric is reached. In an example, the metric is a size of the first base level node. In an example, the metric is an elapsed time.

Once ingestion has occurred, a variety of maintenance operations may be employed to maintain the KVDB or KVS trees contained therein. For example, if a key is written at one time with a first value and at a later time with a second value, removing the first key-value pair will free up space or reduce search times. To address some of these issues, KVDBs may use compaction. Details of several compaction operations are discussed below with respect to FIGS. 7-16. The illustrated compaction operations are forms of garbage collection because they may remove obsolete data, such as keys or key-value pairs during the merge.

Compaction occurs under a variety of triggering conditions, such as when the kvsets in a node meet specified or computed criteria. Examples of such compaction criteria include the total size of the kvsets or the amount of garbage in the kvsets. One example of garbage in kvsets is key-value pairs or tombstones in one kvset rendered obsolete, for example, by a key-value pair or tombstone in a newer kvset, or a key-value pair that has violated a time-to-live constraint, among others. Another example of garbage in kvsets is unreferenced data in value-blocks (unreferenced values) resulting from key compactions.

Generally, the inputs to a compaction operation are some or all of the kvsets in a node at the time the compaction criteria are met. These kvsets are called a merge set and comprise a temporally consecutive sequence of two or more kvsets.

As compaction is generally triggered when new data is ingested, the method 600 may be extended to support compaction, however, the following operations may also be triggered when, for example, there are free processing resources, or other convenient scenarios to perform the maintenance. Thus, the KVDB may be compacted. In an example, the compacting is performed in response to a trigger. In an example, the trigger is an expiration of a time period.

In an example, the trigger is a metric of the node. In an example, the metric is a total size of kvsets of the node. In an example, the metric is a number of kvsets of the node. In an example, the metric is a total size of unreferenced values of the node. In an example, the metric is a number of unreferenced values.

Figure 7:
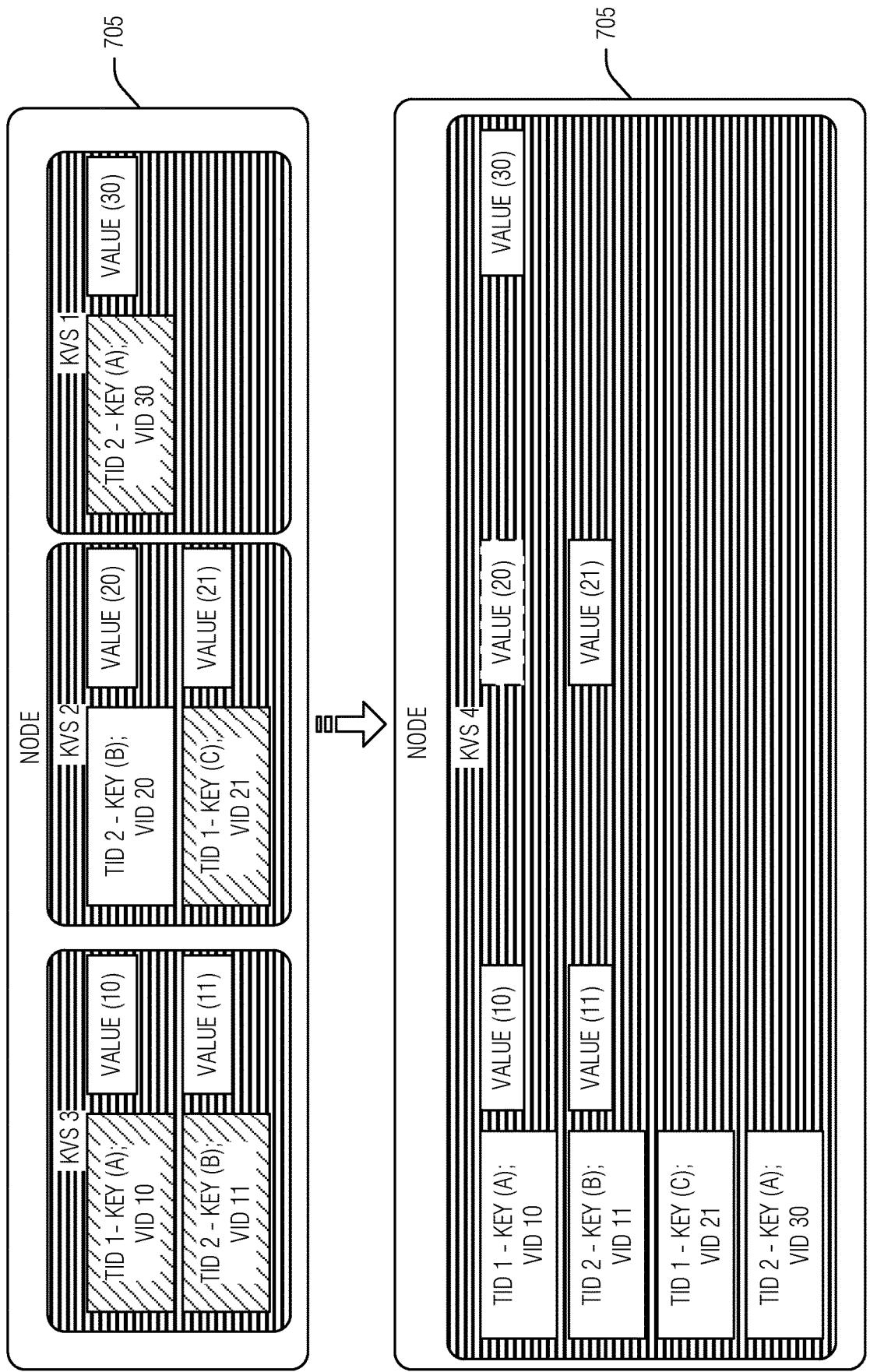
FIG. 7 is a block diagram illustrating key compaction, according to an embodiment.

FIG. 7 is a block diagram illustrating key compaction, according to an embodiment. Key compaction reads the keys and tombstones, but not values, from the merge set (e.g., combination of all kvsets being compacted), removes all obsolete keys or tombstones, writes the resulting keys and tombstones into one or more new kvsets (e.g., by writing into new key-blocks), deletes the key-stores, but not the values, from the node. The new kvsets atomically replace, and are logically equivalent to, the merge set both in content and in placement within the logical ordering of kvsets from newest to oldest in the node. In heterogeneous kvsets of KVDBs (e.g., kvsets in base level nodes), in contrast to homogeneous kvsets in subsequent level nodes, the TID of an entry is considered along with the key to determine obsolence or tombstone matching.

As illustrated, the heterogeneous kvsets KVS3 (the newest), KVS2, and KVS1 (the oldest) undergo key compaction for the node 705. As the key-stores for these kvsets are merged, a collision on key B occurs, but not key A because key A exists once in two different KVS trees (denoted by TID 1 and TID 2) while key B exists twice in a single KVS tree (denoted by TID 2). As the new kvset, KVS4 (illustrated in the lower version of node 705), may only contain one of each merged key when the TID is also considered, the collision is resolved in favor of the most recent (the leftmost as illustrated) keys, referring to value ID 11 for key B. Keys A and C have no collisions and so are included in the new kvset KVS4. To illustrate, the key entries that will be part of the new kvset, KVS4, are shaded in the top node.

For illustrative purposes, KVS4 is drawn to span KVS1, KVS2, and KVS3 in the node 705 and the value entries are drawn in a similar location in the node 705. The purpose of these positions demonstrates that the values are not changed in a key compaction, but rather only the keys are changed. As explained below, this provides a more efficient search by reducing the number of kvsets searched in any given node and may also provide valuable insights to direct maintenance operations. Also note that the value 20 is illustrated with a dashed line, denoting that it persists in the node but is no longer referenced by a key entry as its respective key entry was removed in the compaction.

Key compaction is non-blocking as a new kvset (e.g., KVS5) may be placed in the newest position (e.g., to the left) of KVS3 or KVS4 during the compaction because, by definition, the added kvset will be logically newer than the kvset resulting from the key compaction (e.g., KVS4).

Figure 8:
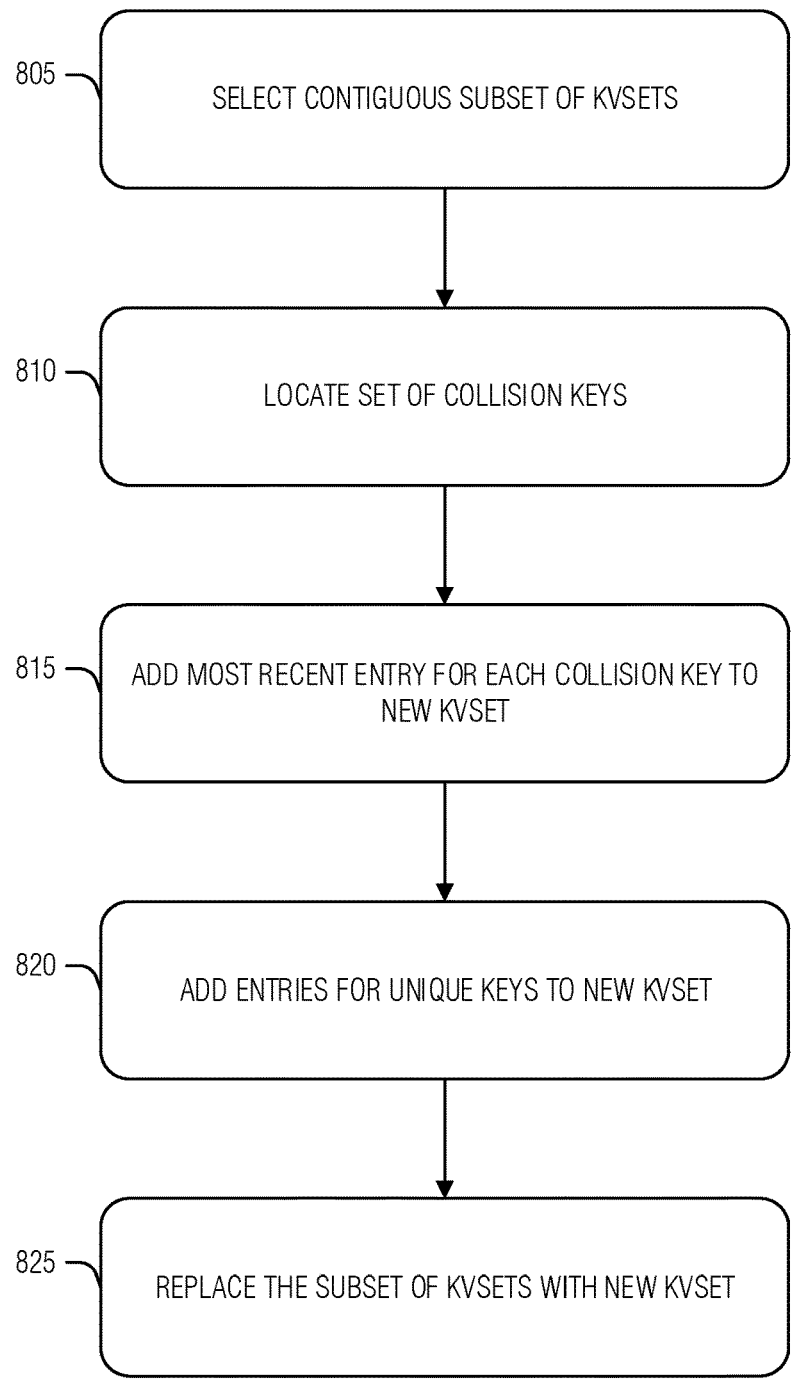
FIG. 8 illustrates an example of a method for key compaction, according to an embodiment.

FIG. 8 illustrates an example of a method 800 for key compaction, according to an embodiment. The operations of the method 800 are implemented with electronic hardware, such as that described throughout at this application, including below with respect to FIG. 21 (e.g., circuits).

At operation 805, a subset of kvsets from a sequence of kvsets for the node is selected. In an example, the subset of kvsets are contiguous kvsets and include an oldest kvset.

At operation 810, a set of collision keys is located. Members of the set of collision keys including key entries in at least two kvsets in the sequence of kvsets for the node. In a homogeneous kvset of a KVDB, collisions may be based solely on keys. In heterogeneous kvsets of the KVDB, collisions are based on a combination of key and TID, such that identical keys with identical TIDs are a collision while identical keys with different TIDs are not a collision.

At operation 815, a most recent key entry for each member of the set of collision keys is added to a new kvset. If the new kvset is a heterogenous kvset, the TID corresponding to the keys is also added to the new kvset. In an example, where the node has no child nodes, and where the subset of kvsets includes the oldest kvset, writing the most recent key entry for each member of the set of collision keys to the new kvset and writing entries for each key in members of the subset of kvsets that are not in the set of collision keys to the new kvset includes omitting any key entries that include a tombstone. In an example, where the node has no child nodes, and where the subset of kvsets includes the oldest kvset, writing the most recent key entry for each member of the set of collision keys to the new kvset and writing entries for each key in members of the subset of kvsets that are not in the set of collision keys to the new kvset includes omitting any key entries that are expired.

At operation 820, entries for each key in members of the subset of kvsets that are not in the set of collision keys are added to the new kvset. In an example, operation 820 and 815 may operate concurrently to add entries to the new kvset.

At operation 825, the subset of kvsets is replaced with the new kvset by writing the new kvset and removing (e.g., deleting, marking for deletion, etc.) the subset of kvsets.

Figure 9:
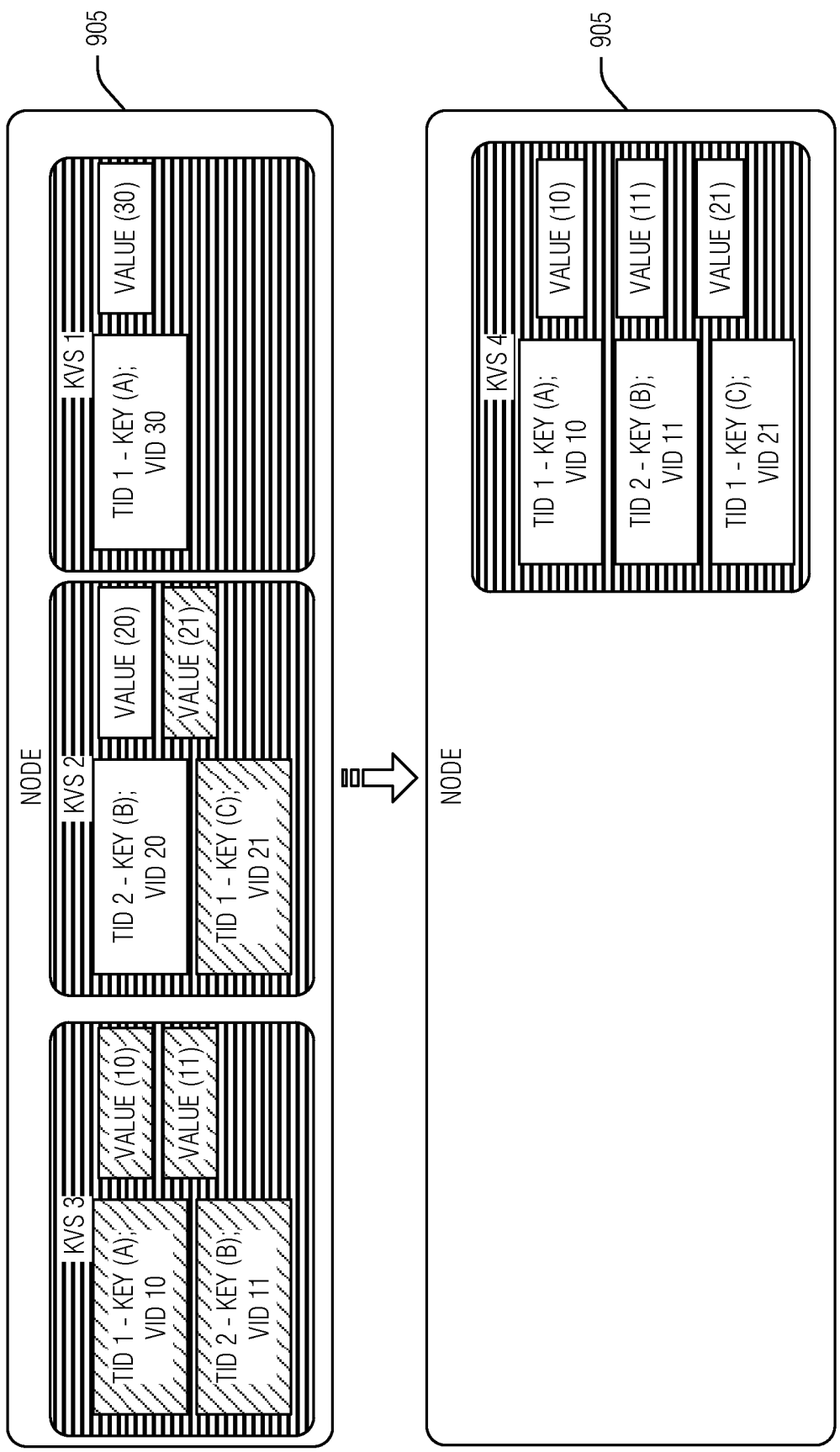
FIG. 9 is a block diagram illustrating key-value compaction, according to an embodiment.

FIG. 9 is a block diagram illustrating key-value compaction, according to an embodiment. Key value compaction differs from key compaction in its treatment of values. Key-value compaction reads the key-value pairs and tombstones from the merge set, removes obsolete key-value pairs or tombstones, writes the resulting key-value pairs and tombstones to one or more new kvsets in the same node 905, and deletes the kvsets comprising the merge set from the node 905. The new kvsets atomically replace, and are logically equivalent to, the merge set both in content and in placement within the logical ordering of kvsets from newest to oldest in the node 905. Again, in a heterogenous node (as is illustrated in FIG. 9), collisions are determined with a combination of TID and key.

As illustrated, kvsets KVS3, KVS2, and KVS1 comprise the merge set. The shaded key entries and values will be kept in the merge and placed in the new KVS4, written to the node 905 to replace KVS3, KVS2, and KVS1. Again, as illustrated above with respect to key compaction, the key collision for key B is resolved in favor of the most recent entry. What is different in key-value compaction from key compaction is the removal of the unreferenced values. Thus, here, KVS4 is illustrated to consume only the space used to hold its current keys and values.

In practice, for example, when keys and values are stored separately in key-block and value-blocks, KVS4 includes both new key-blocks (like the result of key compaction) and new value blocks (unlike the result of key compaction). Again, however, key-value compaction does not block writing additional kvsets to the node 905 while the key-value compaction is executing because the added kvsets will be logically newer than the KVS4, the result of the key-value compaction. Accordingly, KVS4 is illustrated in the oldest position (e.g., to the right) of the node 905.

Figure 10:
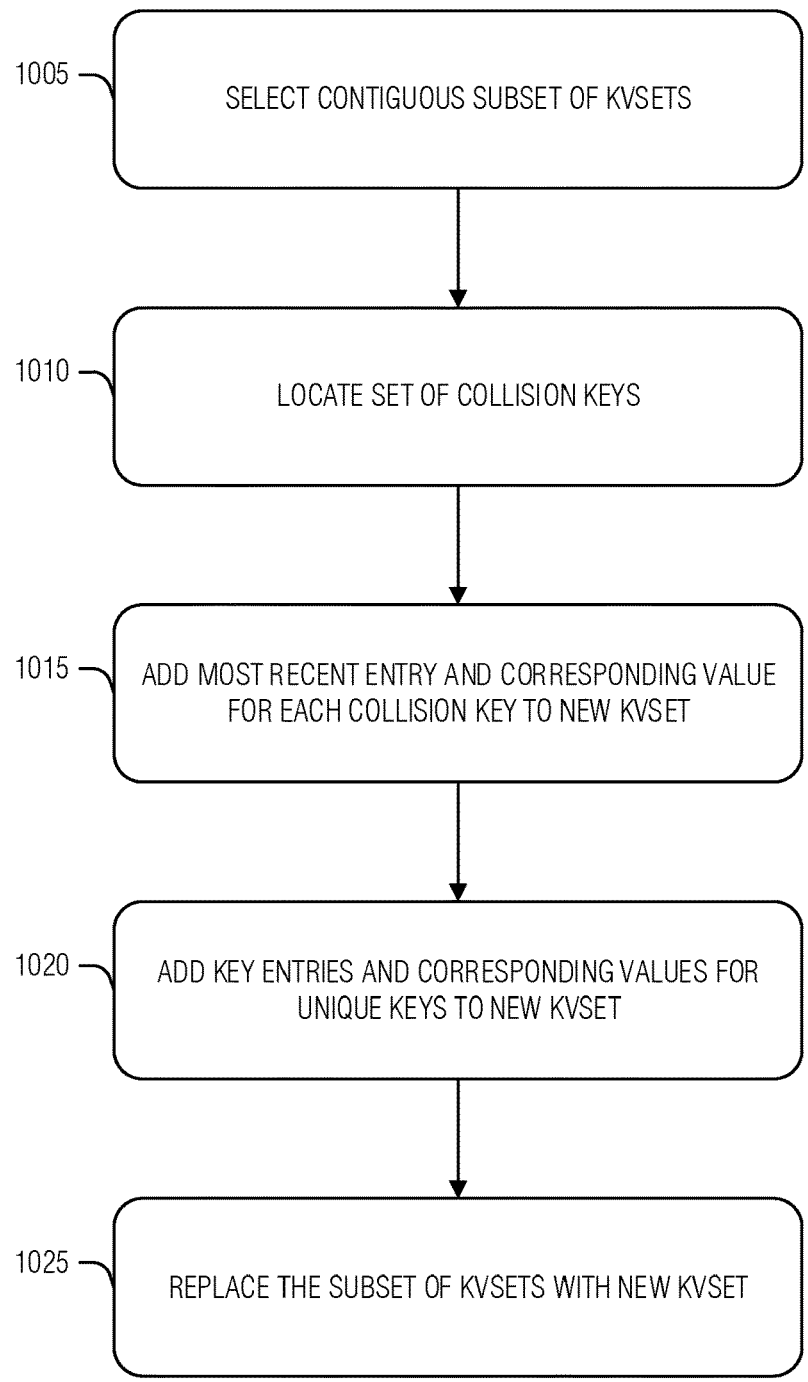
FIG. 10 illustrates an example of a method for key-value compaction, according to an embodiment.

FIG. 10 illustrates an example of a method 1000 for key-value compaction, according to an embodiment. The operations of the method 1000 are implemented with electronic hardware, such as that described throughout at this application, including below with respect to FIG. 21 (e.g., circuits).

At operation 1005, a subset of kvsets (e.g., a merge set) from a sequence of kvsets for the node is selected. In an example, the subset of kvsets are contiguous kvsets and include an oldest kvset.

At operation 1010, a set of collision keys is located. Members of the set of collision keys including key entries in at least two kvsets in the sequence of kvsets for the node. In heterogeneous kvsets, collision keys are a matching combination of key and TID, while in homogeneous kvsets, collisions are matching keys alone.

At operation 1015, a most recent key entry, and corresponding value, for each member of the set of collision keys is added to a new kvset. In an example, where the node has no child nodes, and where the merge set contains the oldest kvset, writing the most recent key entry for each member of the set of collision keys to the new kvset and writing entries for each key in members of the subset of kvsets that are not in the set of collision keys to the new kvset includes omitting any key entries that include a tombstone. In an example, where the node has no child nodes, and where the merge set contains the oldest kvset, writing the most recent key entry for each member of the set of collision keys to the new kvset and writing entries for each key in members of the subset of kvsets that are not in the set of collision keys to the new kvset includes omitting any key entries that are expired.

At operation 1020, entries for each key, and value, in members of the subset of kvsets that are not in the set of collision keys are added to the new kvset.

At operation 1025, the subset of kvsets is replaced with the new kvset by writing the new kvset (e.g., to storage) and removing the subset of kvsets.

Spill and hoist compactions, discussed below with respect to FIGS. 13-16 are a form of key-value compaction where the resultant kvsets are placed in a child node or a parent node respectively. As each traverses the KVDB, and the KVDB enforces a determinative mapping between parent nodes and child nodes, a brief discussion of this determinative mapping is here presented before discussing these other compaction operations.

Figure 11:
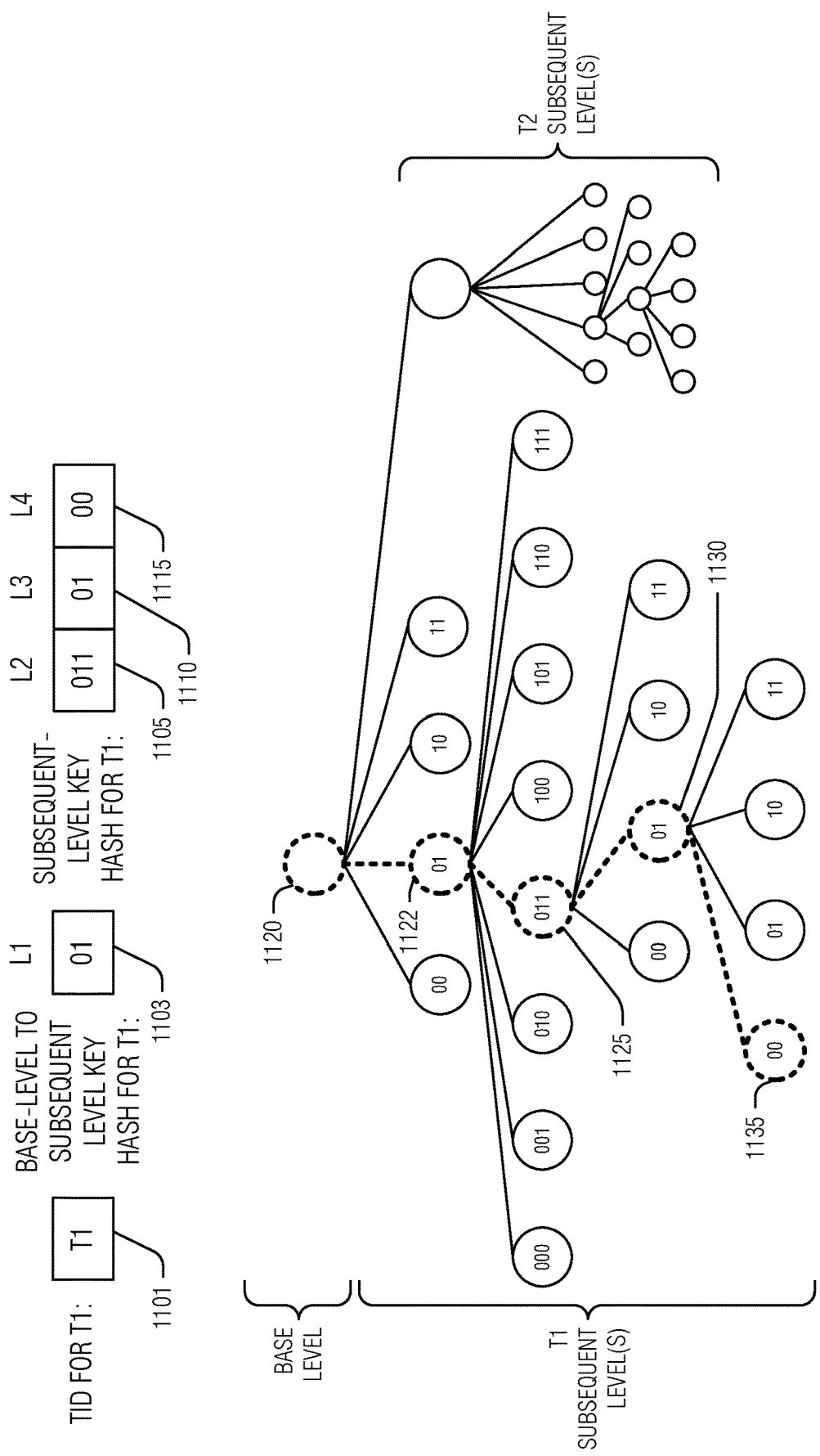
FIG. 11 illustrates an example of a spill value and its relation to a tree database, according to an embodiment.

FIG. 11 illustrates an example of a spill value and its relation to a KVDB, according to an embodiment. As noted above, KVDBs include a first determinative mapping between a base level and a subsequent level, a second determinative mapping between subsequent levels, and possibly a third determinative mapping between base levels. The determinative mappings ensure that, given a KVS tree and a key, one may know which KVDB node a key-value pair will be mapped to without regard to the KVDB's contents. A respective spill function accepts a key and produces a respective spill value corresponding to the determinative mappings for the KVDB. In an example, the spill function accepts both the key and a current tree-level and produces a spill value specific to a parent or a child node for the key at that tree-level.

By way of explanation, a simple determinative mapping (not illustrated in FIG. 11) may include, for example, an alphabetical mapping where, for keys composed of alphabet characters, each tree-level includes a child for each letter of the alphabet, and the mapping uses the characters of the keys in turn; such as the first character determines the L1 child, the second character determines the L2 child, and so one. For the first determinative mapping, the TID may be prepended to the keys. While simple and meeting the determinative mapping of the KVDB, this technique suffers somewhat from rigidity, poor balance in the KVDB, and a lack of control over fanning.

A better technique is to perform a hash on the keys and designate portions of the hash for each tree-level mapping. This ensures that the keys are evenly spread (assuming an adequate hash technique) as they traverse the KVDB and that fan-out is controlled by selecting the size of the hash portions for any given tree-level. Further, as hash techniques generally allow the size of the resultant hash to be configured, an adequate number of bits, for example, may be ensured, avoiding a problem with the simple technique discussed above, where a short word (such as "the") has only enough characters for a three level tree. Again, TID may be added to keys prior to hashing to create the first determinative mapping. In an example, the TID is used to identify a set of child nodes and a hash of keys corresponding to those TIDs selecting to which of the set of child nodes a given entry maps.

FIG. 11 illustrates a result of a subsequent level key hash with portions 1103, 1105, 1110, and 1115 respectively corresponding to L1, L2, L3, and L4 of the tree T1 (with TID 1101). As illustrated, T2 has a single subsequent level node to accept a base level to subsequent level transition. Accordingly, the TID 1101 of T2 is determinative for a key-value entry transitioning from the base level to the T2 subsequent levels. Thus, an L1 portion 1103 analog for T2 is not needed (e.g., is not used). With the given key hashes and TID 1101, a traversal of the KVDB proceeds along the dashed lines and nodes. Specifically, starting at a base level node 1120, portion 1103 directs traversal of a T1 entry to node 1122 using the first determinative mapping (e.g., TID 1101 and the portion 1103). Then, the portion 1105 directs the T1 subsequent level traversal to node 1125 (e.g., using the second determinative mapping discussed herein). Next, portion 1110 directs the traversal to node 1130. The traversal completes as portion 1115 points toward node 1135 at the deepest level of the tree possible based on the size and apportionment of the illustrated key hash. Note, the second determinative mapping is KVS tree specific. Thus, the second determinative mapping for the T2 subsequent levels may differ from that for the T1 subsequent levels.

In an example, for a given key K, a hash of the key K (or a subkey of key K) is called the spill value for key K. Note that two different keys may have the same spill value. When sub keys are employed to generate the spill values, it is often desirable for this to occur to enable prefix scanning or tombstones as discussed below. Again, whether or not the TID is included in the spill value depends on the originating node. In an example, the TID is not used in spill values for either intra base level mapping, or intra subsequent level mapping, but is used in base level to subsequent level mapping.

In an example, for a given KVDB, the spill value for a given key K is a constant, and the binary representation of the spill value comprises B bits. In this example, the B bits in a spill value are numbered zero through (B−1). Also in this example, the KVDB is configured such that nodes at tree-level L all have the same number of child nodes, and this number of child nodes is an integer power of two greater than or equal to two. This behavior is specific to the key hashing in level movement. However, in transitioning from a base level to a subsequent level, the KVS tree is also considered. Here, the key hashing characteristic will produce the child node constraint mentioned above within one KVS tree, however, there may be many KVS tree and thus the total child node count is based on this number of KVS trees. In this configuration, the bits of the spill value for a key K for key distribution may be used as illustrated below.

For a node at a level L in the KVDB, let $2^{E(L)}$ be the number of child nodes configured for the node, where $2^{E(L)} \geq 2$. Then for a given node and a given key K in a KVS tree, the spill value for key K specifies the child node of the node used for spill compaction as follows:

A) Level 0: spill value bits 0 through (E(0)−1) specify the child node number for key K;
B) Level 1: spill value bits E(0) through (E(0)+E(1)−1) specify the child node number for key K; and
C) Level L (L>1): spill value bits sum(E(0), . . . , E(L−1)) through (sum(E(0), . . . , E(L)))−1) specify the child node number for key K.

The table below illustrates a specific example of the above radix-based key distribution technique given a KVS tree in the KVDB with seven (7) levels, a key K, and a 16-bit spill value for key K:

| Level | 0 | 1 | 2 | 3 | 4 | 5 |
|---|---|---|---|---|---|---|
| Child node count | 2 | 8 | 4 | 16 | 32 | 2 |
| Spill value bits | 0 | 1-3 | 4-5 | 6-9 | 10-14 | 15 |
| Key K spill value | 0 | 110 | 01 | 1110 | 10001 | 1 |
| Child node selected | 0 | 6 | 1 | 14 | 17 | 1 |

Where Level is a level number in the KVS tree within the KVDB; Child node count is the number of child nodes configured for all nodes at the specified level; Spill value bits is the spill value bit numbers that spill compaction uses for key distribution at the specified level; Key K spill value is the binary representation of the given 16-bit spill value for the given key K, specifically 0110011110100011—for clarity, the spill value is segmented into the bits that spill compaction uses for key distribution at the specified level; and Child node selected is the child node number that spill compaction selects for any (non-obsolete) key-value pair or tombstone with the given spill value—this includes all (non-obsolete) key-value pairs or tombstones with the given key K, as well as other keys different from key K that may have the same spill value. Again, this is the mechanism by which the key provides a determinative mapping. However, in KVDBs, different determinative mappings may be used between base levels, between subsequent levels, and between a base level and a subsequent level.

In an example, for a given KVDB and determinative mapping, the spill value computation and spill value size (in bits) may be the same for all keys. As noted above, using an adequate hash permits controlling the number of bits in the spill value while also, for example, ensuring a spill value size sufficient to accommodate a desired number of tree-levels and a desired number of child nodes for the nodes at each level. In an example, for a given KVS tree, the spill value for a key K may be either computed as needed or stored on storage media (e.g., cached).

Figure 12:
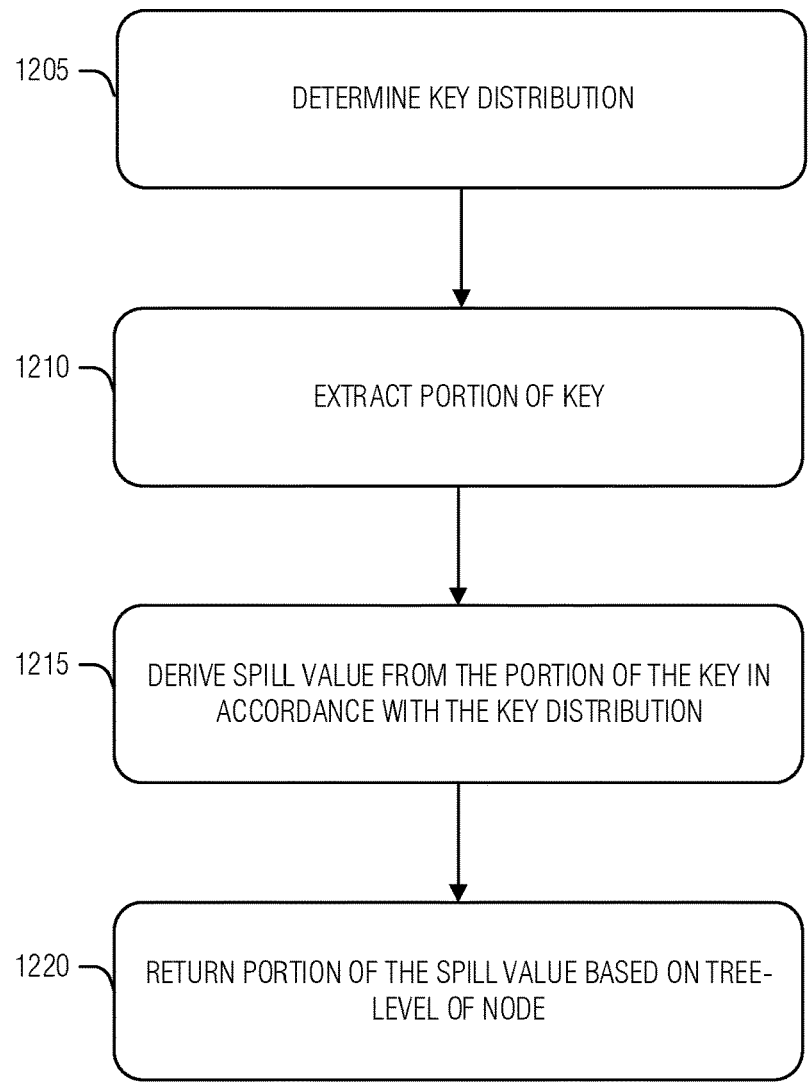
FIG. 12 illustrates an example of a method for a spill value function, according to an embodiment.

FIG. 12 illustrates an example of a method 1200 for a spill value function, according to an embodiment. The operations of the method 1200 are implemented with electronic hardware, such as that described throughout at this application, including below with respect to FIG. 21 (e.g., circuits).

At operation 1205, a portion of a key is extracted. In an example, the portion of the key is the entire key.

At operation 1210, a spill value is derived from the portion of the key using one of a set of determinative mappings selected based on a KVDB node traversal (e.g., base level to subsequent level). In an example, deriving the spill value from the portion of the key includes performing a hash of the portion of the key.

At operation 1215, a portion of the spill value is returned based on the tree-level of the parent node. In an example, returning the portion of the spill value based on the tree-level of the parent node includes applying a pre-set apportionment to the spill value, and returning the portion of the spill value corresponding to the pre-set apportionment and the tree-level of the parent node. Here the pre-set apportionment defines the portions of the spill value that apply to respective levels of the KVDB.

In an example, the pre-set apportionment defines a maximum number of child nodes for at least some of the tree-levels. In an example, the pre-set apportionment defines a maximum depth to the tree. In an example, the pre-set apportionment defines a sequence of bit-counts, each bit-count specifying a number of bits, the sequence ordered from low tree-levels to high-tree levels such that the spill value portion for the lowest tree-level is equal to a number of bits equal to the first bit-count starting at the beginning of the spill value and the spill value portion for the n-th tree-level is equal to the n-th bit-count in the sequence of bit counts with an offset into the spill value of the sum of bit counts starting at the first bit-count and ending at a n minus one bit-count.

Figure 13:
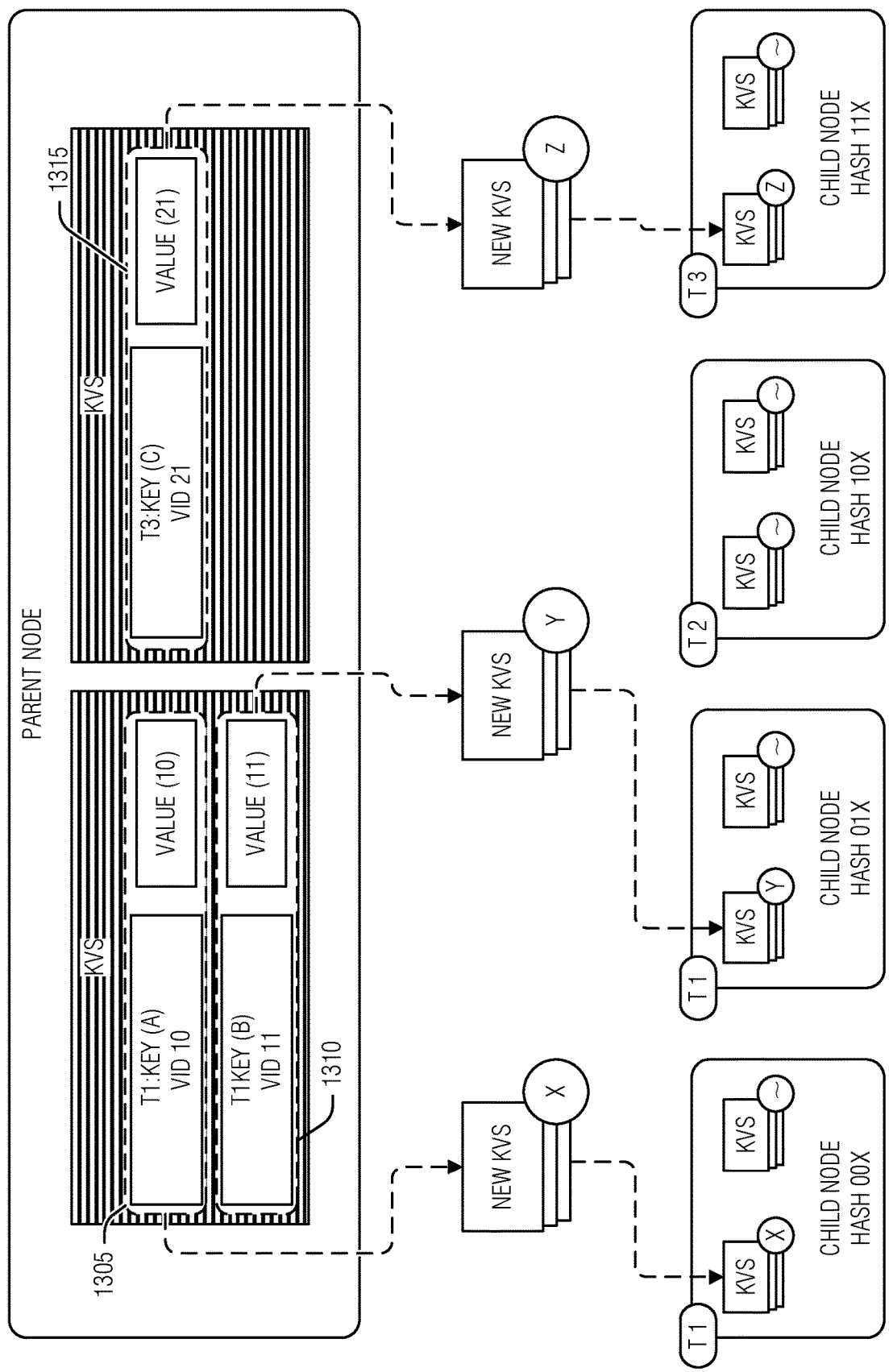
FIG. 13 is a block diagram illustrating spill compaction, according to an embodiment.

FIG. 13 is a block diagram illustrating spill compaction from a base level node to a subsequent level node, according to an embodiment. As noted above, spill compaction is a combination of a key-value compaction with a tree traversal (to a child node) to place the resultant kvsets. Thus, spill compaction (or just spill) reads the key-value pairs and tombstones from the merge set, removes all obsolete key-value pairs or tombstones (garbage), writes the resulting key-value pairs and tombstones to new kvsets in some or all of the child nodes of the node containing the merge set, and deletes the kvsets comprising the merge set. These new kvsets atomically replace, and are logically equivalent to, the merge set. Because this spill compaction is not between base level nodes or subsequent level nodes, the KVS tree (e.g., TID) of the entries affects the spill value. The subsequent level nodes are labeled with the respective KVS trees (e.g., T1, T2, and T3) to which they belong.

Spill compaction uses a deterministic technique for distributing the key-value pairs and tombstones in a merge set to the child nodes of the node containing the merge set. Specifically, spill compaction may use any such key distribution method such that for a given node and a given key K, spill compaction always writes any (non-obsolete) key-value pair or tombstone with key K to the same child node of that node. In a KVDB, the deterministic technique may be different depending on whether the parent and child nodes are base level nodes, whether the parent is a base level node and the child is a subsequent level node, or the parent and child are subsequent level nodes. In an embodiment, spill compaction uses a radix-based key distribution method such as the one in the example presented in detail below.

To facilitate understanding of a spill, the parent node includes two kvsets that comprise the merge set. TID aware key-value pairs 1305, 1310, and 1315 in the two kvsets respectively have spill values that respectively correspond to three of the parent node's four child nodes. Thus, key-value pair 1305 is placed into the new kvset X (a T1 node), key-value pair 1310 is placed into the new kvset Y (also a T1 node), and key-value pair 1315 is placed into the new kvset Z (a T3 node), with each new kvset being written to the child corresponding to the spill value. Also note that the new kvsets are written to the newest (e.g., left-most) position in the respective child nodes.

In an example, the merge set for a spill compaction must include the oldest kvset in the node containing the merge set. In an example, if the node containing the merge set has no child nodes at the start of a spill compaction, the configured number of child nodes is created.

As with other compactions discussed above, new kvsets may be added to the node containing the merge set for a spill compaction while the spill compaction is executing because by definition these added kvsets will not be in the merge set for the spill compaction and because these added kvsets will be logically newer than the kvsets resulting from the spill compaction.

Figure 14:
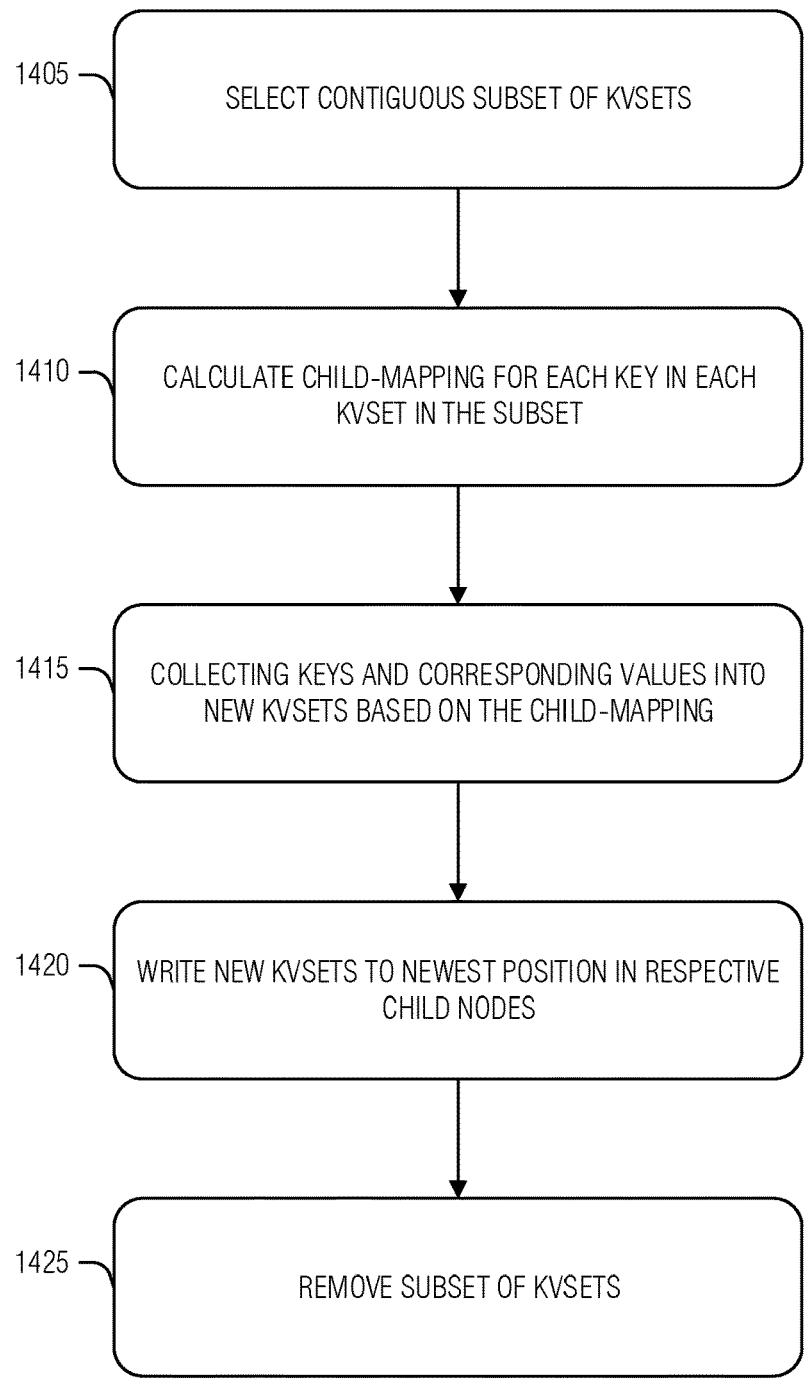
FIG. 14 illustrates an example of a method for spill compaction, according to an embodiment.

FIG. 14 illustrates an example of a method 1400 for spill compaction, according to an embodiment. The operations of the method 1400 are implemented with electronic hardware, such as that described throughout at this application, including below with respect to FIG. 21 (e.g., circuits).

At operation 1405, a subset of the sequence of kvsets is selected. In an example, the subset includes contiguous kvsets that also includes an oldest kvset.

At operation 1410, a child-mapping for each key in each kvset of the subset of kvsets is calculated based on a determinative mapping selected based on a position of the node. Thus, a first determinative mapping is selected if the node is a base level node and its child nodes are subsequent level nodes, a second determinative mapping is selected if the node is a subsequent level node, and a third determinative mapping is selected if child nodes are base level nodes. Here, the child mapping is a determinative map from a parent node to a child node based on a key, a tree-level of the parent node, and possibly a TID or the like.

At operation 1415, keys, possibly TIDs, and corresponding values are collected into kvsets based on the child-mapping with each kvset set mapped to exactly one child node. Key collisions may occur during this collection. As discussed above with respect to FIGS. 8 and 10, such a collision is resolved in favor of the newer key entry.

At operation 1420, the kvsets are written to a newest position in respective sequences of kvsets in respective child nodes.

At operation 1425, the subset of kvsets are removed from the root node.

The method 1400 may be extended to include performing a second spill operation on a child node in response to a metric of the child node exceeding a threshold after operation of the spill operation.

Figure 15:
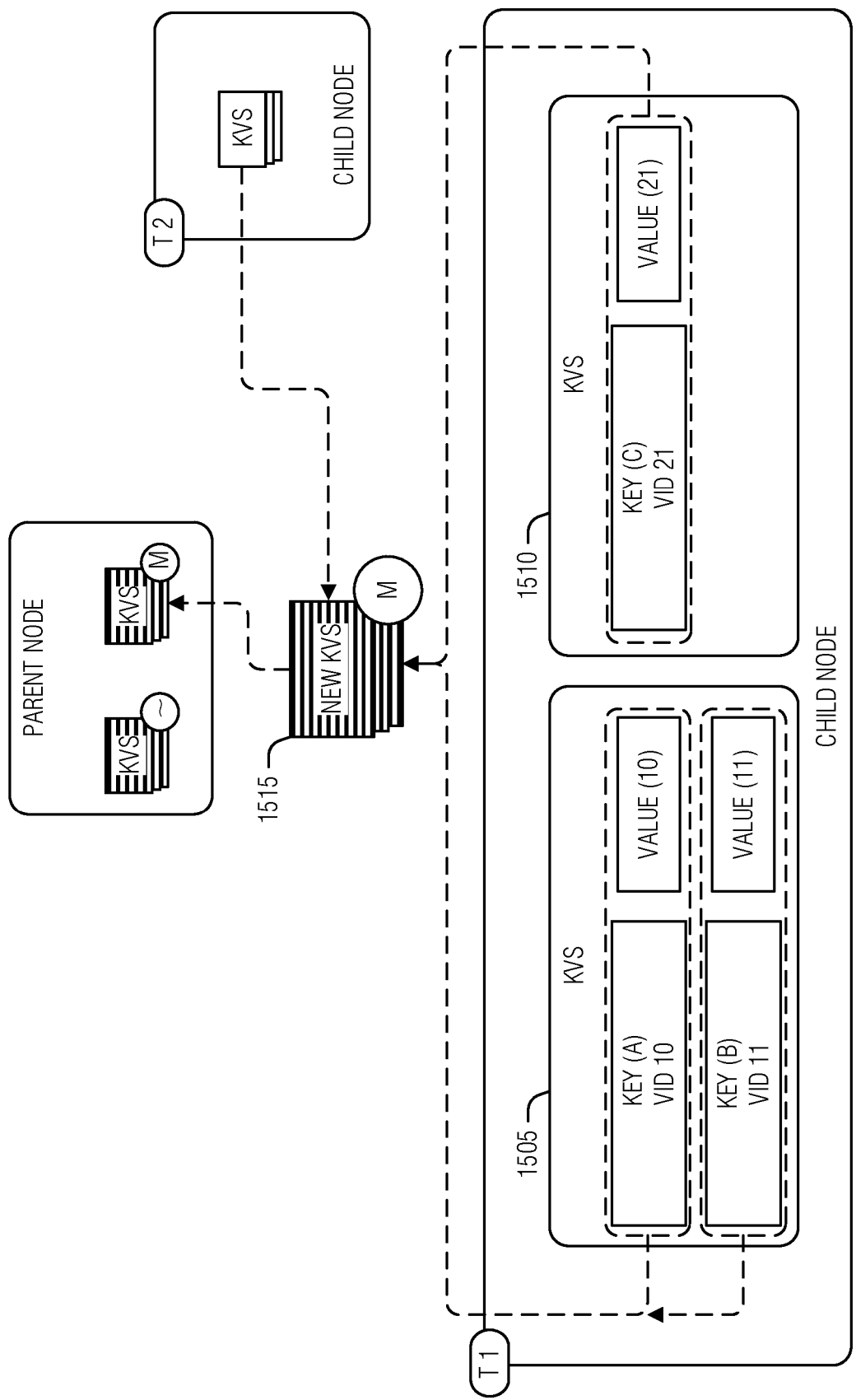
FIG. 15 is a block diagram illustrating hoist compaction, according to an embodiment.

FIG. 15 is a block diagram illustrating hoist compaction from a subsequent level node to a base level node, according to an embodiment. Hoist compaction differs from spill compaction in that the new kvset is written to a parent node. Thus, hoist compaction, or just hoist, reads the key-value pairs and tombstones from the merge set, removes all obsolete key-value pairs or tombstones, writes the resulting key-value pairs and tombstones to new kvsets in the parent node of the node containing the merge set, and deletes the kvsets comprising the merge set. These new kvsets atomically replace, and are logically equivalent to, the merge set. In this case, TIDs, or the like, are also written to the new kvsets.

As the kvsets are organized from newest to oldest, a hoist compaction includes the newest kvset in the node containing the merge set and the kvsets resulting from the hoist compaction are placed in the oldest position in the sequence of kvsets in the parent node. Unlike the other compactions discussed above, in order to ensure that the newest kvset from the node being compacted is in the merge set, new kvsets cannot be added to the node containing the merge set while the hoist compaction is executing. Thus, the hoist compaction is a blocking compaction.

As illustrated, the key-value pairs of KVS 1505 and 1510 are merged into the new KVS M 1515 and stored in the oldest position in the parent node's sequence of kvsets. A hoist compaction may be applied to a merge set when, for example, the goal is to reduce the number of levels in a KVS tree and thereby increase the efficiency of searching for keys in the KVS tree.

Figure 16:
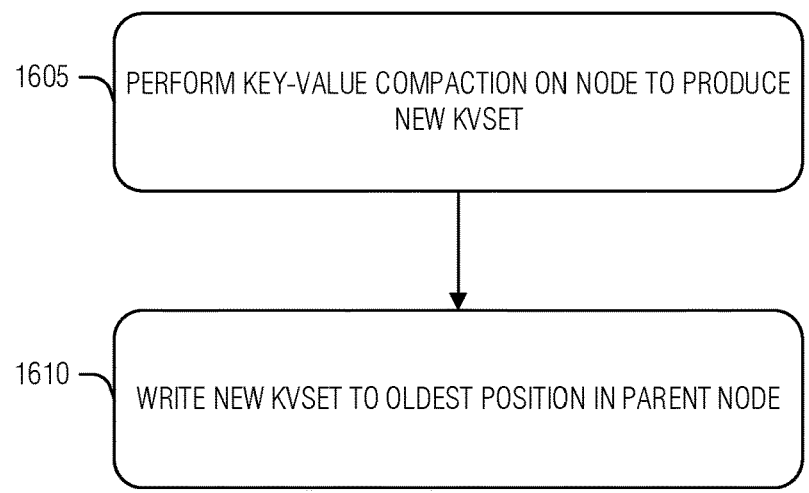
FIG. 16 illustrates an example of a method for hoist compaction, according to an embodiment.

FIG. 16 illustrates an example of a method 1600 for hoist compaction, according to an embodiment. The operations of the method 1600 are implemented with electronic hardware, such as that described throughout at this application, including below with respect to FIG. 21 (e.g., circuits). In an example, At operation 1605, a key and value compaction is performed on the child node to produce a new kvset without writing the new kvset to the child node.

At operation 1610, the new kvset is written to the node in an oldest position for a sequence of kvsets of the node.

Key-value compaction, spill compaction, and hoist compaction operations may physically remove obsolete key-value pairs and tombstones from a merge set and may thereby reduce the amount (for example in bytes) of key-value data stored in a KVDB. In doing do, these compaction operations read non-obsolete values from value-blocks, for example, in the merge set and write these values to value-blocks in the kvsets resulting from the compaction operation.

In contrast, a key compaction operation may physically remove keys (and tombstones) but only logically removes values from a merge set. Thus, the values physically remain in the kvsets resulting from the key compaction. Key compaction may increase the efficiency of searching for keys in the node containing the merge set by reducing the number of kvsets in that node while avoiding the additional reading and writing of value-blocks incurred by, for example, a key-value compaction operation. Further, the key compaction provides useful information for future maintenance operations. Key compaction is uniquely supported by KVDBs due to the separation of keys and values in key-blocks and value-blocks as described above.

The KVDB maintenance techniques (e.g., compactions) described above operate when a trigger condition is met. Controlling when and where (e.g., which nodes) maintenance occurs may provide optimizations to processing, or time, spent versus increased space or searching efficiency. Some metrics gathered during maintenance, or during ingestion, may enhance the system's ability to optimize later maintenance operations. Here, these metrics are referred to either as a garbage metric or an estimated garbage metric based on how the metric was computed. Examples of such garbage metrics include the number of obsolete key-value pairs and tombstones in a node or the amount of storage capacity they consume, and the amount of storage capacity consumed by unreferenced data in value-blocks in a node. Such garbage metrics indicate how much garbage may be eliminated by performing, for example, a key-value compaction, spill compaction, or hoist compaction on the kvsets of a node.

Again, for a given KVDB, computing or estimating garbage metrics for its nodes provides several advantages, including making it practical to:
A) Prioritize applying garbage collection operations to those nodes with the most garbage, in particular garbage collection operations that physically remove obsolete key-value pairs and tombstones such as key-value compaction, spill compaction, and hoist-compaction. Prioritizing garbage collection operations in this manner increases their efficiency and reduces associated write-amplification; or
B) Estimate the number of valid key-value pairs and number of obsolete key-value pairs in the KVDB, and the amount of storage capacity consumed by each category. Such estimates are useful in reporting capacity utilization for the KVDB. In some cases it is advantageous to directly compute garbage metrics for a given node, whereas in other cases it is advantageous to estimate them. Hence techniques for both computing and estimating garbage metrics are described below.

To facilitate the collection of the garbage metrics, some kvset statistics may be gathered or maintained. In an example, these statistics are maintained within the kvset set itself, such as in a primary key-block header for the kvset. Below is a non-exhaustive list of kvset statistics that may be maintained:
A) Number of key-value pairs
B) Number of key tombstones
C) Capacity needed to store all keys for key-value pairs and tombstones
D) Capacity needed to store all values for key-value pairs
E) Key size statistics including minimum, maximum, median, and mean
F) Value size statistics including minimum, maximum, median, and mean
G) Count of, and capacity consumed by, unreferenced values if the kvset is the result of a key compaction.
H) Minimum and maximum time-to-live (TTL) value for any key-value pair. A KVS tree may allow the user to specify a TTL value when storing a key-value pair, and the key-value pair will be removed during a compaction operation if its lifetime is exceeded.

Computed garbage metrics involve the computation of known quantities to produce a known result. For example, if it is known that there are n-bits that are obsolete in a kvset, key-value compacting the kvset will result in freeing those n-bits. A source of metrics for computed garbage metrics are key compactions. Key compactions logically remove obsolete key-value pairs and tombstones, and physically remove redundant keys, from a merge set. However, unreferenced data may remain in the value-blocks of the kvsets resulting from key compactions. Thus, key compaction results in knowing which values are unreferenced in the new kvset and their size. Knowing the size of those values permits an accurate count of storage that will be freed under other compactions. Thus, when executing a key compaction on a merge set, garbage metrics for each of the resulting kvsets may be recorded in the respective kvsets. Example garbage metrics that may be maintained from a key compaction include:
A) The count of unreferenced values in the kvset
B) The bytes of unreferenced values in the kvset In an example, given a first key compaction on a merge set, and given a second key compaction in the same node as the first key compaction where the merge set for the second key compaction includes the kvsets resulting from the first key compaction, then garbage metrics recorded from the first key compaction may be added to like garbage metrics recorded from the second key compaction. For example, if the first key compaction operation resulted in a single kvset S with associated key compaction garbage metrics specifying Ucnt count of unreferenced values, then Ucnt may be included in the count of unreferenced values in the key compaction garbage metrics resulting from the second key compaction operation.

In an example, for a given node, if the merge set for a key compaction operation includes all of the kvsets in the node, then the key compaction garbage metrics recorded may include:
A) The count of unreferenced values in the node
B) The bytes of unreferenced values in the node It is clear that, if every kvset in a given node is the result of a key compaction operation, then the key compaction garbage metrics for the node are the sum of the like key compaction garbage metrics from each of the individual kvsets in the node.

Estimated garbage metrics provide a value that estimates the gain from performing a compaction on a node. Generally, estimated garbage metrics are gathered without performing a key compaction. The following terms are used in the discussion below. Let:
A) T=the number of kvsets in the given node
B) $S(j)$=a kvset in the given node, where $S(1)$ is the oldest kvset and $S(T)$ is the newest
C) $KVcnt(S(j))$=number of key-value pairs in $S(j)$
D) $NKVcnt=sum(KVcnt(S(j)))$ for j in range one through T
E) $Kcap(S(j))$=capacity needed to store all keys for $S(j)$ in bytes
F) $NKcap=sum(Kcap(S(j)))$ for j in range one through T
G) $Vcap(S(j))$=capacity needed to store all values for $S(j)$ in bytes
H) $NVcap=sum(Vcap(S(j)))$ for j in range one through T
I) $NKVcap=NKcap+NVcap$ A form of estimated garbage metrics are historical garbage metrics. Historical garbage collection information may be used to estimate garbage metrics for a given node. Examples of such historical garbage collection information include, but are not limited to:
A) Simple, cumulative, or weighted moving averages of the fraction of obsolete key-value pairs in prior executions of garbage collection operations in the given node; or
B) Simple, cumulative, or weighted moving averages of the fraction of obsolete key-value pairs in prior executions of garbage collection operations in any node at the same level of the KVDB as the given node.

In the above examples, garbage collection operations include, but are not limited to, key compaction, key-value compaction, spill compaction, or hoist compaction.

Given a node, historical garbage collection information and kvset statistics provide the information to generate estimated garbage metrics for the node.

In an example, a Node Simple Moving Average (NodeSMA) may be performed to create the historical garbage metrics. Here, let NSMA(E)=mean of fractions of obsolete key-value pairs in the most recent E executions of garbage collection operations in the given node, where E is configurable. In this example, the NodeSMA estimated garbage metrics for the given node may include the following:

A) NKVcnt*NSMA(E) count of obsolete key-value pairs in the node;
B) NKVcap*NSMA(E) bytes of obsolete key-value data in the node;
C) NKVcnt−(NKVcnt*NSMA(E)) count of valid key-value pairs in the node; or
D) NKVcap−(NKVcap*NSMA(E)) bytes of valid key-value data in the node.

Another variation on historical garbage metrics include Level Simple Moving Average (LevelSMA) garbage metrics. In this example, let LSMA(E)=mean of fractions of obsolete key-value pairs in the most recent E executions of garbage collection operations in any node at the same level of the KVDB as the given node, where E is configurable. In this example, the LevelSMA estimated garbage metrics for the given node may include:

A) NKVcnt*LSMA(E) count of obsolete key-value pairs in the node;
B) NKVcap*LSMA(E) bytes of obsolete key-value data in the node;
C) NKVcnt−(NKVcnt*LSMA(E)) count of valid key-value pairs in the node; or
D) NKVcap−(NKVcap*LSMA(E)) bytes of valid key-value data in the node.

The above examples of historical garbage metrics are not exhaustive, but rather illustrate the types of metrics being gathered. Other example historical garbage metrics may include Node Cumulative Moving Average (NodeCMA) garbage metrics, Node Weighted Moving Average (NodeWMA) garbage metrics, Level Cumulative Moving Average (LevelCMA) garbage metrics, or Level Weighted Moving Average (LevelWMA) garbage metrics.

Another variation on estimated garbage metrics available to KVDBs that maintain bloom filters in kvsets for keys are bloom filter garbage metrics. As noted above, a given kvset may include a bloom filter to efficiently determine if the kvset might contain a given key, where there is one entry in the bloom filter for the kvset for each key in the kvset. These bloom filters may be used to estimate garbage metrics for a given node. Techniques—such as that discussed in Papapetrou, Odysseas, et al., Cardinality Estimation and Dynamic Length Adaptation for Bloom Filters, Distributed and Parallel Databases, 201—may be used to approximate the cardinality of the intersection of the sets of keys represented by the bloom filters in the kvsets comprising the node. This approximated value is here referred to as the bloom-estimated cardinality of the node.

Given a node, the bloom-estimated cardinality of the node and kvset statistics permit estimated garbage metrics for the node to be generated in several ways. An example bloom filter garbage metric includes BloomDelta garbage metrics. Let NBEC=the bloom-estimated cardinality of the T kvsets in the given node, and Fobs=(NKVcnt−NBEC)/NKVcnt, which is an estimate of the fraction of obsolete key-value pairs in the given node. In this example, the BloomDelta garbage metrics for the given node may include:

A) NKVcnt−NBEC count of obsolete key-value pairs in the node;
B) NKVcap*Fobs bytes of obsolete key-value data in the node;
C) NBEC count of valid key-value pairs in the node; or
D) NKVcap−(NKVcap*Fobs) bytes of valid key-value data in the node.

Probabilistic filters different than bloom filters, for which it is possible to approximate the cardinality of the intersection of sets of keys represented by two or more such filters, may be used as a substitute for bloom filters in the estimated garbage metrics.

Computed and estimated garbage metrics may be combined to produce hybrid garbage metrics, another form of estimated garbage metrics due to the inclusion of another form of estimated garbage metrics. For example, given a node comprising T kvsets, if key compaction garbage metrics are available for W of these kvsets and W<T, then hybrid garbage metrics for the node may be generated as follows. For the W kvsets in the node for which key compaction garbage metrics are available, let:

A) KGMOcnt=an estimate of the count of obsolete key-value pairs in the W kvsets+the sum of the count of unreferenced values from each of the W kvsets;
B) KGMOcap=an estimate of the bytes of obsolete key-value data in the W kvsets+the sum of the bytes of unreferenced values from each of the W kvsets;
C) KGMVcnt=an estimate of the count of valid key-value pairs in the W kvsets; and
D) KGMVcap=an estimate of the bytes of valid key-value data in the W kvsets.

Where the estimated garbage metrics may be generated using one of the techniques discussed above under the assumption that the W kvsets are the only kvsets in the node.

For the (T−W) kvsets in the node for which key compaction garbage metrics are not available, let:

A) EGMOcnt=an estimate of the count of obsolete (garbage) key-value pairs in the (T−W) kvsets;
B) EGMOcap=an estimate of the bytes of obsolete (garbage) key-value data in the (T−W) kvsets;
C) EGMVcnt=an estimate of the count of valid key-value pairs in the (T−W) kvsets; and
D) EGMVcap=an estimate of the bytes of valid key-value data in the (T−W) kvsets.

Where these estimated garbage metrics may be generated using one of the techniques discussed above under the assumption that the (T−W) kvsets are the only kvsets in the node. Given these parameters, the hybrid garbage metrics for the given node may include:

A) KGMOcnt+EGMOcnt count of obsolete key-value pairs in the node;
B) KGMOcap+EGMOcap bytes of obsolete key-value data in the node;
C) KGMVcnt+EGMVcnt count of valid key-value pairs in the node; or
D) KGMVcap+EGMVcap bytes of valid key-value data in the node.

The approaches for computing or estimating garbage metrics described above may be generally applied to all subsequent level nodes of the KVDB because the subsequent levels represent disjoint KVS trees of the KVDB. For base level nodes, these techniques also work by applying them to all KVS trees represented in the heterogeneous kvsets—e.g., by considering all key-value pairs or tombstones in a kvset regardless of the KVS tree with which they are associated.

Garbage metrics allow the prioritization of garbage collection operations to the tree-levels or nodes with a sufficient amount of garbage to justify the overhead of a garbage collection operation. Prioritizing garbage collection operations in this manner increases their efficiency and reduces associated write-amplification. In addition, estimating the number of valid key-value pairs and number of obsolete key-value pairs in the tree, and the amount of storage capacity consumed by each category, is useful in reporting capacity utilization for the tree.

Figure 17:
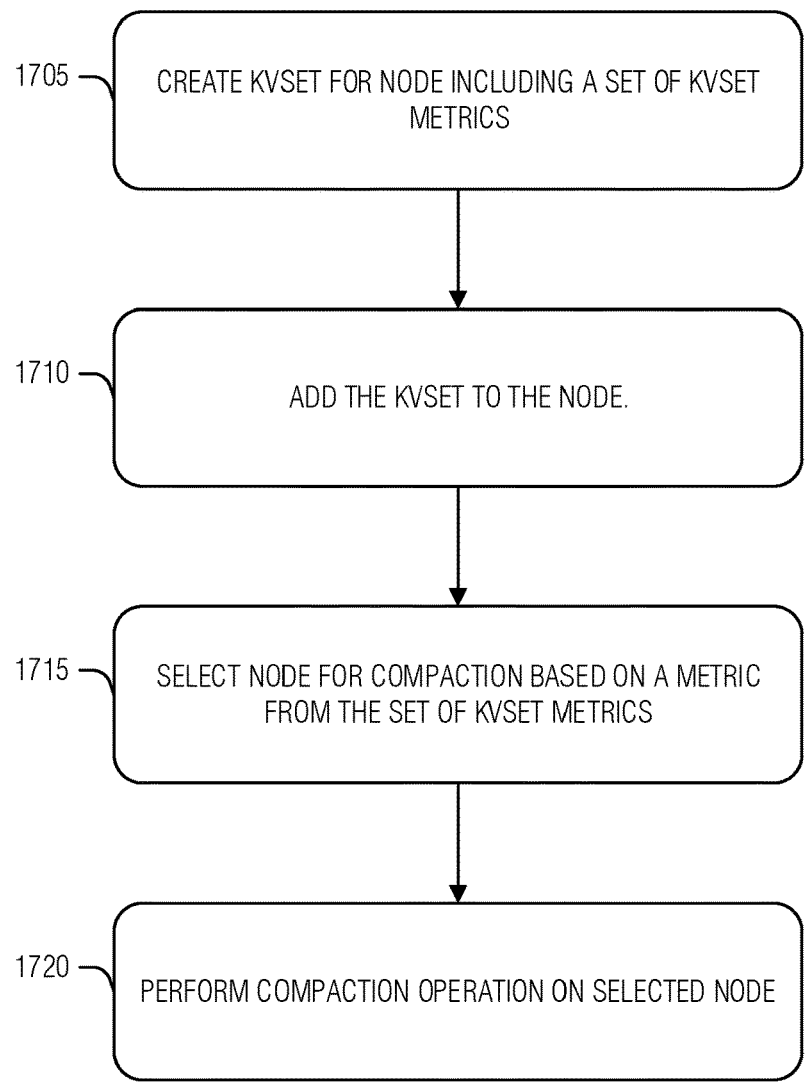
FIG. 17 illustrates an example of a method for performing maintenance on a KVS tree database, according to an embodiment.

FIG. 17 illustrates an example of a method 1700 for performing maintenance on a KVS tree, according to an embodiment. The operations of the method 1700 are implemented with electronic hardware, such as that described throughout at this application, including below with respect to FIG. 21 (e.g., circuits).

At operation 1705, a kvset is created for a node. As part of the kvset creation, a set of kvset metrics is computed for the kvset. In an example, the set of kvset metrics include a number of key-value pairs in the kvset. In an example, the set of kvset metrics include a number of tombstones in the kvset. In an example, the set of kvset metrics include a storage capacity to store all key entries for key-value pairs and tombstones in the kvset. In an example, the set of kvset metrics include a storage capacity for all values of key-value pairs in the kvset.

In an example, the set of kvset metrics include key size statistics for keys in the kvset. In an example, the key size statistics include at least one of maximum, minimum, median, or mean. In an example, the set of kvset metrics include value size statistics for keys in the kvset. In an example, the value size statistics include at least one of maximum, minimum, median, or mean.

In an example, the set of kvset metrics include a minimum or a maximum time-to-live (TTL) value for a key-value pair in the kvset. TTL may be useful when an ingest operation specifies a period for which a key-value pair will be valid. Thus, after the key-value pair's expiration, it is a prime target for reclamation via a compaction operation.

In an example, the kvset is created in response to a compaction operation. Here, the compaction operation is at least one of a key compaction, a key-value compaction, a spill compaction, or a hoist compaction. In an example, the compaction operation is a key compaction. In this example, the set of kvset metrics may include metrics of unreferenced values in the kvset as a result of the key compaction. In an example, the unreferenced value metrics include at least one of a count of unreferenced values or a storage capacity consumed by unreferenced values. As used herein, the storage capacity consumed is measured in bits, bytes, blocks, or the like used by an underlying storage device to hold key entries or values as the case may be.

In an example, where the kvset was created by a compaction operation, the set of kvset metrics may include an estimate of obsolete key-value pairs in the kvset. As used herein, the estimate is such because the compaction only gains insight into obsolete (e.g., superseded) key-value pairs in the merge set subject to the compaction and thus does not know whether a seemingly current key-value pair is made obsolete by an entry in a newer kvset that is not part of the compaction. In an example, the estimate of obsolete key-value pairs may be calculated by summing a number of key entries from pre-compaction kvsets that were not included in the kvset. Thus, as part of a compaction, a number of obsolete pairs, with respect to the merge set, will be known and may be used as an estimate of obsolete data in the created kvset. Similarly, an estimate of valid key-value pairs in the kvset may be calculated by summing a number of key entries from pre-compaction kvsets that were included in the kvset and be a part of the set of kvset metrics. In an example, the set of kvset metrics include an estimated storage size of obsolete key-value pairs in the kvset. In an example, include an estimated storage size of valid key-value pairs in the kvset, the estimated storage size of valid key-value pairs calculated by summing storage sizes of key entries and corresponding values from pre-compaction kvsets that were included in the kvset. These estimates may be used for historical metrics as, unless a key-compaction is performed, the estimated obsolete values will be removed in the compaction. However, if a node has a regular (e.g., historical) performance in a compaction, one may assume that this performance continues in the future.

In an example, the set of kvset metrics are stored in the kvset (e.g., in a primary key block header). In an example, the set of kvset metrics are stored in the node and not in the kvset. In an example, a subset of the kvset metrics are stored in the kvset and a second subset of the kvset metrics are stored in the node.

At operation 1710, the kvset is added to the node. Generally, once added to the node, the kvset is also written (e.g., to on-disk storage).

At operation 1715, the node is selected for a compaction operation based on a metric in the set of kvset metrics. Thus, the kvset metrics, or the node metrics discussed below, or both, may contribute to a decision by a garbage collector or similar maintenance process. In an example, selecting the node for the compaction operation includes collecting sets of kvset metrics for a multiple of nodes, sorting the multiple of nodes based on the sets of kvset metrics, and selecting a subset of the multiple of nodes based on a sort order from the sorting. In this example, operation 1720 may be implemented such that performing the compaction operation on the node includes performing the compaction operation on each node in the subset of the multiple of nodes (including the node). In an example, a cardinality of the subset of the multiple of nodes is set by a performance value. In an example, the performance value is an efficiency of performing the compaction as measured by space recovered. This may often be implemented as a threshold. In an example, a threshold function may be used that accepts a number of parameters, such as the amount of unused storage capacity left on the underlying storage device and an estimate of capacity to be reclaimed in the compaction operation to arrive at a decision as to whether or not to perform a given compaction operation.

At operation 1720, the compaction operation is performed on the node. In an example, a type of compaction operation (e.g., key compaction key-value compaction, spill compaction, or hoist compaction) is selected based on a metric in the set of kvset metrics.

The operations of the method 1700 may be extended to include modifying node metrics in response to adding the kvset to the node. In an example, the node metrics include a value of a fraction of estimated obsolete key-value pairs in kvsets subject to prior compactions performed on a node group including the node. In an example, the value is a simple average. In an example, the value is a moving average. In an example, the value is a weighted average. In an example, the value is a mean of the fraction of estimated obsolete key-value pairs in kvsets subject to a set number of most recent prior compactions for the node. In an example, the value is a mean of the fraction of estimated obsolete key-value pairs in kvsets subject to a set number of most recent prior compactions for all nodes at a tree-level of the node.

In an example, node group includes only the node. In an example, the node group includes all nodes on a tree-level of the node. In an example, the node metrics include a summation of like metrics in the set of kvset metrics resulting from a compaction operation and previous kvset metrics from compaction operations performed on the node.

In an example, the node metrics include an estimated number of keys that are the same in the kvset and a different kvset of the node. In an example, the estimated number of keys are calculated by obtaining a first key bloom filter from the kvset, obtaining a second key bloom filter from the different kvset, and intersecting the first key bloom filter and the second key bloom filter to produce a node bloom filter estimated cardinality (NBEC). Although this example is written as between two kvsets (e.g., the intersection of only two bloom filters from two kvsets), any number of kvset bloom filters may be intersected to arrive at the NBEC that represents the estimate of the number of keys common to all kvsets whose bloom filter was part of the intersection.

In an example, the node metrics include subtracting the NBEC from a NKVcnt value to estimate a number of obsolete key-value pairs in the node. Here, the NKVcnt value is a total count of key value pairs in each kvset of the node for which a bloom filter was intersected to produce the NBEC. In an example, the node metrics include multiplying a NKVcap value by a Fobs value. Here, the NKVcap value is a total storage capacity used by keys and values in each kvset in the node for which a bloom filter was intersected to produce the NBEC, and the Fobs value is the result of subtracting the NBEC from an NKVcnt value and dividing by NKVcnt, where the NKVcnt value is a total count of key value pairs in each kvset of the node for which a bloom filter was intersected to produce the NBEC.

In an example, the node metrics are stored in the node. Here, the node metrics are stored along with node metrics from other nodes. In an example, the node metrics are stored in a tree-level, the tree-level being common to all nodes in a level of a KVS tree in a KVDB.

The garbage collection metrics and their use described above to improve KVDB performance may be aided in a number of ways by modifying the vanilla operation of the KVDB or elements therein (e.g., tombstones) under certain circumstances. Examples may include tombstone acceleration, update tombstones, prefix tombstones, or immutable data KVDBs.

A tombstone represents a deleted key-value in a KVS tree. When a tombstone is compacted in a leaf of the KVS tree, and the compaction includes the oldest kvset in the leaf, it is actually removed, but otherwise remains to prevent a possibly obsolete value for the key being returned in a search. In a key compaction or key-value compaction resulting in a tombstone in the merge set on a node that has child nodes, tombstone acceleration includes writing non-obsolete tombstones to one or more new kvsets in some or all of these child nodes following the key distribution method used for spill compaction.

If the merge set for a key compaction or key-value compaction operation includes the oldest kvset in the node containing the merge set, then accelerated tombstones (if any) need not be included in the new kvsets created by the compaction operation in that node. Otherwise, if the merge set for a key compaction or key-value compaction operation does not include the oldest kvset in the node containing the merge set, then accelerated tombstones (if any) are also included in the new kvsets created by the compaction operation in that node. The distribution of the accelerated tombstones into older areas of the KVS tree facilitates garbage collection by allowing the removal of key-value pairs in child nodes without waiting for the original tombstones to be pushed to the child nodes.

A key compaction or key-value compaction operation may apply specified or computed criteria to determine whether or not to also perform tombstone acceleration. Examples of such tombstone acceleration criteria include, but are not limited to, the number of non-obsolete tombstones in a merge set and the amount (for example in bytes) of key-value data logically deleted by the tombstones in a merge set which may be known or an estimate.

Update tombstones operate similarly to accelerated tombstones though the original ingest value is not a tombstone. Essentially, when a new value is added to the KVS tree, all older values for that key may be garbage collected. Pushing a tombstone, akin to an accelerated tombstone, down the tree will allow compactions on these child nodes to remove the obsolete values.

In an example, in a KVDB, an ingest operation adds a new kvset to the base-level node and a TID aware key-value pair with key K in this new kvset includes a flag or other indicator that it is an update key-value pair that is replacing a key-value pair with key K that was included in an earlier ingest operation. It is an expectation, but not a requirement, that this indicator is accurate. If an update key-value pair with key K is included with an ingest operation, and if the root node has child nodes, then the ingest operation may also write a key tombstone for key K, the update tombstone, to a new kvset in a child node of the root node following the key distribution method used for spill compaction.

In an example, alternatively, a key compaction or key-value compaction operation on a merge set in the root node may, in response to processing an update key-value pair with key K, also write a key tombstone for key K, again referred to an as update tombstone, to a new kvset in a child node of the root node following the key distribution method used for spill compaction in the KVS tree. In an example, for a given update key-value pair with key K, at most one corresponding update tombstone is written for key K.

While KVS tree prefix operations are discussed below, the concept may be used in tombstones as well. In prefix operations, a portion of the key, the prefix, is used for matches. Generally, the prefix portion of the key is used in its entirety to derive the spill value, although a smaller portion may be used with deeper tree determinations fanning out to all child nodes after the prefix path is consumed. Prefix tombstones use the power of the prefix matching multiple values to have a single entry represent the deletion of many key-value pairs.

In an example, spill compaction uses a key distribution method based on a spill value of the first sub key of the keys, the first sub key being the key prefix. The prefix tombstone is a logical record comprising the key prefix and indicates that all keys starting with the prefix and their associated values, if any, have been logically deleted at a particular point in time. A prefix tombstone serves the same purpose as a key tombstone, except that a prefix tombstone may logically delete more than one valid key-value pair whereas a key tombstone may logically delete exactly one valid key-value pair. In this example, because spill compaction generates a spill value for a prefix tombstone using the first sub key value specified by the prefix, every key-value pair, key tombstone, or prefix tombstone having equivalent first sub key values will take the same path through the levels of the KVDB because they will have equivalent spill value values. As noted above, the TID plays a role in distinguishing tombstone application in heterogeneous kvsets.

In an example, tombstone acceleration may be applied to prefix tombstones as well as key tombstones. Prefix tombstones may be treated differently than key tombstones in applying tombstone acceleration criteria because prefix tombstones may result in the physical removal of a large number of obsolete key-value pairs or tombstones in subsequent garbage collection operations.

The tombstone acceleration techniques discussed above result in a greater number of kvsets being created and thus may be inefficient. As an application writing data may be aware of the size of previously written data, a tombstone may include a size of the data it is replacing from the application. This information may be used by the system to determine whether or not to perform the tombstone acceleration (or generate update tombstones) discussed above.

Some data may be immutable. Some examples of immutable key-value data include time series data, log data, sensor data, machine-generated data, and the output of database extract, transform, and load (ETL) processes, among others. In an example, a KVDB, or a KVS tree therein, may be configured to store immutable key-value data. In such a configuration the expectation, but not requirement, is that kvsets added by an ingest operation do not contain tombstones.

In an example, a KVDB, or KVS tree contained therein, may be configured to store an amount of immutable data that is only restricted by the capacity of the storage media containing the KVDB. In such a configuration, the only garbage collection operation executed is key compaction. Here, key compaction is performed to increase the efficiency of searching for keys by reducing the number of kvsets in the base level. Note, without spill compaction, the base level node will be the only node in the KVDB. In an example, the compaction criteria may include the number of kvsets in the base level node, or key search time statistics, such as the minimum, maximum, average and mean time to search. These statistics may be reset at certain events such as after a key compaction, after an ingest operation, at the expiration of a configured time interval, or after performing a configured number of key searches. In an example, the merge set for a key compaction may include some or all of the kvsets in the root node.

In an example, the KVDB, or KVS tree contained therein, may be configured to store an amount of immutable data that is restricted by a retention criterion that may be enforced by removing key-value pairs from the KVDB or the KVS tree in a first-in first-out (FIFO) manner. Examples of such retention criterion include: the maximum count of key-value pairs in the KVDB or the KVS tree; the maximum bytes of key-value data in the KVDB or the KVS tree; or the maximum age of a key-value pair in the KVDB or the KVS tree.

In such a configuration, the only garbage collection operation executed is key compaction. Here, the key compaction is performed both to increase the efficiency of searching for keys—by reducing the number of kvsets—and to facilitate removing key-value pairs in a FIFO manner to enforce the retention criterion. In an example, the compaction criteria may specify that a key compaction is executed whenever two or more consecutive kvsets, comprising the merge set for the key compaction, meet a configured fraction of the retention criterion, referred to as the retention increment. The following are some examples of retention requirements:

A) If the retention criterion is W key-value pairs, and the retention increment is 0.10*W key-value pairs, then key compaction is executed if two or more consecutive kvsets (the merge set) have a combined 0.10*W count of key-value pairs;

B) If the retention criterion is X bytes of key-value data, and the retention increment is 0.20*X bytes of key-value data, then key compaction is executed if two or more consecutive kvsets (the merge set) have a combined 0.20*X bytes of key-value data; or C) If the retention criterion is Y days of key-value data, and the retention increment is 0.15*Y days of key-value data, then key compaction is executed if two or more consecutive kvsets (the merge set) have a combined 0.15*Y days of key-value data.

There may be cases where it is impractical to require that the merge set for a key compaction precisely meet the configured retention increment. Thus, in an example, an approximation of the retention increment may be used.

Given a sequence of ingest operations of kvsets that are each below the configured retention increment, executing key compaction operations as described above results in kvsets in a node that each meet or approximate the retention increment. An exception to this result may be the newest kvsets, which combined may be below the retention increment. In spite of this possible outcome, whenever the the retention criterion are exceeded by at least the retention increment, the oldest kvset in the KVDB or the KVS tree may be deleted. For example, if the retention criterion is W key-value pairs, and the configured retention increment is 0.10*W key-value pairs, then the kvsets in the single node will each have approximately 0.10*W key-value pairs, with the possible exception of the newest kvsets which combined may have fewer than 0.10*W key-value pairs. As a result, whenever the KVDB or the KVS tree exceeds W key-value pairs by at least 0.10*W key-value pairs, the oldest kvset may be deleted.

The garbage collection facilitators of tombstone acceleration, update acceleration, or prefix tombstones, may be applied to other key-value stores than KVDBs or KVS trees. For example, tombstone acceleration or update tombstones may be applied in an LSM Tree variant with one or more garbage collection operations that write key-value data to the same tree-level from which it is read, and operate similarly to key compaction or key-value compaction in KVDBs or KVS trees. Update tombstones may also be applied to an LSM Tree variant for which it is permitted to ingest tombstones into the child nodes of the root node. In another example, prefix tombstones may be used in an LSM Tree variant that either has only one node per level (which is common), or that implements a key distribution method for selecting child nodes based on a portion of a key, such as a sub key. In another example, tombstone delete size may be applied in an LSM Tree variant using tombstone acceleration. Further, the techniques for optimizing garbage collection for immutable key-value data may be applied to an LSM Tree variant with a garbage collection operation that does not read or write values in key-value data, similar to key compaction in a KVDB or KVS tree.

Implementing these garbage collection facilitators improves the efficiency of garbage collection in a KVDB, a KVS tree, or other data structures. For example, tombstone acceleration results in tombstones being written to lower levels of the tree sooner than would occur otherwise when applying key compaction, key-value compaction, or a similar operation, thereby making it possible to eliminate garbage more quickly at all levels of the tree. Tombstone acceleration used in conjunction with key compaction, or a similar operation, achieves these results with far less write-amplification than would result from spill compaction. In other examples, prefix tombstones allow a single tombstone record to logically delete large numbers of related key-value pairs, update tombstones bring the benefits of tombstone acceleration to update key-value pairs, tombstone delete size improves accuracy when evaluating tombstone acceleration criteria, and techniques for optimizing garbage collection for immutable key-value data result in a write-amplification of one (1) for the values in key-value data.

Figure 18:
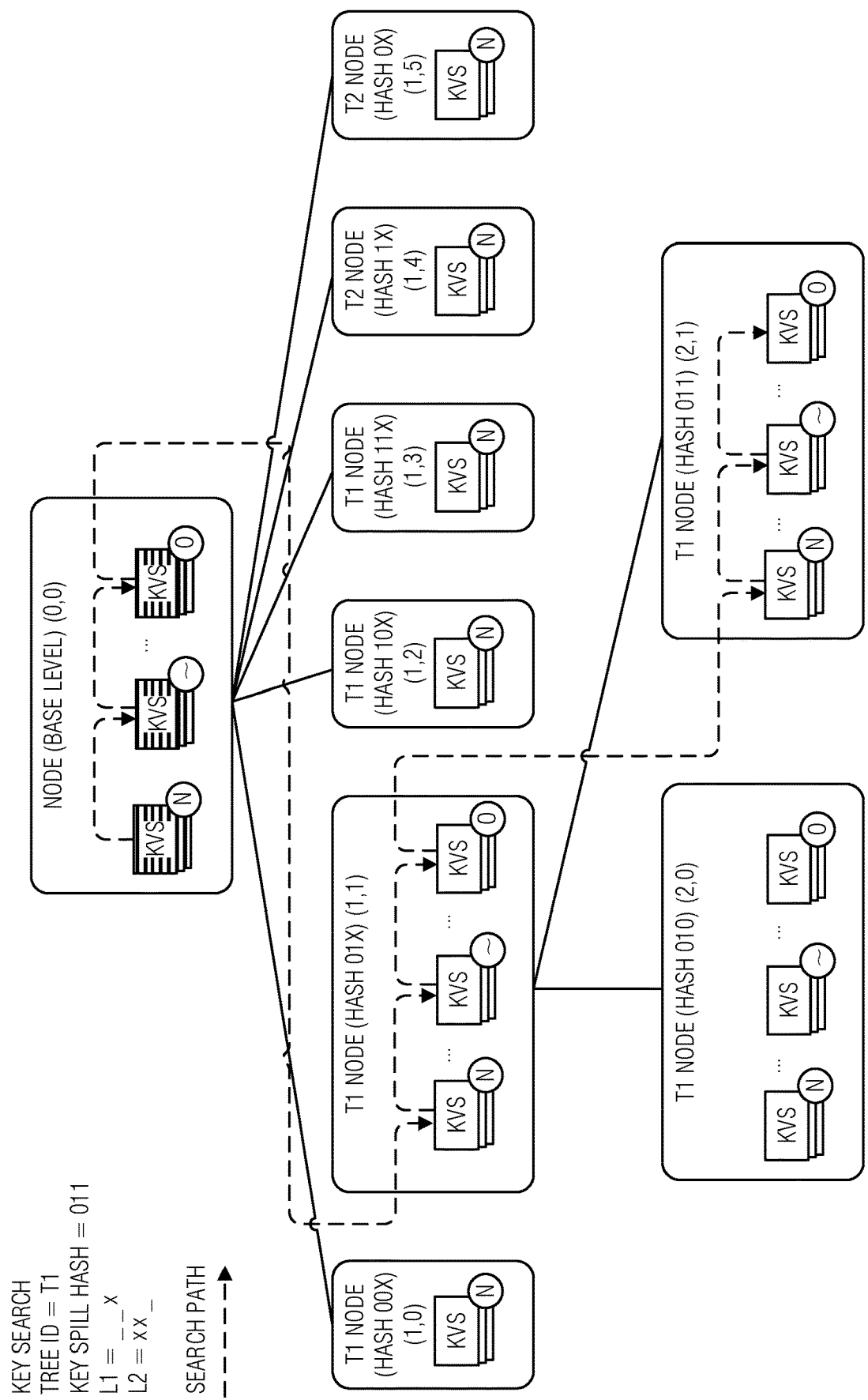
FIG. 18 is a block diagram illustrating a key search, according to an embodiment.

FIG. 18 is a block diagram illustrating a key search, according to an embodiment. The search progresses by starting at the newest kvset in the root node and progressively moving to older kvsets until the key is found or the oldest kvset in the leaf node does not have the key. Due to the determinative nature of parent-to-child key mappings, there will be only one leaf searched, and the oldest kvset in that leaf will have the oldest key entries. Thus, if the illustrated search path is followed and the key is not found, then the key is not in the KVDB. Because KVDBs include a base level (e.g., in memory or on block media with or without sub-levels) with heterogenous kvsets (e.g., node (0,0)), a TID, or other KVS tree identifier, is used in conjunction with the key to both search heterogenous kvsets and also to transition from the base level to a subsequent level specific to that tree.

The search stops as soon as the newest key entry for the key is found. Thus, the search path moves from newest to oldest and stops as soon as a key entry for the key is located. This behavior allows the immutability of the kvsets to remain by not requiring an obsolete key-value pair to be immediately removed from the KVDB. Instead, the newer value, or a tombstone to indicate deletion, is placed in a newer kvset and will be found first, resulting in an accurate response to the query without regard to the older key-pair version still resident in the KVDB.

In an example, the search for key K may be performed by setting a current node to the first node of the base level. If either a key-value pair or a tombstone with key K is found in the current node then the search is complete and either the associated value or an indication of "key not found", respectively, is returned as the result. If the key K is not found, the current node is set to the child of the node as determined by the key K and the key distribution method used for spill compaction. As noted above, when comparing the key in a heterogenous kvset, a KVS tree identifier is used in conjunction with the key to determine whether or not the key is found. Thus, a search for key 'A' in KVS tree T1 will return "key not found" if the only entry with key 'A' in the KVDB is in KVS tree T2. Because subsequent levels have homogeneous kvsets for a single KVS tree, a match on the key alone is sufficient, operating in the same manner as a KVS tree alone.

If no such child node exists then the search is complete and an indication of "key not found" is the result. Otherwise, the search for the key K in the current node's kvsets is performed and the process repeats. Conceptually, a search for a key K in a KVS tree follows the same path through the KVS tree that every key-value pair or tombstone with key K takes as the result of spill compaction.

Due to the determinative mapping between parent nodes and child nodes based on TIDs and keys, only one node per level in the KVDB is searched until either a key-value pair or a tombstone with key K is found, or a node in the last (e.g., largest numbered) level in the KVDB is searched. Thus, the search is highly efficient.

Figure 19:
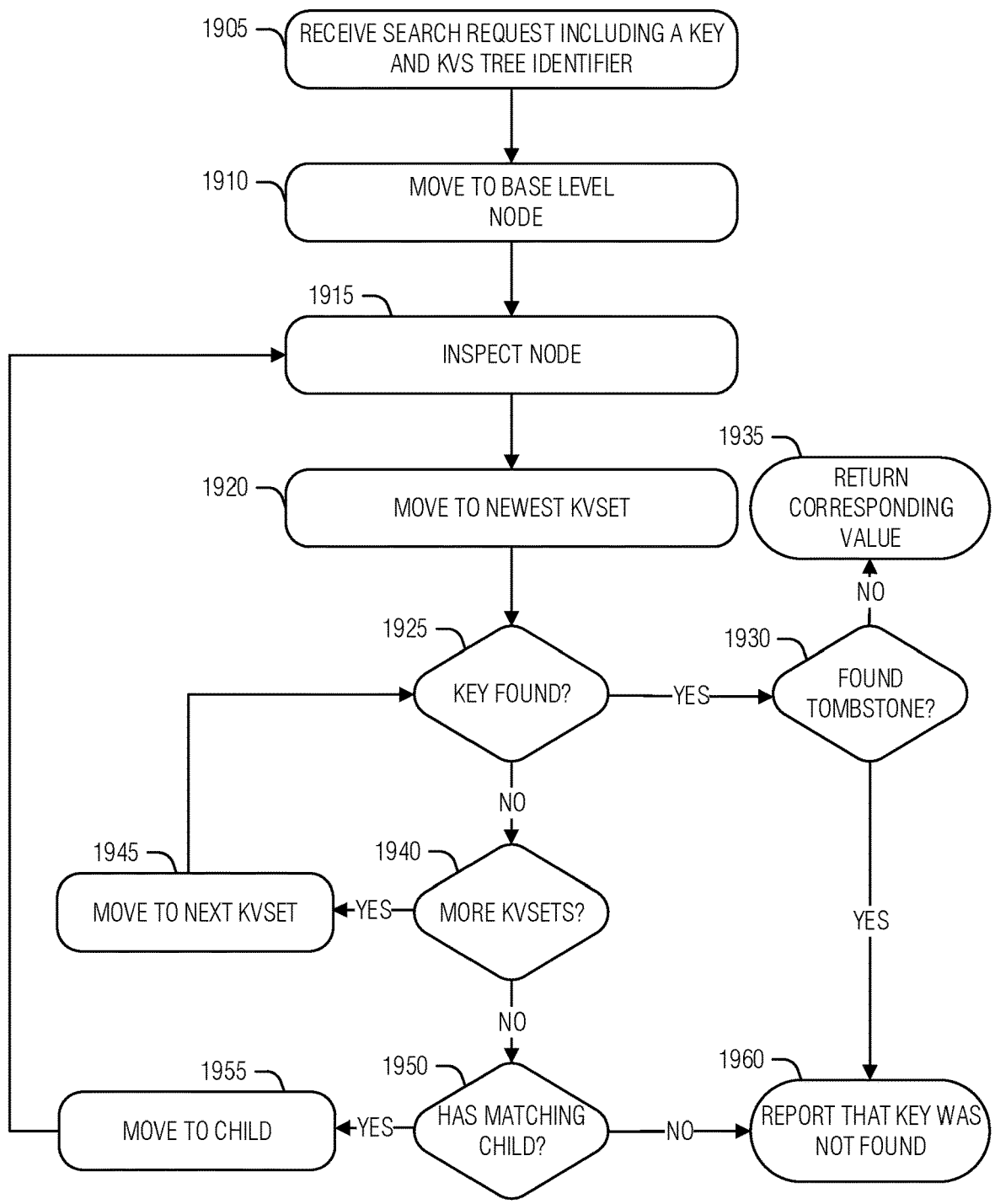
FIG. 19 illustrates an example of a method for performing a key search, according to an embodiment.

FIG. 19 illustrates an example of a method 1900 for performing a key search, according to an embodiment. The operations of the method 1900 are implemented with electronic hardware, such as that described throughout at this application, including below with respect to FIG. 21 (e.g., circuits).

At operation 1905, a search request including a key and KVS tree identifier is received.

At operation 1910, the first node in the base level of the KVDB is selected as the current node.

At operation 1915, the current node is inspected.

At operation 1920, the inspection starts with a query to the newest kvset of the current node.

At decision 1925, if the key is not found, the method 1900 proceeds to decision 1940 and otherwise proceeds to decision 1930 if the key is found. If the kvset being searched is a heterogenous kvset (e.g., it is in the base level of the KVDB), the key is searched based on the KVS tree identifier. The KVS tree identifier may be used to filter key results, or it may be combined with the key to determine a match. If the kvset being searched is a homogeneous kvset, the KVS tree identifier is not used to determine whether the key is found.

At decision 1930, if the key entry corresponding to the key includes, or references, a tombstone, the method 1900 proceeds to result 1960 and otherwise proceeds to result 1935.

At result 1935, a value corresponding to a newest key entry for the key is returned in answer to the search request.

At decision 1940, if there are more kvsets in the current node, the method 1900 proceeds to operation 1945 and otherwise proceeds to decision 1950.

At operation 1945, the method 1900 selects the next newest kvset in the current node to query for the key and proceeds to decision 1925.

At decision 1950, if the current node does not have any child nodes that match the spill function for the key (and the KVS tree identifier in the case of a base level to subsequent level spill), the method 1900 proceeds to the result 1960 and otherwise proceeds to the operation 1955 otherwise. Thus, the spill function is dependent upon both the KVS tree identifier and the key when transition from the common root structure (e.g., base level) to a KVS tree specific subsequent level as described above. However, in between base levels, if they exist, or in between subsequent levels, the key may be use alone by the spill function.

At operation 1955, the child node matching the spill function for the key (and the KVS tree identifier in the case of a base level to subsequent level transition) is set as the current node and the method 1900 proceeds to operation 1915.

At result 1960, a negative indication of the search, such as "key not found," is returned in answer to the search request.

Scan operations differ from a search in that multiple keys are being sought. A typical scan operation may include search for a range of keys in which the search specifies multiple keys to bound the range. In general, the scan specifies a criterion and expects a result of all keys in a KVS tree of a KVDB that meet the criterion.

Figure 20:
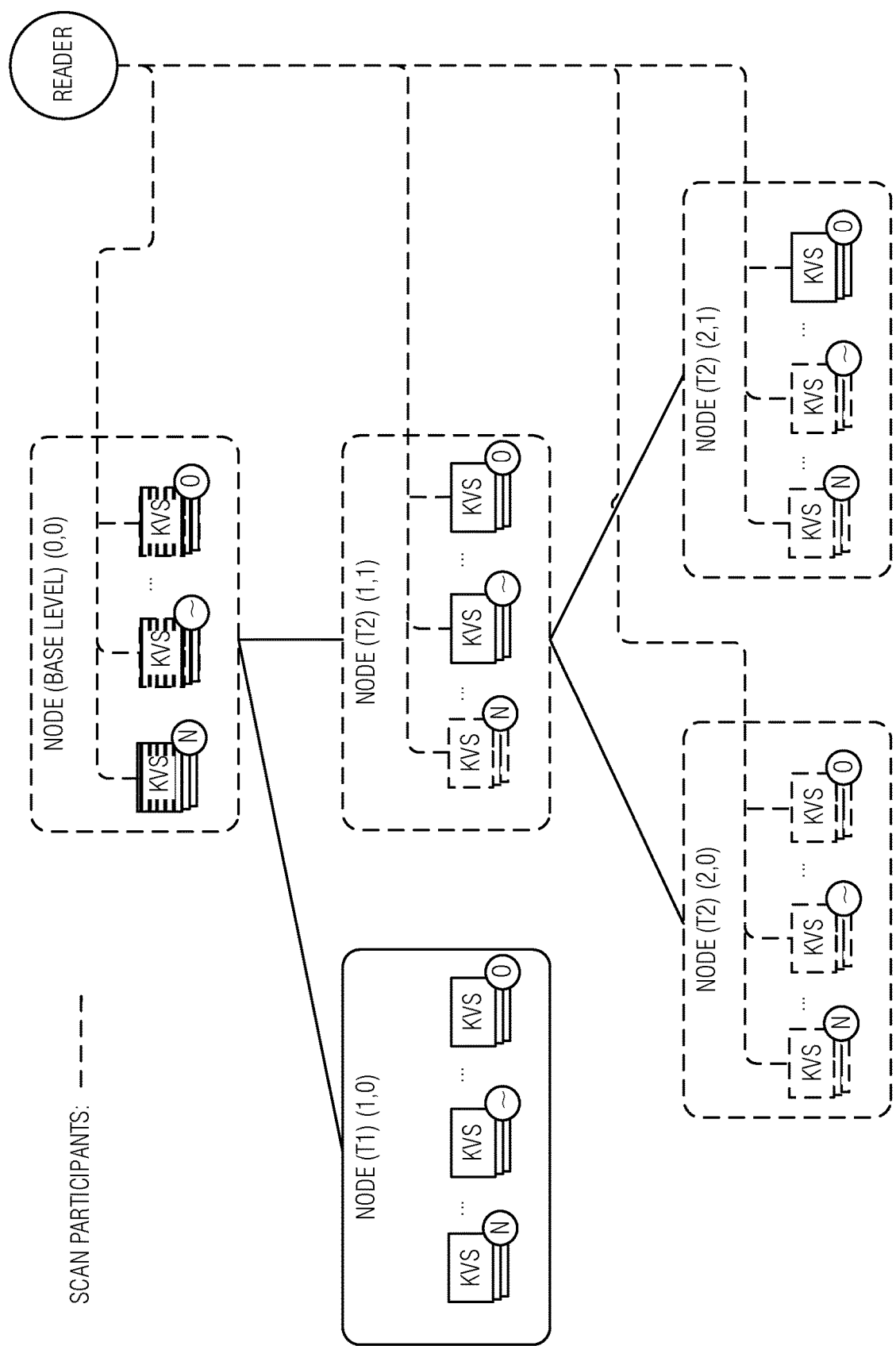
FIG. 20 is a block diagram illustrating a key scan, according to an embodiment.

FIG. 20 is a block diagram illustrating a key scan, according to an embodiment. The key scan, or pure scan, identifies every kvset in every node of a KVS tree, in the KVDB, containing a key entry that meets the scan criterion (e.g., falls within a specified range). While the keystore of kvsets permits an efficient search for a particular key, to ensure that every key meeting the scan criterion is found, every kvset in which that KVS tree's entries may be found is searched. Thus, for KVS tree T2, the heterogenous kvsets of the base level (e.g., in memory, on disk, etc.) are searched along with every subsequent level node corresponding to T2; node (1,0) is omitted because it corresponds to KVS tree T1. However, due the key-sorted nature of key-value storage in kvsets, the scan may quickly determine whether a key that meets the criterion is in a given kvset, without looking at every key. This is still better than the capabilities offered by the WB tree, for example, as the key-value pairs are not stored in a key-sorted structure, but rather keys are kept to resolve key-hash collisions. Thus, every key in a WB tree must be read to satisfy a scan.

To facilitate the scan, the keys are stored in kvsets in key-sorted order. Thus, a given key may be located in log time and keys within the range (e.g., a highest and lowest key in the range) may also be determined quickly. Further, kvset meta data may be used to speed scanning even further. For example, if the kvset maintains a minimum and maximum key value contained within the kvset, the scan may quickly determine that no keys in the kvset meet a specified range. Similarly, maintaining a bloom filter of kvset keys may be used to quickly determine that certain keys are not in a given kvset's key store. Heterogenous kvsets may include additional meta data, or sorting, to address the inclusion of keys from multiple KVS trees. For example, the keys may be first sorted by TID, and then by key. In an example, the keys across multiple trees may be sorted together with meta data identifying the TID for a key, allowing a user process to filter the keys. In an example, a TID is provided and a filtered and sorted list of keys is returned.

In an example (not illustrated), aside from the above, the scan may proceed much like a search with the exception that every node corresponding to the KVS tree identifier is visited. Thus, the scan reads from the kvsets the newest record for every TID-key combination that meets the criterion, where the newest record for a given key K may be either a key-value pair or key tombstone. As noted above, within a given node in the KVDB, the kvsets are ordered from newest to oldest, and that the kvsets in a node at a lower level (L+1) are older than the kvsets in a node at a level L. After the keys meeting the criterion are found, they are returned in a result set to the requester.

The search-like scan described above may be improved when one realizes that visitation of every kvset in every node of a given KVS tree in the KVDB occurs in a scan. Thus, in an example, the kvsets in which a given KVS tree's entries may be found may be read simulataneously. The simultaneous reading of all kvsets may result in a very large buffer (e.g., storage location for returned results). This, however, may be mitigated by ability to quickly determine whether a given kvset has keys that meet the scan criterion (e.g., within a range). Thus, every kvset may be visited, but only those kvsets with keys that meet the criterion are read. This example is illustrated in FIG. 20. Specifically, the reader simultaneously visits all of the kvsest (e.g., the dashed lines and dashed kvsets) for KVS tree T2 and yet reads only a subset of the kvsets (dashed kvsets). This technique supports iterator style semantics where a program may ask for a next or previous key. The sorted nature of the keys in the kvsets permits a rapid identification of a next key, and if there are collisions on a key (e.g., multiple entries for the same key), which value is the newest to return to the program—unless the newest value is a tombstone in which case the iterator should skip that key and offer the newest value for the next key.

In an example, the scan may include receiving a scan request including a key range (or other criterion). In an example, the scan proceeds by collecting keys specified by the range from each kvset of a node set from the tree into a found set. In an example, the node set includes every node in the tree. In an example, the scan proceeds by reducing the found set to a result set by keeping key-value pairs that correspond to a most recent entry for a key that is not a tombstone. the scan completes by returning the result set.

The scan illustrated in FIG. 20 may called a "pure scan," or "full scan" because every kvset of a KVS tree (e.g., all base level kvsets and subsequent level kvsets corresponding to the KVS tree) are searched. A modification to the full scan is a prefix scan. A prefix scan locates all key-value pairs (if any) in a KVDB for a KVS tree where the keys all start with a specified prefix. Although the prefix is less than an entire key, and may thus match multiple keys, the prefix portion of the key is at least as large as the portion of the key used by the spill functions (e.g., the first, second, or third determinative mappings described above) to create the spill value. Thus, if the spill function uses the first subkey of the key, the prefix includes the first subkey (and may include additional subkeys). This requirement allows the determinative mappings to improve prefix scan performance over pure scan performance because only those nodes in the path of the prefix for KVS tree in the KVDB are visited.

In an example, the spill value is based on the first subkey of the key. In this example, a specified prefix includes a value for the first subkey of the key. In this example, the prefix scan may proceed by identifying every kvset in every node of the KVDB corresponding to the KVS tree that contains a key-value pair or tombstone with a key starting with the specified prefix. As noted above, in heterogeneous kvsets, a KVS tree identifier is used to distinguish keys for the KVS tree being searched and keys from other KVS trees that are not part of the scan. In contrast to the pure scan, the prefix scan does not visit every node of the KVS tree in the KVDB. Rather, the inspected nodes may be confined to those along the path determined by the spill value of the value that defines the prefix. In an example, instead of a using the first subkey, a last subkey may be used for the spill value to effect a suffix scan. In this example, a specified suffix includes a value for the last subkey of the keys. Additional varieties of scan may be implemented based on the specific subkey used in the spill value calculation.

A prefix scan is extremely efficient both because the number of nodes that are examined is limited to one node per level of the KVDB, and because keys in the kvset key stores are generally stored in a structure that allows ready identification of keys that match the prefix. Additionally, the kvset metrics discussed above with respect to the key scan may also aid in speeding the search.

The prefix scan may include receiving a scan request with a KVS tree identifier and a key prefix. Here a node-set to be searched includes each node that corresponds to the key prefix and the KVS tree identifier. In an example, node correspondence to the key prefix is determined by a portion of a spill value derived from the key prefix, the portion of the spill value determined by a KVS tree identifier and a level of a given node in the KVDB.

The prefix scan proceeds by collecting keys specified by the KVS tree identifier and the prefix from each kvset of the node set into a found set. The prefix scan proceeds by reducing the found set to a result set by keeping key-value pairs that correspond to a most recent entry for a key that is not a tombstone and that is not deleted by a more recent tombstone. The prefix scan completes by returning the result set.

As described above, KVDBs provide a low-overhead and resource efficient structure to store multiple key-value data trees. KVDBs trees include many of the advantages of KVS trees, LSM trees, and WB trees without the drawbacks of these structures. For example, in regard to storage space or write-amplification due to compaction, in a KVDB, the size of the nodes may be easily controlled to limit the maximum amount of temporary storage capacity used for compaction. Further, key compaction may be used to increase search efficiency in a node without reading and writing value-blocks, thereby reducing read-amplification and write-amplification due to compaction. In a traditional LSM Tree, the amount of temporary storage capacity required for compaction, as well as the amount of read-amplification and write-amplification, may be proportional to the amount of key-value capacity at the tree-level being compacted—which is exacerbated by the fact that the key-value capacity of tree-levels in an LSM Tree is typically configured to grow exponentially at each tree-level deeper in the tree.

With regard to key search efficiency, in a KVDB, searching for a key K involves searching only one node per level, which represents only a small fraction of the total keys in the KVDB. In a traditional LSM Tree, searching for a key K requires searching all keys in each level.

With regard to prefix-scan efficiency, as noted above, KVDBs permit finding all keys that start with a specified prefix by searching only one node per level, which represents only a small fraction of the total keys in the KVDB. In a traditional LSM Tree, finding all keys that start with a specified prefix requires searching all keys in each level.

With regard to scan efficiency, KVDBs described above permit finding all keys in a given range, or that start with a specified prefix, by leveraging the data in kvsets. In a WB Tree the keys are unordered, resulting in no efficient way to implement either of these operations. Thus, in a WB tree, every entry of the tree must be retrieved and inspected to perform these scans.

With regard to compaction performance, in a KVDB the key, key-value, and spill compaction maintenance techniques—with the exception of hoist compaction—are non-blocking because of the temporally sorted nature of kvsets in nodes. Thus, new kvsets may be added to nodes upon which key, key-value, or spill compaction is being performed by simply placing the new kvset in a newest position. In a WB Tree, compaction is a blocking operation.

With regard to benefits over separate KVS trees—or other structures implemented with several trees, such as LSM trees, B tress, etc. to support multi-dimensional data (e.g., "column families")—KVDBs increase efficiency for transactions, ingest sizes, and memory use. For example, transactions that store or delete key-value pairs in more than one KVS tree in the KVDB may be made atomic without the overhead of a write-ahead log (e.g., including additional processing, I/O's, and storage use) by ingesting all key-value pairs or tombstones associated with a given transaction in the same kvset (or collection of atomically-ingested kvsets). Also, kvset ingest size, and hence I/O efficiency, may be increased because ingested kvsets may comprise key-value pairs or tombstones associated with any or all of the KVS trees in a KVDB. Thus, if a single KVS tree's ingests are below a threshold for efficiency on ingest size (e.g., block size of device being written to), additional entries from another KVS tree may fill the gap. Further, a total amount of memory for kvset buffering—e.g., the byte addressable (e.g, memory) level of the base level—may be reduced versus maintaining separate kvset buffers for each KVS tree in a KVDB, again because a kvset in the in-memory base level may comprise key-value pairs or tombstones associated with any or all of the KVS trees in a KVDB.

Figure 21:
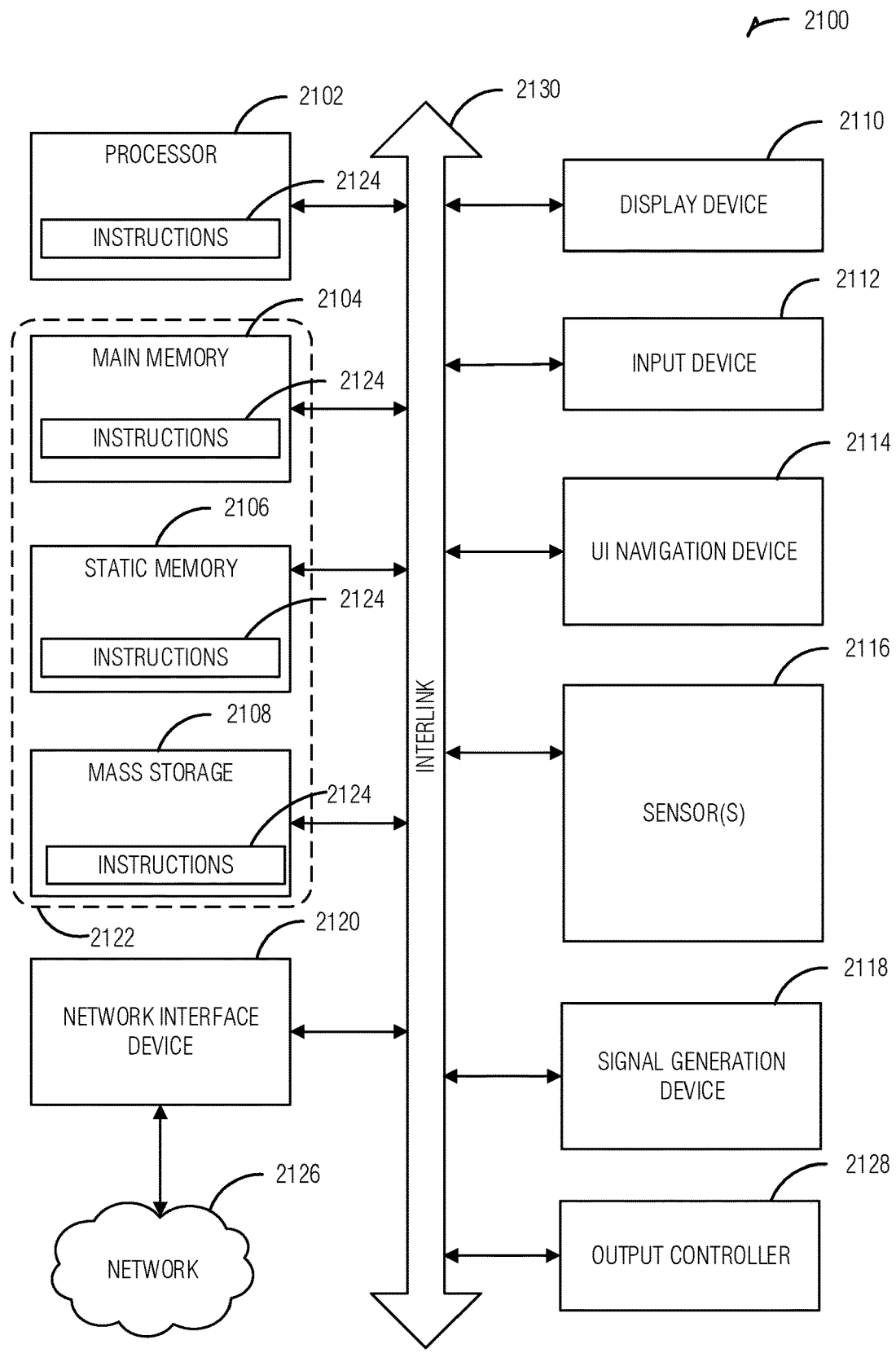
FIG. 21 is a block diagram illustrating an example of a machine upon which one or more embodiments may be implemented.

FIG. 21 illustrates a block diagram of an example machine 2100 upon which any one or more of the techniques (e.g., methodologies) discussed herein may perform. In alternative embodiments, the machine 2100 may operate as a standalone device or may be connected (e.g., networked) to other machines. In a networked deployment, the machine 2100 may operate in the capacity of a server machine, a client machine, or both in server-client network environments. In an example, the machine 2100 may act as a peer machine in peer-to-peer (P2P) (or other distributed) network environment. The machine 2100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 2100 may include a hardware processor 2102 (e.g., a central processing unit (CPU), a graphics processing unit (GPU), a hardware processor core, or any combination thereof), a main memory 2104 and a static memory 2106, some or all of which may communicate with each other via an interlink (e.g., bus) 2108. The machine 2100 may further include a display unit 2110, an alphanumeric input device 2112 (e.g., a keyboard), and a user interface (UI) navigation device 2114 (e.g., a mouse). In an example, the display unit 2110, input device 2112 and UI navigation device 2114 may be a touch screen display. The machine 2100 may additionally include a storage device (e.g., drive unit) 2116, a signal generation device 2118 (e.g., a speaker), a network interface device 2120, and one or more sensors 2121, such as a global positioning system (GPS) sensor, compass, accelerometer, or other sensor. The machine 2100 may include an output controller 2128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2116 may include a machine readable medium 2122 on which is stored one or more sets of data structures or instructions 2124 (e.g., software) embodying or utilized by any one or more of the techniques or functions described herein. The instructions 2124 may also reside, completely or at least partially, within the main memory 2104, within static memory 2106, or within the hardware processor 2102 during execution thereof by the machine 2100. In an example, one or any combination of the hardware processor 2102, the main memory 2104, the static memory 2106, or the storage device 2116 may constitute machine readable media.

While the machine readable medium 2122 is illustrated as a single medium, the term "machine readable medium" may include a single medium or multiple media (e.g., a centralized or distributed database, and/or associated caches and servers) configured to store the one or more instructions 2124.

The term "machine readable medium" may include any medium that is capable of storing, encoding, or carrying instructions for execution by the machine 2100 and that cause the machine 2100 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2124 may further be transmitted or received over a communications network 2126 using a transmission medium via the network interface device 2120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 2120 may include one or more physical jacks (e.g., Ethernet, coaxial, or phone jacks) or one or more antennas to connect to the communications network 2126. In an example, the network interface device 2120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2100, and includes digital or analog communications signals or other intangible medium to facilitate communication of such software.

ADDITIONAL NOTES & EXAMPLES

Example 1 is a KVS tree database on at least one machine readable medium, the KVS tree database comprising: a multi-level tree including: a base level with a heterogeneous key-value set (kvset) in a node, the heterogeneous kvset including a first entry for a first KVS tree and a second entry for a second KVS tree; and subsequent levels that include, at least one subsequent level, the subsequent level including: a first KVS tree node including a first homogeneous kvset for the first KVS tree; and a second KVS tree node including a second homogeneous kvset for the second KVS tree; a first determinative mapping of entries between the base level and the subsequent level; and a second determinative mapping of entries between subsequent levels.

In Example 2, the subject matter of Example 1 includes, wherein the second determinative mapping is a determinative mapping specified for a KVS tree corresponding to nodes in the subsequent levels.

In Example 3, the subject matter of Examples 1-2 includes, wherein the first determinative mapping is a determinative mapping based on a tree identifier for a KVS tree corresponding to an entry.

In Example 4, the subject matter of Examples 1-3 includes, wherein a heterogeneous kvset entry includes a tree identifier.

In Example 5, the subject matter of Examples 1-4 includes, wherein a homogeneous kvset entry excludes a tree identifier.

In Example 6, the subject matter of Examples 1-5 includes, wherein the base level includes a first sublevel in a first machine readable medium of the at least one machine readable medium and a second sublevel in a second machine readable medium of the at least one machine readable medium.

In Example 7, the subject matter of Example 6 includes, wherein the second sublevel includes more than one node, and wherein the base level includes a third determinative mapping between the first sublevel and the second sublevel.

In Example 8, the subject matter of Example 7 includes, wherein the third determinative mapping does not use tree identifiers of entries.

In Example 9, the subject matter of Examples 6-8 includes, wherein the first machine readable medium is byte addressable and wherein the second machine readable is block addressable.

Example 10 is a system comprising processing circuitry to: receive a first entry that includes, a first key and a first tree identifier corresponding to a first KVS tree; receive a second entry that includes a second key and a second tree identifier corresponding to a second KVS tree; and write the first entry and the second entry to a heterogeneous key-value set (kvset) in a base level node of a KVS tree database, the KVS tree database including at least one base level node and at least one subsequent level node, each subsequent level node corresponding to a single KVS tree and including homogeneous kvsets for the single KVS tree.

In Example 11, the subject matter of Example 10 includes, wherein the processing circuitry compacts a node of the KVS tree database.

In Example 12, the subject matter of Example 11 includes, wherein, to compact a node of the tree, the processing circuitry performs a key compaction.

In Example 13, the subject matter of Example 12 includes, wherein, to perform the key compaction, the processing circuitry: locates a set of entries with matching identifiers across multiple kvsets of the node; writes a newest entry of the set of entries to a new kvset in the node; and removes the multiple kvsets from the node.

In Example 14, the subject matter of Example 13 includes, wherein the node is a base level node, and wherein the identifiers are based on a tree identifier and key tuple (TIKT) for an entry.

In Example 15, the subject matter of Examples 13-14 includes, wherein the key compaction is performed on a subsequent level node, and wherein the identifiers are based only on a key for an entry.

In Example 16, the subject matter of Examples 13-15 includes, wherein, to remove the multiple kvsets from the node, the processing circuitry is to remove values corresponding to the multiple kvsets from the node.

In Example 17, the subject matter of Examples 11-16 includes, wherein, to compact a node of the tree, the processing circuitry performs a spill compaction including: calculating a determinative mapping from an entry in the node, the determinative mapping specifying a single child node of the node; and writing the entry to the single child node.

In Example 18, the subject matter of Example 17 includes, wherein the node is a base level node and the single child node is a subsequent level node, and wherein the determinative mapping is based on a tree identifier and key tuple (TIKT) for the entry.

In Example 19, the subject matter of Examples 17-18 includes, wherein the node and the single child node are subsequent level nodes, and wherein the determinative mapping is based only on a key for the entry.

In Example 20, the subject matter of Example 19 includes, wherein the determinative mapping varies based on a tree level of the node.

In Example 21, the subject matter of Example 20 includes, wherein the determinative mapping is a portion of a hash of the key, the portion specified by the tree level and a pre-set apportionment of the hash.

In Example 22, the subject matter of Example 21 includes, wherein the pre-set apportionment defines a maximum number of child nodes for at least some tree levels.

In Example 23, the subject matter of Examples 21-22 includes, wherein the pre-set apportionment defines a maximum depth to the KVS tree.

In Example 24, the subject matter of Examples 11-23 includes, wherein, to compact a node of the tree, the processing circuitry performs a hoist compaction, including writing a tree identifier to an entry written to a parent node when the parent node is a base level node and the entry does not have the tree identifier.

In Example 25, the subject matter of Examples 10-24 includes, wherein the processing circuitry searches a node of the KVS tree database for an entry.

In Example 26, the subject matter of Example 25 includes, wherein the node is a base level node, and wherein an entry is identified by a tree identifier and key tuple (TIKT) of the entry.

In Example 27, the subject matter of Examples 25-26 includes, wherein the node is a subsequent level node, and wherein an entry is identified only by a key of the entry.

In Example 28, the subject matter of Examples 25-27 includes, wherein, to move from a first node to a second node in a search, the processing circuitry uses a determinative mapping from a query entry.

In Example 29, the subject matter of Example 28 includes, wherein a first determinative mapping is applied when the first node and the second node are base levels nodes, wherein a second determinative mapping is applied when the first node is a base level node and the second node is a subsequent level node, and wherein a third determinative mapping is applied when the first node and the second node are subsequent level nodes.

In Example 30, the subject matter of Example 29 includes, wherein the second determinative mapping uses a tree identifier of the entry.

In Example 31, the subject matter of Examples 29-30 includes, wherein the first determinative mapping and the second determinative mapping do not use a tree identifier of the entry.

Example 32 is a method to implement a KVS tree database, the method comprising: receiving a first entry that includes, a first key and a first tree identifier corresponding to a first KVS tree; receiving a second entry that includes a second key and a second tree identifier corresponding to a second KVS tree; and writing the first entry and the second entry to a heterogeneous key-value set (kvset) in a base level node of a KVS tree database, the KVS tree database including at least one base level node and at least one subsequent level node, each subsequent level node corresponding to a single KVS tree and including homogeneous kvsets for the single KVS tree.

In Example 33, the subject matter of Example 32 includes, compacting a node of the KVS tree database.

In Example 34, the subject matter of Example 33 includes, wherein compacting the node of the tree includes performing a key compaction.

In Example 35, the subject matter of Example 34 includes, wherein performing the key compaction includes: locating a set of entries with matching identifiers across multiple kvsets of the node; writing a newest entry of the set of entries to a new kvset in the node; and removing the multiple kvsets from the node.

In Example 36, the subject matter of Example 35 includes, wherein the node is a base level node, and wherein the identifiers are based on a tree identifier and key tuple (TIKT) for an entry.

In Example 37, the subject matter of Examples 35-36 includes, wherein the key compaction is performed on a subsequent level node, and wherein the identifiers are based only on a key for an entry.

In Example 38, the subject matter of Examples 35-37 includes, wherein removing the multiple kvsets from the node includes removing values corresponding to the multiple kvsets from the node.

In Example 39, the subject matter of Examples 33-38 includes, wherein compacting the node of the tree includes performing a spill compaction including: calculating a determinative mapping from an entry in the node, the determinative mapping specifying a single child node of the node; and writing the entry to the single child node.

In Example 40, the subject matter of Example 39 includes, wherein the node is a base level node and the single child node is a subsequent level node, and wherein the determinative mapping is based on a tree identifier and key tuple (TIKT) for the entry.

In Example 41, the subject matter of Examples 39-40 includes, wherein the node and the single child node are subsequent level nodes, and wherein the determinative mapping is based only on a key for the entry.

In Example 42, the subject matter of Example 41 includes, wherein the determinative mapping varies based on a tree level of the node.

In Example 43, the subject matter of Example 42 includes, wherein the determinative mapping is a portion of a hash of the key, the portion specified by the tree level and a pre-set apportionment of the hash.

In Example 44, the subject matter of Example 43 includes, wherein the pre-set apportionment defines a maximum number of child nodes for at least some tree levels.

In Example 45, the subject matter of Examples 43-44 includes, wherein the pre-set apportionment defines a maximum depth to the KVS tree.

In Example 46, the subject matter of Examples 33-45 includes, wherein compacting the node of the tree includes performing a hoist compaction, including writing a tree identifier to an entry written to a parent node when the parent node is a base level node and the entry does not have the tree identifier.

In Example 47, the subject matter of Examples 32-46 includes, searching a node of the KVS tree database for an entry.

In Example 48, the subject matter of Example 47 includes, wherein the node is a base level node, and wherein an entry is identified by a tree identifier and key tuple (TIKT) of the entry.

In Example 49, the subject matter of Examples 47-48 includes, wherein the node is a subsequent level node, and wherein an entry is identified only by a key of the entry.

In Example 50, the subject matter of Examples 47-49 includes, wherein a determinative mapping from a query entry is used to move from a first node to a second node in a search.

In Example 51, the subject matter of Example 50 includes, wherein a first determinative mapping is applied when the first node and the second node are base levels nodes, wherein a second determinative mapping is applied when the first node is a base level node and the second node is a subsequent level node, and wherein a third determinative mapping is applied when the first node and the second node are subsequent level nodes.

In Example 52, the subject matter of Example 51 includes, wherein the second determinative mapping uses a tree identifier of the entry.

In Example 53, the subject matter of Examples 51-52 includes, wherein the first determinative mapping and the second determinative mapping do not use a tree identifier of the entry.

Example 54 is a machine readable medium including instructions that, when executed by a machine, cause the machine to perform any method of Examples 32-53.

Example 55 is a system comprising means to perform any method of Examples 32-53.

Example 56 is a machine readable medium including instructions that, when executed by processing circuitry, cause the processing circuitry to perform operations comprising: receiving a first entry that includes, a first key and a first tree identifier corresponding to a first KVS tree; receiving a second entry that includes a second key and a second tree identifier corresponding to a second KVS tree; and writing the first entry and the second entry to a heterogeneous key-value set (kvset) in a base level node of a KVS tree database, the KVS tree database including at least one base level node and at least one subsequent level nodes, each subsequent level node corresponding to a single KVS tree and including homogeneous kvsets for the single KVS tree.

In Example 57, the subject matter of Example 56 includes, wherein the operations comprise compacting a node of the KVS tree database.

In Example 58, the subject matter of Example 57 includes, wherein compacting the node of the tree includes performing a key compaction.

In Example 59, the subject matter of Example 58 includes, wherein performing the key compaction includes: locating a set of entries with matching identifiers across multiple kvsets of the node; writing a newest entry of the set of entries to a new kvset in the node; and removing the multiple kvsets from the node.

In Example 60, the subject matter of Example 59 includes, wherein the node is a base level node, and wherein the identifiers are based on a tree identifier and key tuple (TIKT) for an entry.

In Example 61, the subject matter of Examples 59-60 includes, wherein the key compaction is performed on a subsequent level node, and wherein the identifiers are based only on a key for an entry.

In Example 62, the subject matter of Examples 59-61 includes, wherein removing the multiple kvsets from the node includes removing values corresponding to the multiple kvsets from the node.

In Example 63, the subject matter of Examples 57-62 includes, wherein compacting the node of the tree includes performing a spill compaction including: calculating a determinative mapping from an entry in the node, the determinative mapping specifying a single child node of the node; and writing the entry to the single child node.

In Example 64, the subject matter of Example 63 includes, wherein the node is a base level node and the single child node is a subsequent level node, and wherein the determinative mapping is based on a tree identifier and key tuple (TIKT) for the entry.

In Example 65, the subject matter of Examples 63-64 includes, wherein the node and the single child node are subsequent level nodes, and wherein the determinative mapping is based only on a key for the entry.

In Example 66, the subject matter of Example 65 includes, wherein the determinative mapping varies based on a tree level of the node.

In Example 67, the subject matter of Example 66 includes, wherein the determinative mapping is a portion of a hash of the key, the portion specified by the tree level and a pre-set apportionment of the hash.

In Example 68, the subject matter of Example 67 includes, wherein the pre-set apportionment defines a maximum number of child nodes for at least some tree levels.

In Example 69, the subject matter of Examples 67-68 includes, wherein the pre-set apportionment defines a maximum depth to the KVS tree.

In Example 70, the subject matter of Examples 57-69 includes, wherein compacting the node of the tree includes performing a hoist compaction, including writing a tree identifier to an entry written to a parent node when the parent node is a base level node and the entry does not have the tree identifier.

In Example 71, the subject matter of Examples 56-70 includes, wherein the operations comprise searching a node of the KVS tree database for an entry.

In Example 72, the subject matter of Example 71 includes, wherein the node is a base level node, and wherein an entry is identified by a tree identifier and key tuple (TIKT) of the entry.

In Example 73, the subject matter of Examples 71-72 includes, wherein the node is a subsequent level node, and wherein an entry is identified only by a key of the entry.

In Example 74, the subject matter of Examples 71-73 includes, wherein a determinative mapping from a query entry is used to move from a first node to a second node in a search.

In Example 75, the subject matter of Example 74 includes, wherein a first determinative mapping is applied when the first node and the second node are base levels nodes, wherein a second determinative mapping is applied when the first node is a base level node and the second node is a subsequent level node, and wherein a third determinative mapping is applied when the first node and the second node are subsequent level nodes.

In Example 76, the subject matter of Example 75 includes, wherein the second determinative mapping uses a tree identifier of the entry.

In Example 77, the subject matter of Examples 75-76 includes, wherein the first determinative mapping and the second determinative mapping do not use a tree identifier of the entry.

Example 78 is a system comprising: means for receiving a first entry that includes, a first key and a first tree identifier corresponding to a first KVS tree; means for receiving a second entry that includes a second key and a second tree identifier corresponding to a second KVS tree; and means for writing the first entry and the second entry to a heterogeneous key-value set (kvset) in a base level node of a KVS tree database, the KVS tree database including at least one base level node and at least one subsequent level node, each subsequent level node corresponding to a single KVS tree and including homogeneous kvsets for the single KVS tree.

In Example 79, the subject matter of Example 78 includes, means for compacting a node of the KVS tree database.

In Example 80, the subject matter of Example 79 includes, wherein the means for compacting the node of the tree include means for performing a key compaction.

In Example 81, the subject matter of Example 80 includes, wherein the means for performing the key compaction include: means for locating a set of entries with matching identifiers across multiple kvsets of the node; means for writing a newest entry of the set of entries to a new kvset in the node; and means for removing the multiple kvsets from the node.

In Example 82, the subject matter of Example 81 includes, wherein the node is a base level node, and wherein the identifiers are based on a tree identifier and key tuple (TIKT) for an entry.

In Example 83, the subject matter of Examples 81-82 includes, wherein the key compaction is performed on a subsequent level node, and wherein the identifiers are based only on a key for an entry.

In Example 84, the subject matter of Examples 81-83 includes, wherein the means for removing the multiple kvsets from the node include means for removing values corresponding to the multiple kvsets from the node.

In Example 85, the subject matter of Examples 79-84 includes, wherein the means for compacting the node of the tree includes performing a spill compaction include: means for calculating a determinative mapping from an entry in the node, the determinative mapping specifying a single child node of the node; and means for writing the entry to the single child node.

In Example 86, the subject matter of Example 85 includes, wherein the node is a base level node and the single child node is a subsequent level node, and wherein the determinative mapping is based on a tree identifier and key tuple (TIKT) for the entry.

In Example 87, the subject matter of Examples 85-86 includes, wherein the node and the single child node are subsequent level nodes, and wherein the determinative mapping is based only on a key for the entry.

In Example 88, the subject matter of Example 87 includes, wherein the determinative mapping varies based on a tree level of the node.

In Example 89, the subject matter of Example 88 includes, wherein the determinative mapping is a portion of a hash of the key, the portion specified by the tree level and a pre-set apportionment of the hash.

In Example 90, the subject matter of Example 89 includes, wherein the pre-set apportionment defines a maximum number of child nodes for at least some tree levels.

In Example 91, the subject matter of Examples 89-90 includes, wherein the pre-set apportionment defines a maximum depth to the KVS tree.

In Example 92, the subject matter of Examples 79-91 includes, wherein the means for compacting the node of the tree include means for performing a hoist compaction, including writing a tree identifier to an entry written to a parent node when the parent node is a base level node and the entry does not have the tree identifier.

In Example 93, the subject matter of Examples 78-92 includes, wherein the operations comprise searching a node of the KVS tree database for an entry.

In Example 94, the subject matter of Example 93 includes, wherein the node is a base level node, and wherein an entry is identified by a tree identifier and key tuple (TIKT) of the entry.

In Example 95, the subject matter of Examples 93-94 includes, wherein the node is a subsequent level node, and wherein an entry is identified only by a key of the entry.

In Example 96, the subject matter of Examples 93-95 includes, wherein a determinative mapping from a query entry is used to move from a first node to a second node in a search.

In Example 97, the subject matter of Example 96 includes, wherein a first determinative mapping is applied when the first node and the second node are base levels nodes, wherein a second determinative mapping is applied when the first node is a base level node and the second node is a subsequent level node, and wherein a third determinative mapping is applied when the first node and the second node are subsequent level nodes.

In Example 98, the subject matter of Example 97 includes, wherein the second determinative mapping uses a tree identifier of the entry.

In Example 99, the subject matter of Examples 97-98 includes, wherein the first determinative mapping and the second determinative mapping do not use a tree identifier of the entry.

Example 100 is at least one machine-readable medium including instructions that, when executed by processing circuitry, cause the processing circuitry to perform operations to implement of any of Examples 1-99.

Example 101 is an apparatus comprising means to implement of any of Examples 1-99.

Example 102 is a system to implement of any of Examples 1-99.

Example 103 is a method to implement of any of Examples 1-99.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A method to implement a key-value store tree database comprising a multi-level tree, the multi-level tree comprising a base level and at least one subsequent level, the method comprising:
receiving a first entry that comprises a first key and a first tree identifier corresponding to a first key-value store tree;
receiving a second entry that includes a second key and a second tree identifier corresponding to a second key-value store tree; and
writing the first entry and the second entry to a heterogeneous key-value set in a single base level node of the base level of the multi-level tree, the base level comprising at least one base level node, the at least one subsequent level comprising at least one subsequent level node, each subsequent level node corresponding to a single key-value store tree and comprising homogeneous key-value sets for the single key-value store tree, the multi-level tree having a first determinative mapping of entries between the at least one base level node and the at least one subsequent level node and a second determinative mapping of entries between subsequent level nodes.

2. The method of claim 1, comprising compacting a node of the multi-level tree.

3. The method of claim 2, wherein compacting the node of the multi-level tree comprises performing a spill compaction the spill compaction comprising:
calculating a determinative mapping from an entry in the node, the determinative mapping specifying a single child node of the node; and
writing the entry to the single child node.

4. The method of claim 3, wherein the node and the single child node are subsequent level nodes, and wherein the determinative mapping is based only on a key for the entry.

5. The method of claim 2, wherein compacting the node of the multi-level tree comprises performing a hoist compaction, the hoist compaction comprising writing a tree identifier to an entry written to a parent node in response to the parent node is a base level node and the entry does not have the tree identifier.

6. The method of claim 1, comprising searching a node of the multi-level tree for an entry.

7. The method of claim 6, wherein the node is a base level node, and wherein an entry is identified by a tree identifier and key tuple of the entry.

8. The method of claim 6, wherein a determinative mapping from a query entry is used to move from a first node to a second node in a search.

9. The method of claim 8, wherein the first determinative mapping is applied when the first node and the second node are base levels nodes, wherein the second determinative mapping is applied when the first node is a base level node and the second node is a subsequent level node, and wherein a third determinative mapping is applied when the first node and the second node are subsequent level nodes.

10. The method of claim 9, wherein the second determinative mapping uses a tree identifier of the entry.

11. The method of claim 9, wherein the first determinative mapping and the second determinative mapping do not use a tree identifier of the entry.

12. A machine readable medium including instructions that, when executed by processing circuitry, cause the processing circuitry to perform operations for implementing a key-value store tree database, the key-value store tree database comprising a multi-level tree that comprises a base level and at least one subsequent level, the operations comprising:

receiving a first entry that comprises a first key and a first tree identifier corresponding to a first key-value store tree;

receiving a second entry that comprises a second key and a second tree identifier corresponding to a second key-value store tree; and writing the first entry and the second entry to a heterogeneous key-value set in a single base level node of the base level of the multi-level tree, the base level comprising at least one base level node, the at least one subsequent level comprising at least one subsequent level node, each subsequent level node corresponding to a single key-value store tree and comprising homogeneous key-value sets for the single key-value store tree, the multi-level tree having a first determinative mapping of entries between the at least one base level node and the at least one subsequent level node and a second determinative mapping of entries between subsequent level nodes.

13. The machine readable medium of claim 12, wherein the operations comprise compacting a node of the multi-level tree.

14. The machine readable medium of claim 13, wherein compacting the node of the multi-level tree comprises performing a key compaction.

15. The machine readable medium of claim 14, wherein performing the key compaction comprises:

locating a set of entries with matching identifiers across multiple key-value sets of the node;

writing a newest entry of the set of entries to a new key-value set in the node; and removing the multiple key-value sets from the node.

16. The machine readable medium of claim 15, wherein the node is a base level node, and wherein the identifiers are based on a tree identifier and key tuple for an entry.

17. The machine readable medium of claim 15, wherein the key compaction is performed on a subsequent level node, and wherein the identifiers are based only on a key for an entry.

18. The machine readable medium of claim 15, wherein removing the multiple key-value sets from the node comprises includes removing values corresponding to the multiple key-value sets from the node.

19. The machine readable medium of claim 18, wherein compacting the node of the multi-level tree comprises performing a spill compaction, the spill compaction comprising:

calculating a determinative mapping from an entry in the node, the determinative mapping specifying a single child node of the node; and writing the entry to the single child node.

20. The machine readable medium of claim 19, wherein the node is a base level node and the single child node is a subsequent level node, and wherein the determinative mapping is based on a tree identifier and key tuple for the entry.

21. The machine readable medium of claim 19, wherein the node and the single child node are subsequent level nodes, and wherein the determinative mapping is based only on a key for the entry.

22. The machine readable medium of claim 21, wherein the determinative mapping varies based on a tree level of the node.

23. The machine readable medium of claim 22, wherein the determinative mapping is a portion of a hash of the key, the portion specified by the tree level and a pre-set apportionment of the hash.

24. The machine readable medium of claim 23, wherein the pre-set apportionment defines a maximum number of child nodes for at least some tree levels.

25. The machine readable medium of claim 23, wherein the pre-set apportionment defines a maximum depth to the multi-level tree.

26. The machine readable medium of claim 13, wherein compacting the node of the multi-level tree comprises performing a hoist compaction, the hoist compaction comprising writing a tree identifier to an entry written to a parent node in response to the parent node is a base level node and the entry does not have the tree identifier.

27. The machine readable medium of claim 12, wherein the operations comprise searching a node of the multi-level tree for an entry.

28. The machine readable medium of claim 27, wherein the node is a base level node, and wherein an entry is identified by a tree identifier and key tuple of the entry.

29. The machine readable medium of claim 27, wherein the node is a subsequent level node, and wherein an entry is identified only by a key of the entry.

30. The machine readable medium of claim 27, wherein a determinative mapping from a query entry is used to move from a first node to a second node in a search.

31. The machine readable medium of claim 30, wherein the first determinative mapping is applied when the first node and the second node are base levels nodes, wherein the second determinative mapping is applied when the first node is a base level node and the second node is a subsequent level node, and wherein a third determinative mapping is applied when the first node and the second node are subsequent level nodes.

32. The machine readable medium of claim 31, wherein the second determinative mapping uses a tree identifier of the entry.

33. The machine readable medium of claim 31, wherein the first determinative mapping and the second determinative mapping do not use a tree identifier of the entry.

34. A system comprising:

a memory device to implement a key-value store tree database that comprises a multi-level tree, the multi-level tree comprising a base level and at least one subsequent level; and a hardware processor operatively coupled to the memory device, the processing device configured to perform operations comprising:

receiving a first entry that comprises a first key and a first tree identifier corresponding to a first key-value store tree;

receiving a second entry that comprises a second key and a second tree identifier corresponding to a second key-value store tree; and writing the first entry and the second entry to a heterogeneous key-value set in a single base level node of the base level of the multi-level tree, the base level comprising at least one base level node, the at least one subsequent level comprising at least one subsequent level node, each subsequent level node corresponding to a single key-value store tree and comprising homogeneous key-value sets for the single key-value store tree, the multi-level tree having a first determinative mapping of entries between the at least one base level node and the at least one subsequent level node and a second determinative mapping of entries between subsequent level nodes.

35. The system of claim 34, wherein the operations comprise compacting a node of the multi-level tree.

36. The system of claim 35, wherein compacting the node of the multi-level tree comprises performing a key compaction.

37. The system of claim 36, wherein performing the key compaction comprises:

locating a set of entries with matching identifiers across multiple key-value sets of the node;

writing a newest entry of the set of entries to a new key-value set in the node; and removing the multiple key-value sets from the node.

38. The system of claim 37, wherein the node is a base level node, and wherein the identifiers are based on a tree identifier and key tuple for an entry.

39. The system of claim 37, wherein the key compaction is performed on a subsequent level node, and wherein the identifiers are based only on a key for an entry.

40. The system of claim 37, wherein removing the multiple key-value sets from the node comprises removing values corresponding to the multiple key-value sets from the node.

41. The system of claim 35, wherein compacting the node of the multi-level tree comprises performing a spill compaction, the spill compaction comprising:

calculating a determinative mapping from an entry in the node, the determinative mapping specifying a single child node of the node; and writing the entry to the single child node.

42. The system of claim 41, wherein the node is a base level node and the single child node is a subsequent level node, and wherein the determinative mapping is based on a tree identifier and key tuple for the entry.

* * * * *